US010873984B2

(12) United States Patent
Hayashi

(10) Patent No.: US 10,873,984 B2
(45) Date of Patent: Dec. 22, 2020

(54) APPARATUS RELATED TO DUAL CONNECTIVITY

(71) Applicant: NEC CORPORATION, Tokyo (JP)

(72) Inventor: Sadafuku Hayashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/759,596

(22) PCT Filed: Sep. 28, 2016

(86) PCT No.: PCT/JP2016/078649
§ 371 (c)(1),
(2) Date: Mar. 13, 2018

(87) PCT Pub. No.: WO2017/061317
PCT Pub. Date: Apr. 13, 2017

(65) Prior Publication Data
US 2019/0045564 A1 Feb. 7, 2019

(30) Foreign Application Priority Data
Oct. 6, 2015 (JP) ................................ 2015-198287

(51) Int. Cl.
*H04W 76/15* (2018.01)
*H04W 76/34* (2018.01)
(Continued)

(52) U.S. Cl.
CPC ............ *H04W 76/15* (2018.02); *H04L 5/001* (2013.01); *H04W 16/32* (2013.01); *H04W 76/30* (2018.02);
(Continued)

(58) Field of Classification Search
CPC ..... H04W 76/15; H04W 76/34; H04W 76/30; H04W 16/32; H04L 5/00
See application file for complete search history.

(56) References Cited

U.S. PATENT DOCUMENTS

2015/0043492 A1* 2/2015 Baek .................... H04W 76/15 370/329
2015/0045052 A1* 2/2015 Pao ...................... H04W 88/06 455/453
(Continued)

FOREIGN PATENT DOCUMENTS

WO 2014132560 A1 9/2014
WO 2015/115573 A1 8/2015

OTHER PUBLICATIONS

Communication dated Feb. 18, 2019 from the European Patent Office in application No. 16835063.5.
(Continued)

*Primary Examiner* — Walter J Divito
*Assistant Examiner* — Anthony Luo
(74) *Attorney, Agent, or Firm* — Sughrue Mion, PLLC

(57) ABSTRACT

To enable reduction of the occurrence of unnecessary operations in a case with a SCG bearer. An apparatus of the present invention includes: a first communication processing unit configured to communicate with a terminal apparatus over a master cell group (MCG) bearer for dual connectivity of the terminal apparatus; and a second communication processing unit configured to receive, from a secondary base station which communicates with the terminal apparatus over a secondary cell group (SCG) bearer for the dual connectivity, a first message requesting a release of the secondary base station. The second communication processing unit is configured to transmit, to the secondary base station, a second message indicating a rejection of the release.

18 Claims, 34 Drawing Sheets

(51) Int. Cl.

| | |
|---|---|
| ***H04W 76/30*** | (2018.01) |
| ***H04L 5/00*** | (2006.01) |
| ***H04W 16/32*** | (2009.01) |
| ***H04W 88/06*** | (2009.01) |
| ***H04W 92/20*** | (2009.01) |

(52) U.S. Cl.
CPC ............ *H04W 76/34* (2018.02); *H04W 88/06* (2013.01); *H04W 92/20* (2013.01)

(56) References Cited

U.S. PATENT DOCUMENTS

| | | | | |
|---|---|---|---|---|
| 2015/0351139 | A1* | 12/2015 | Zhang ................... | H04L 1/1887 370/329 |
| 2016/0007352 | A1 | 1/2016 | Qu et al. | |
| 2016/0007403 | A1 | 1/2016 | Futaki et al. | |
| 2016/0212760 | A1* | 7/2016 | Iwai .................. | H04W 28/0247 |
| 2016/0219603 | A1 | 7/2016 | Fujishiro et al. | |
| 2016/0219604 | A1 | 7/2016 | Fujishiro et al. | |
| 2017/0055169 | A1* | 2/2017 | Ogura ................... | H04W 72/04 |
| 2017/0064769 | A1 | 3/2017 | Zhang et al. | |
| 2017/0215078 | A1* | 7/2017 | Mochizuki .............. | H04W 4/90 |
| 2018/0295670 | A1 | 10/2018 | Decarreau et al. | |

OTHER PUBLICATIONS

NEC: "UE-AMBR Coordination for LTE Dual Connectivity", 3GPP TSG RAN WG3 Meeting RAN3#87bis; R3-150610, Apr. 20-24, 2015, XP050937228, pp. 1-5.
Alcatel-Lucent, Alcatel-Lucent Shanghai Bell: "Handling of user inactivity in dual connectivity release 13", 3GPP TSG-RAN, WG3 Meeting #88, R3-151023, May 25-29, 2015, XP050969412, 2 pages.
Notification of Reasons for Refusal dated Mar. 19, 2019 from the Japanese Patent Office in application No. 2017-534395.
Communication dated Mar. 27, 2019 from the European Patent Office in application No. 16853471.7.
Alcatel-Lucent, et al., "Need of a cause value for user inactivity in dual connectivity", 3GPP TSG-RAN WG3 Meeting #87, R3-150202, Feb. 9-13, 2015, 3 pages.
Ericsson, "Completion of basic signaling flows", 3GPP TSG-RAN WG3 Meeting #83bis, R3-140813, Mar. 31-Apr. 4, 2014, pp. 1-19.
Ericsson, "Deriving X2AP and S1AP signalling elements", 3GPP TSG-RAN WG3 Meeting #83bis, R3-140815, Mar. 31-Apr. 4, 2014, pp. 6.
NTT Docomo, Inc., "Introduction of Dual Connectivity", 3GPP TDG-TSN WG2 #85, R2-140906, Feb. 10-14, 2014, pp. 1-46.
Alcatel-Lucent, et al., "Handling of user inactivity in Dual Connectivity", 3GPP TSG-RAN WG3 Meeting #87, R3-150203, Feb. 9-13, 2015, pp. 2-31/E (30 pages).
Alcatel Lucent, Alcatel Lucent Shanghai Bell, "Text Proposals for handling user inactivity in dual connectivity release13", 3GPPTSG-RAN WG3#88 R3-151312, May 25-29, 2018, 5 pages.
Ericsson, "Response to R3-151023 & R3-151024", 3GPP TSG-RAN WG3 Meeting #88 R3-151179, May 25-29, 2015, 5 pages.
NEC, "User Inactivity in SCG bearer option", 3GPP TSG-RAN WG3#89 R3-151488, Aug. 24-28, 2015, 4 pages.
International Search Report dated Oct. 25, 2016 issued by the International Searching Authority in PCT/JP2016/072902.
Communication dated Dec. 11, 2018, from the Japanese Patent Office in counterpart application No. 2017-544464.
Communication dated Feb. 25, 2019 from United States Patent and Trademark Office in U.S. Appl. No. 15/747,810.
Written Opinion of International Searching Authority, dated Oct. 25, 2016 from the International Bureau in International application No. PCT/JP2016/072902.
"3rd Generation Partnership Project; Technical Specification Group Radio Access Network; Evolved Universal Terrestrial Radio Access Network (E-UTRAN); S1 Application Protocol (S1AP) (Release 13)", 3GPP TS 36.413 V13.0.0, Jun. 2015, pp. 1-302.
"3rd Generation Partnership Project; Technical Specification Group Radio Access Network; Evolved Universal Terrestrial Radio Access Network (E-UTRAN); Extension of dual connectivity in E-UTRAN (Release 13)", 3GPP TR 36.875 V13.0.0, Jun. 2015, pp. 1-17.
Nokia Networks et al., "SeNB initiated SCG Change procedure", 3GPP TSG-RAN WG3 Meeting #86, R3-142734, 3GPP TSG-RAN WG3 Meeting # 86, Nov. 17-21, 2014, 5 pages.
International Search Report for PCT/JP2016/078649, dated Dec. 13, 2016.
Alcatel-Lucent et al., "Text Proposals for handling user inactivity in dual connectivity release 13", 3GPP TSG-RAN WG3 Meeting #88, R3-151024, May 25-29, 2015, (4 pages total).
Huawei, "Discussion on the enhancement for UE-AMBR", 3GPP TSG-RAN3 Meeting #87bis, R3-150573, Apr. 20-24, 2015, (4 pages total).
Communication dated Aug. 28, 2019, from the European Patent Office in application No. 16835063.5.

* cited by examiner

| IE/Group Name | Presence | Range | IE type and reference | Semantics description | Criticality | Assigned Criticality |
|---|---|---|---|---|---|---|
| Message Type | M | | 9.2.13 | | YES | reject |
| MeNB UE X2AP ID | M | | eNB UE X2AP ID 9.2.24 | Allocated at the MeNB | YES | ignore |
| SeNB UE X2AP ID | M | | eNB UE X2AP ID 9.2.24 | Allocated at the SeNB | YES | ignore |
| **E-RABs to be Released List** | | *0..1* | | | YES | ignore |
| ⋮ | ⋮ | ⋮ | ⋮ | ⋮ | ⋮ | ⋮ |
| Criticality Diagnostics | O | | 9.2.7 | | YES | ignore |
| Release Reject | O | | NULL | Indicates that the release is rejected | YES | ignore |
| Time to wait | O | | 9.2.1.61 | | YES | ignore |
| User Inactivity function Indication | O | | 9.2.1.xx | | YES | ignore |

FIG. 8

| IE/Group Name | Presence | Range | IE type and reference | Semantics description | Criticality | Assigned Criticality |
|---|---|---|---|---|---|---|
| Message Type | M | | 9.2.13 | | YES | reject |
| MeNB UE X2AP ID | M | | eNB UE X2AP ID 9.2.24 | Allocated at the MeNB | YES | ignore |
| SeNB UE X2AP ID | M | | eNB UE X2AP ID 9.2.24 | Allocated at the SeNB | YES | ignore |
| **E-RABs to be Released List** | | *0..1* | | | YES | ignore |
| ⋮ | ⋮ | ⋮ | ⋮ | ⋮ | ⋮ | ⋮ |
| Criticality Diagnostics | O | | 9.2.7 | | YES | ignore |
| Release Reject | O | | Cause 9.2.6 | Indicates cause that the release is rejected | YES | ignore |
| Time to wait | O | | 9.2.1.61 | | YES | ignore |
| User Inactivity function Indication | O | | 9.2.1.xx | | YES | ignore |

FIG. 9

| IE/Group Name | Presence | Range | IE Type and Reference | Semantics Description |
|---|---|---|---|---|
| CHOICE *Cause Group* | M | | | |
| *>Radio Network Layer* | | | | |
| >>Radio Network Layer Cause | M | | ENUMERATED (Handover Desirable for Radio Reasons, Time Critical Handover, Resource Optimisation Handover, Reduce Load in Serving Cell, Partial Handover, Unknown New eNB UE X2AP ID, ...., Bearer Option not Supported, Release Reject) | |
| ⋮ | ⋮ | ⋮ | ⋮ | ⋮ |

FIG. 10

| Radio Network Layer cause | Meaning |
|---|---|
| Cell not Available | The concerned cell is not available. |
| Handover Desirable for Radio Reasons | The reason for requesting handover is radio related. |
| Handover Target not Allowed | Handover to the indicated target cell is not allowed for the UE in question |
| ⋮ | ⋮ |
| Release Reject | The Release request is rejected by the receiving node.<br>In the current version of this specification applicable for Dual Connectivity only. |

FIG. 11

| IE/Group Name | Presence | Range | IE type and reference | Semantics description |
|---|---|---|---|---|
| Time to wait | M | | ENUMERATED(1s, 2s, 5s, 10s, 20s, 60s) | |

FIG. 12

| IE/Group Name | Presence | Range | IE type and reference | Semantics description |
|---|---|---|---|---|
| User Inactivity function indication | M | | ENUMERATED(on, off) | |

| IE/Group Name | Presence | Range | IE type and reference | Semantics description | Criticality | Assigned Criticality |
|---|---|---|---|---|---|---|
| Message Type | M | | 9.2.13 | | YES | reject |
| MeNB UE X2AP ID | M | | eNB UE X2AP ID 9.2.24 | Allocated at the MeNB | YES | ignore |
| SeNB UE X2AP ID | M | | eNB UE X2AP ID 9.2.24 | Allocated at the SeNB | YES | ignore |
| Cause | O | | Cause 9.2.6 | | YES | ignore |
| Time to wait | O | | 9.2.1.61 | | YES | ignore |
| User Inactivity function Indication | O | | 9.2.1.xx | | YES | ignore |
| Criticality Diagnostics | O | | 9.2.7 | | YES | ignore |

FIG. 16

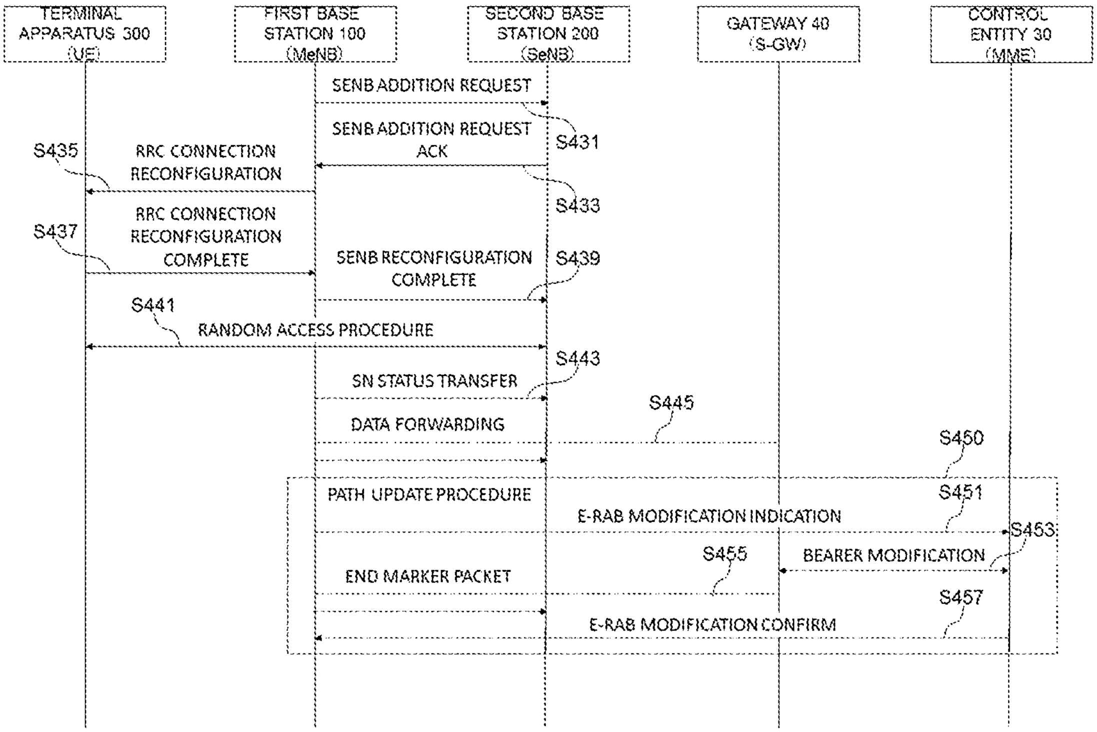

FIG. 17

| IE/Group Name | Presence | Range | IE type and reference | Semantics description | Criticality | Assigned Criticality |
|---|---|---|---|---|---|---|
| Message Type | M | | 9.2.13 | | YES | reject |
| MeNB UE X2AP ID | M | | eNB UE X2AP ID 9.2.24 | Allocated at the MeNB | YES | reject |
| UE Security Capabilities | C-ifSCGBearerOption | | 9.2.29 | | YES | reject |
| SeNB Security Key | C-ifSCGBearerOption | | 9.2.72 | The S-KeNB which is provided by the MeNB, see TS 33.401 [18]. | YES | reject |
| ⋮ | ⋮ | ⋮ | ⋮ | ⋮ | ⋮ | ⋮ |
| User Inactivity function Indication | O | | 9.2.1.xx | | YES | ignore |

FIG. 18

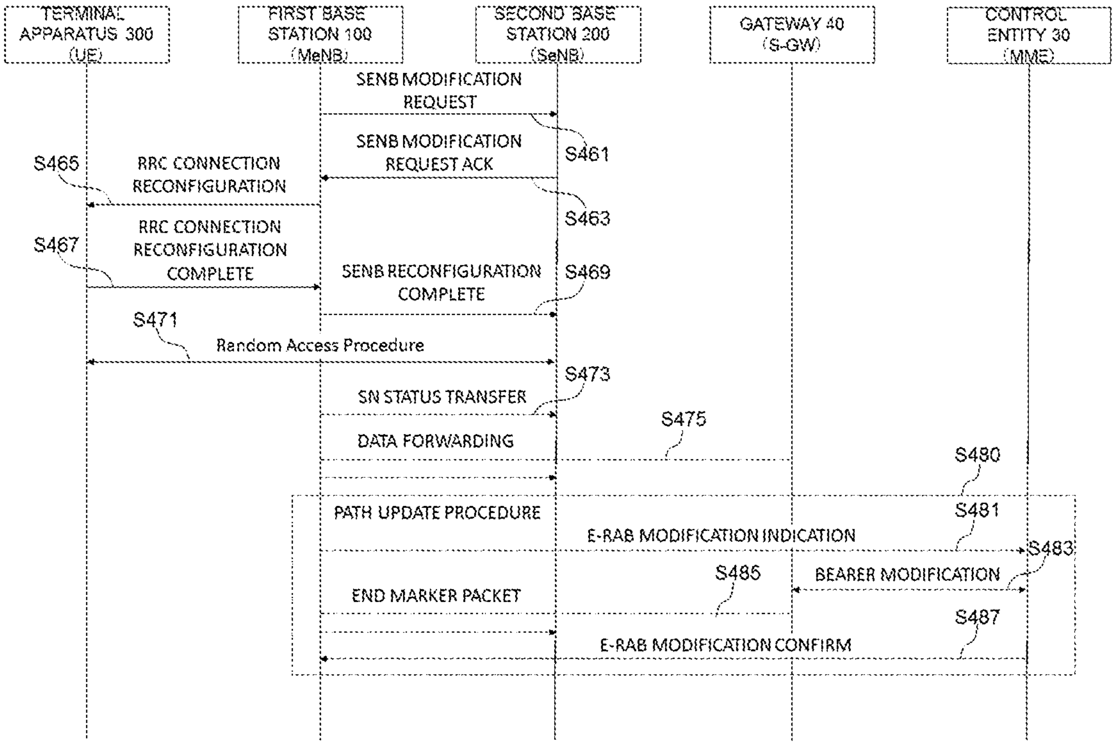

FIG. 19

| IE/Group Name | Presence | Range | IE type and reference | Semantics description | Criticality | Assigned Criticality |
|---|---|---|---|---|---|---|
| Message Type | M | | 9.2.13 | | YES | reject |
| MeNB UE X2AP ID | M | | eNB UE X2AP ID 9.2.24 | Allocated at the MeNB | YES | reject |
| SeNB UE X2AP ID | M | | eNB UE X2AP ID 9.2.24 | Allocated at the SeNB | YES | reject |
| Cause | M | | 9.2.6 | | YES | ignore |
| SCG Change Indication | O | | 9.2.73 | | YES | ignore |
| Serving PLMN | O | | PLMN Identity 9.2.4 | The serving PLMN of the SCG in the SeNB. | YES | ignore |
| ⋮ | ⋮ | ⋮ | ⋮ | ⋮ | ⋮ | ⋮ |
| User Inactivity function Indication | O | | 9.2.1.xx | | YES | ignore |

FIG. 20

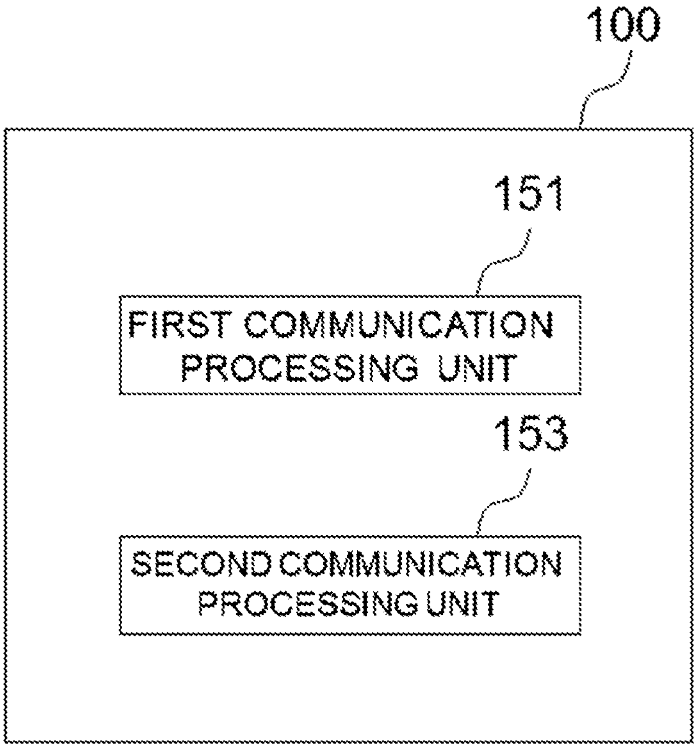

FIG. 21

| IE/Group Name | Presence | Range | IE type and reference | Semantics description |
|---|---|---|---|---|
| User Inactivity Status | O | | ENUMERATED (Active, Inactive, ...) | Indicates the user has been active or inactive |

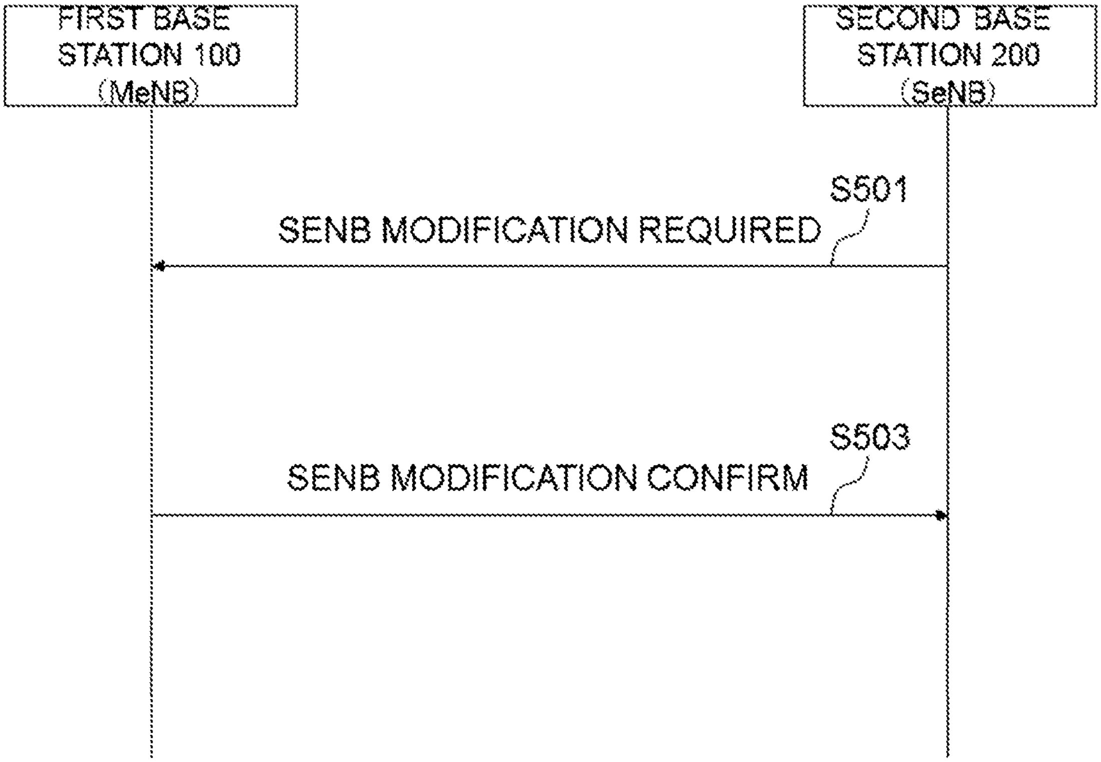

FIG. 29

| **IE/Group Name** | **Presence** | **Range** | **IE type and reference** | **Semantics description** | **Criticality** | **Assigned Criticality** |
|---|---|---|---|---|---|---|
| Message Type | M | | 9.2.13 | | YES | reject |
| MeNB UE X2AP ID | M | | eNB UE X2AP ID 9.2.24 | Allocated at the MeNB | YES | reject |
| SeNB UE X2AP ID | M | | eNB UE X2AP ID 9.2.24 | Allocated at the SeNB | YES | reject |
| Cause | M | | 9.2.6 | | YES | ignore |
| SCG Change Indication | O | | 9.2.73 | | YES | ignore |
| **E-RABs To Be Released List** | | *0..1* | | | YES | ignore |
| **>E-RABs To Be Released Item** | | *1 .. <maxnoof Bearers>* | | | EACH | ignore |
| >>E-RAB ID | M | | 9.2.23 | | – | – |
| >>Cause | M | | 9.2.6 | | – | – |
| SeNB to MeNB Container | O | | OCTET STRING | Includes the *SCG-Config* message as defined in TS 36.331 [9] | YES | ignore |
| User Inactivity Status | O | | 9.2.x3 | | YES | ignore |

FIG. 30

| IE/Group Name | Presence | Range | IE type and reference | Semantics description | Criticality | Assigned Criticality |
|---|---|---|---|---|---|---|
| Message Type | M | | 9.2.13 | | YES | reject |
| MeNB UE X2AP ID | M | | eNB UE X2AP ID 9.2.24 | Allocated at the MeNB | YES | reject |
| UE Security Capabilities | C-ifSCGBearerOption | | 9.2.29 | | YES | reject |
| SeNB Security Key | C-ifSCGBearerOption | | 9.2.72 | The S-KeNB which is provided by the MeNB, see TS 33.401 [18]. | YES | reject |
| ⋮ | ⋮ | ⋮ | ⋮ | ⋮ | ⋮ | ⋮ |
| Expected UE Behaviour | C-ifRepCharacInactivity | | 9.2.70 | | YES | ignore |

FIG. 32

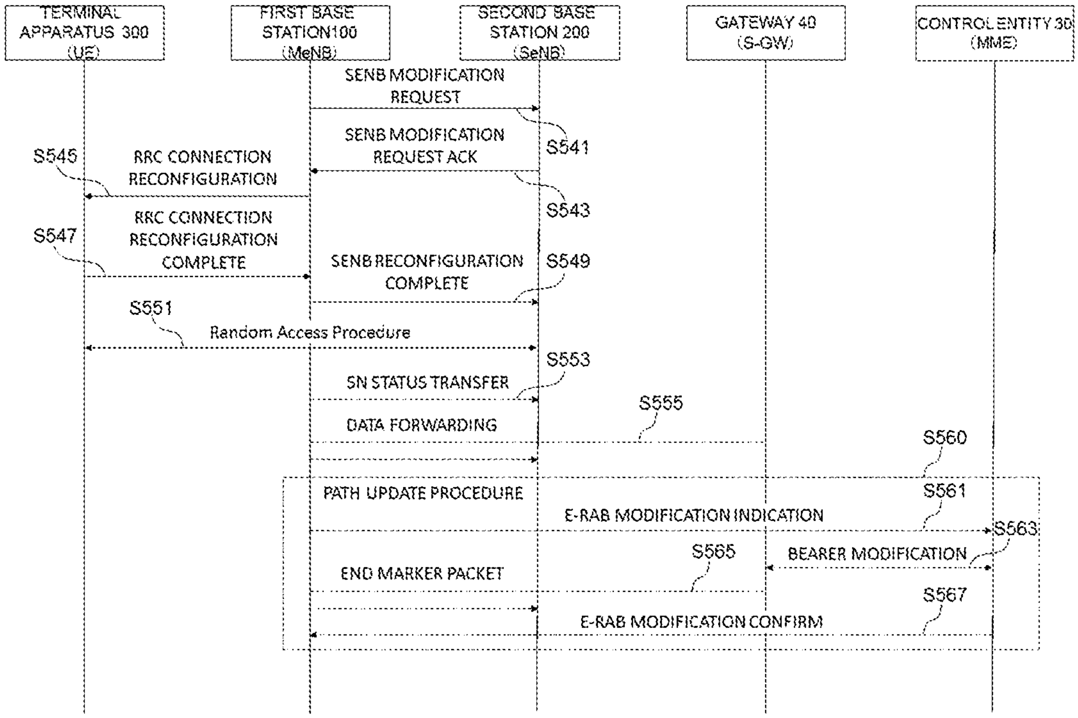

FIG. 33

| IE/Group Name | Presence | Range | IE type and reference | Semantics description | Criticality | Assigned Criticality |
|---|---|---|---|---|---|---|
| Message Type | M | | 9.2.13 | | YES | reject |
| MeNB UE X2AP ID | M | | eNB UE X2AP ID 9.2.24 | Allocated at the MeNB | YES | reject |
| SeNB UE X2AP ID | M | | eNB UE X2AP ID 9.2.24 | Allocated at the SeNB | YES | reject |
| Cause | M | | 9.2.6 | | YES | ignore |
| SCG Change Indication | O | | 9.2.73 | | YES | ignore |
| Serving PLMN | O | | PLMN Identity 9.2.4 | The serving PLMN of the SCG in the SeNB. | YES | ignore |
| ⋮ | ⋮ | ⋮ | ⋮ | ⋮ | ⋮ | ⋮ |
| Expected UE Behaviour | C-ifRepCharacInactivity | | 9.2.70 | | YES | ignore |

FIG. 34

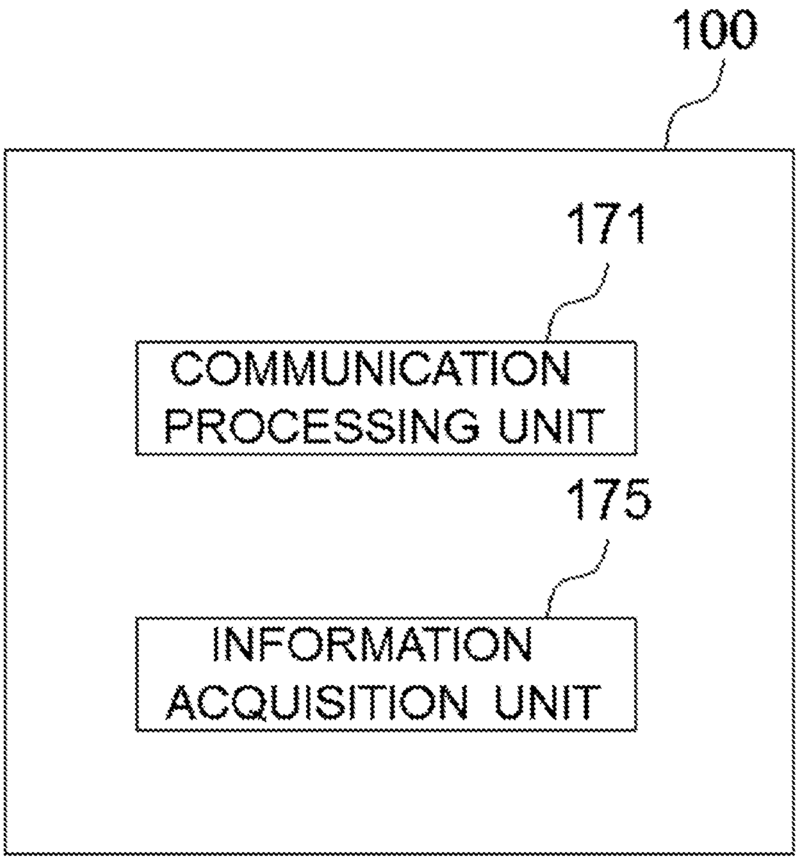

FIG. 35

| IE/Group Name | Presence | Range | IE type and reference | Semantics description |
|---|---|---|---|---|
| User Inactivity Status | O | | ENUMERATED (Active, Inactive, ...) | Indicates the user has been active or inactive |

| IE/Group Name | Presence | Range | IE type and reference | Semantics description |
|---|---|---|---|---|
| CHOICE Report Characteristics Type | M | | | |
| >On Demand | | | NULL | |
| >Periodic | | | 9.2.x4 | |
| >Event Trigger | | | 9.2.x5 | |

| IE/Group Name | Presence | Range | IE type and reference | Semantics description |
|---|---|---|---|---|
| CHOICE Information Report Periodicity Scale | M | | | |
| >hour | | | | |
| >>Report Periodicity Value | M | | INTEGER (1..24,...) | |
| >minute | | | | |
| >>Report Periodicity Value | M | | INTEGER (1..60,...) | |
| >second | | | | |
| >>Report Periodicity Value | M | | INTEGER (1..60,...) | |

FIG. 43

| IE/Group Name | Presence | Range | IE type and reference | Semantics description |
|---|---|---|---|---|
| User Inactivity | | | NULL | The SeNB report the User Inactivity Status if this is indicated. |
| Arriving Data Rate | | | | |
| >Report Threshold | M | | ENUMERATED (above SeNB UE-AMBR, below SeNB UE-AMBR, ...) | |

FIG. 44

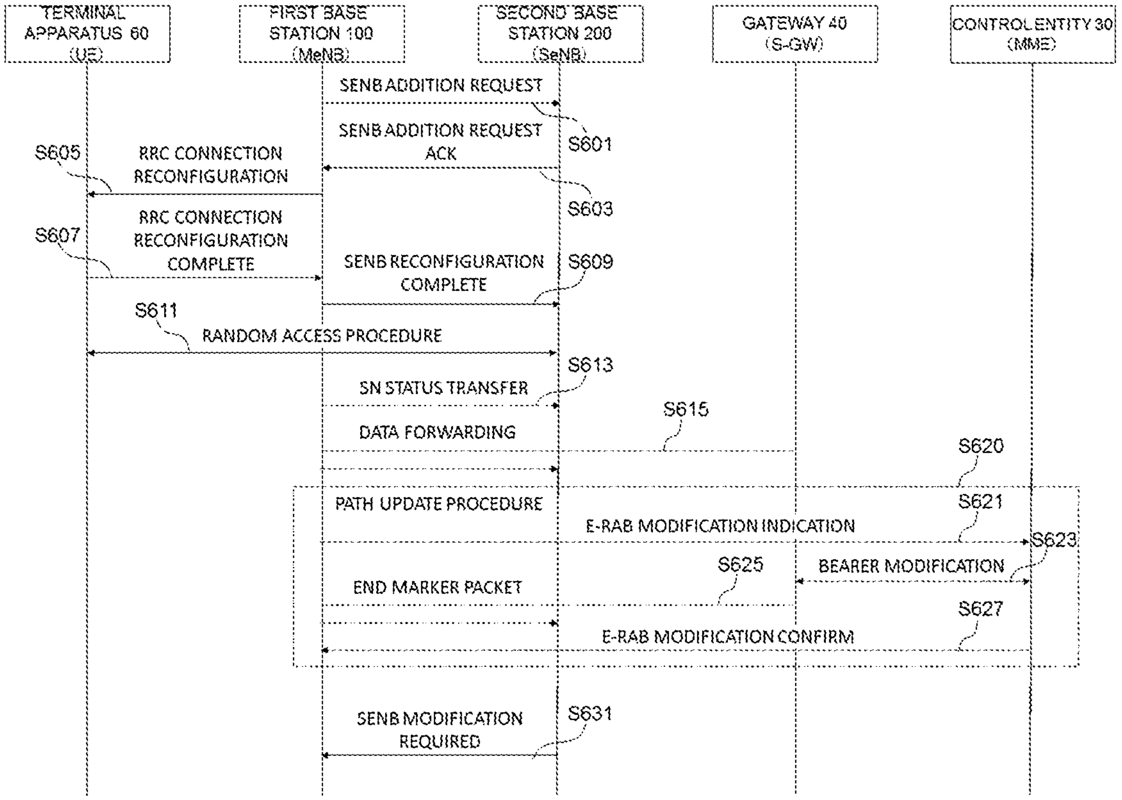

FIG. 45

| IE/Group Name | Presence | Range | IE type and reference | Semantics description | Criticality | Assigned Criticality |
|---|---|---|---|---|---|---|
| ⋮ | ⋮ | ⋮ | ⋮ | ⋮ | ⋮ | ⋮ |
| Report Characteristics | O | | ENUMERATED (User inactivity Status, Arriving data rate,...) | | YES | reject |
| Report Characteristics Type | O | | 9.2.x2 | | YES | ignore |
| Expected UE Behaviour | C-ifRepCharacInactivity | | 9.2.70 | | YES | ignore |
| User Inactivity Timer | O | | INTEGER (0 .. 255) | The value represent second. Value "0" or "255" means infinite | YES | ignore |

FIG. 48

| IE/Group Name | Presence | Range | IE type and reference | Semantics description | Criticality | Assigned Criticality |
|---|---|---|---|---|---|---|
| ⋮ | ⋮ | ⋮ | ⋮ | ⋮ | ⋮ | ⋮ |
| Report Characteristics | O | | BITSTRING (SIZE(32)) | Each position in the bitmap indicates object the SeNB is requested to report. First Bit = Arriving Data Rate of each E-RAB, Second Bit = User Inactivity Status. | YES | ignore |
| Report Characteristic Info | | 0..<maxnoofObjects> | | | GLOBAL | ignore |
| >Report Characteristics Type | O | | 9.2.x2 | | YES | ignore |
| >Expected UE Behaviour | C-ifRepCharacInactivity | | 9.2.70 | | YES | ignore |
| User Inactivity Timer | O | | INTEGER (0 .. 255) | The value represent second. Value "0" or "255" means infinite | YES | ignore |

FIG. 49

| IE/Group Name | Presence | Range | IE type and reference | Semantics description | Criticality | Assigned Criticality |
|---|---|---|---|---|---|---|
| Message Type | M | | 9.2.13 | | YES | reject |
| MeNB UE X2AP ID | M | | eNB UE X2AP ID 9.2.24 | Allocated at the MeNB | YES | ignore |
| SeNB UE X2AP ID | M | | eNB UE X2AP ID 9.2.24 | Allocated at the SeNB | YES | ignore |
| Report Characteristics | O | | ENUMERATED (User inactivity Status, Arriving data rate,...) | | YES | reject |
| Report Characteristics Type | O | | 9.2.x2 | | YES | ignore |
| Expected UE Behaviour | C-ifRepCharacInactivity | | 9.2.70 | | YES | ignore |
| User Inactivity Timer | O | | INTEGER (0 .. 255) | The value represent second. Value "0" or "255" means infinite | YES | ignore |

FIG. 50

| IE/Group Name | Presence | Range | IE type and reference | Semantics description | Criticality | Assigned Criticality |
|---|---|---|---|---|---|---|
| ⋮ | ⋮ | ⋮ | ⋮ | ⋮ | ⋮ | ⋮ |
| User Inactivity Status | O | | 9.2.x3 | | YES | ignore |

FIG. 51

| IE/Group Name | Presence | Range | IE type and reference | Semantics description | Criticality | Assigned Criticality |
|---|---|---|---|---|---|---|
| Message Type | M | | 9.2.13 | | YES | reject |
| MeNB UE X2AP ID | M | | eNB UE X2AP ID 9.2.24 | Allocated at the MeNB | YES | ignore |
| SeNB UE X2AP ID | M | | eNB UE X2AP ID 9.2.24 | Allocated at the SeNB | YES | ignore |
| User Inactivity Status | O | | 9.2.x3 | | YES | ignore |

FIG. 52

| IE/Group Name | Presence | Range | IE type and reference | Semantics description | Criticality | Assigned Criticality |
|---|---|---|---|---|---|---|
| ⋮ | ⋮ | ⋮ | ⋮ | ⋮ | ⋮ | ⋮ |
| User Inactivity Timer | O | | INTEGER (0 .. 255) | The value represent second. Value "0" or "255" means infinite | YES | ignore |

FIG. 53

| IE/Group Name | Presence | Range | IE type and reference | Semantics description | Criticality | Assigned Criticality |
|---|---|---|---|---|---|---|
| Message Type | M | | 9.2.13 | | YES | reject |
| MeNB UE X2AP ID | M | | eNB UE X2AP ID 9.2.24 | Allocated at the MeNB | YES | ignore |
| SeNB UE X2AP ID | M | | eNB UE X2AP ID 9.2.24 | Allocated at the SeNB | YES | ignore |
| User Inactivity Timer | O | | INTEGER (0 .. 255) | The value represent second. Value "0" or "255" means infinite | YES | ignore |

FIG. 54

| IE/Group Name | Presence | Range | IE type and reference | Semantics description | Criticality | Assigned Criticality |
|---|---|---|---|---|---|---|
| Message Type | M | | 9.2.13 | | YES | reject |
| MeNB UE X2AP ID | M | | eNB UE X2AP ID 9.2.24 | Allocated at the MeNB | YES | ignore |
| SeNB UE X2AP ID | M | | eNB UE X2AP ID 9.2.24 | Allocated at the SeNB | YES | ignore |
| Cause | M | | 9.2.6 | | YES | ignore |

FIG. 55

APPARATUS RELATED TO DUAL CONNECTIVITY

CROSS REFERENCE TO RELATED APPLICATIONS

This application is a National Stage of International Application No. PCT/JP2016/078649 filed Sep. 28, 2016, claiming priority based on Japanese Patent Application No. 2015-198287 filed Oct. 6, 2015.

BACKGROUND

Technical Field

The present invention relates to an apparatus related to dual connectivity.

Background Art

It is often the case that a user equipment (UE), such as a smartphone, transmits and/or receives data for applications on a background, which, however, does not mean that the UE is always transmitting and/or receiving data. For this reason, for example, an evolved Node B (eNB) observes UE activities, and when there is no transmission and/or reception of data by the UE for a certain time period, the eNB can requests a release for the UE to a mobility management entity (MME). For example, NPL1 discloses that an eNB may transmit UE CONTEXT RELEASE REQUEST to an MME due to user inactivity.

Meanwhile, in 3GPP Release 12, dual connectivity is introduced. Dual connectivity is an operation mode of UE for enabling connections to both a master eNB (MeNB) and a secondary eNB (SeNB). In dual connectivity, with respect to a control plane, there is an S1-MME between the MeNB and the MME while there is no S1-MME between an SeNB and the MME. Hence, the MeNB receives control information for UE in dual connectivity from the MME and transmits the control information to the MME. With respect to a user plane, there are two different architectures. In the first architecture, there is S1-U between the MeNB and a serving gateway (S-GW) while there is no S1-U between the SeNB and the S-GW. Hence, user plane data is not directly transmitted between the S-GW and the SeNB but is transmitted and/or received between the S-GW and the SeNB via the MeNB (i.e., through the S1-U and X2-U). In the first architecture, there is a bearer whose radio protocols are located in both the MeNB and the SeNB to use resources of both the MeNB and the SeNB, and the bearer is called a split bearer. In the second architecture, there is S1-U between the MeNB and the S-GW, and there is also S1-U between the SeNB and the S-GW. Hence, user plane data is directly transmitted and/or received between the S-GW and the SeNB without passing through the MeNB. In the second architecture, there is a bearer whose radio protocols are located in the SeNB to use resources of the SeNB, and the bearer is called a secondary cell group (SCG) bearer.

In the case with a split bearer, data transmitted through a SCG (i.e., a serving cell group associated with the SeNB) passes through the MeNB, which enables the MeNB to observe UE activities. In contrast, in the case with a SCG bearer, data transmitted through the SCG does not pass through the MeNB, which prevents the MeNB from directly observing UE activities, and therefor the MeNB relies on observation by the SeNB. These respects are disclosed in NPL2.

CITATION LIST

Non-Patent Literature

[NPL1] 3GPP TS 36.413 V13.0.0 (2015-06) 3rd Generation Partnership Project; Technical Specification Group Radio Access Network (E-UTRAN); S1 Application Protocol (S1AP) (Release 13)

[NPL2] 3GPP TR 36.875 V13.0.0 (2015-06) 3rd Generation Partnership Project; Technical Specification Group Radio Access Network (E-UTRAN); Extension of dual connectivity in E-UTRAN (Release 13)

SUMMARY

Technical Problem

However, in the case with a SCG bearer as the case disclosed in NPL2, control related to UE activities may be distributed between an MeNB and an SeNB. As a result of the distribution, unnecessary operations may occur, for example.

For example, in some cases, UE data is transmitted through a master cell group (MCG) (i.e., a group of serving cells associated with the MeNB) while no UE data is transmitted through a SCG. In such a case, for example, an SeNB may observe UE activities in the SCG, determine a release of the SeNB due to UE inactivity, and thus release the SeNB through a release procedure. Hence, for example, to enable data offload to the SeNB after the release, a procedure for adding the SeNB is needed. In other words, an unnecessary operation due to the release of the SeNB (the procedure for adding the SeNB) may occur.

An example object of the present invention is to provide an apparatus and a method that can reduce the occurrence of unnecessary operations in a case with a SCG bearer.

Solution to Problem

A first apparatus according to an example aspect of the present invention includes: a first communication processing unit configured to communicate with a terminal apparatus over a master cell group (MCG) bearer for dual connectivity of the terminal apparatus; and a second communication processing unit configured to receive, from a secondary base station which communicates with the terminal apparatus over a secondary cell group (SCG) bearer for the dual connectivity, a first message requesting a release of the secondary base station. The second communication processing unit is configured to transmit, to the second base station, a second message indicating a rejection of the release.

A second apparatus according to an example aspect of the present invention includes: a first communication processing unit configured to communicate with a terminal apparatus over a SCG bearer for dual connectivity of the terminal apparatus; and a second communication processing unit configured to transmit, to a master base station which communicates with the terminal apparatus over a MCG bearer for the dual connectivity, a first message requesting a release of a secondary base station which communicates with the terminal apparatus over the SCG bearer. The second communication processing unit is configured to receive, from the master base station, a second message indicating a rejection of the release.

A third apparatus according to an example aspect of the present invention includes: a first communication processing unit configured to communicate with a master base station over a MCG bearer for dual connectivity of a terminal apparatus; and a second communication processing unit configured to communicate with a secondary base station over a SCG bearer for the dual connectivity. The secondary base station transmits, to the master base station, a first message requesting a release of the secondary base station, and the master base station transmits, to the secondary base station, a second message indicating a rejection of the release.

A fourth apparatus according to an example aspect of the present invention includes: a communication processing unit configured to communicate with a terminal apparatus over a MCG bearer for dual connectivity of the terminal apparatus; and an information acquisition unit configured to acquire activity-related information reported by a secondary base station which communicates with the terminal apparatus over a SCG bearer for the dual connectivity, the activity-related information being related to an activity of the terminal apparatus in a SCG of the secondary base station.

A fifth apparatus according to an example aspect of the present invention includes: a communication processing unit configured to communicate with a terminal apparatus over a SCG bearer for dual connectivity of the terminal apparatus; and a reporting unit configured to report, to a master base station which communicates with the terminal apparatus over a MCG bearer of the dual connectivity, activity-related information related to an activity of the terminal apparatus in a SCG.

A sixth apparatus according to an example aspect of the present invention includes: a first communication processing unit configured to communicate with a master base station over a MCG bearer for dual connectivity of a terminal apparatus; and a second communication processing unit configured to communicate with a secondary base station over a SCG bearer for the dual connectivity. The secondary base station reports, to the master base station, activity-related information related to an activity of the terminal apparatus in a SCG of the secondary base station, and the master base station acquires the activity-related information reported by the secondary base station.

Advantageous Effects of Invention

According to an example aspect of the present invention, it is possible to reduce the occurrence of unnecessary operations in a case with a SCG bearer. Note that the present invention may exert other advantageous effects instead of the above advantageous effects or together with the above advantageous effects.

BRIEF DESCRIPTION OF DRAWINGS

FIG. 8 is an explanatory diagram for describing an example of an SENB RELEASE CONFIRM message.

FIG. 9 is an explanatory diagram for describing another example of the SENB RELEASE CONFIRM message.

FIG. 10 is an explanatory diagram for describing an example of a Cause value.

FIG. 11 is an explanatory diagram for describing an example of Release Reject.

FIG. 12 is an explanatory diagram for describing an example of a Time to wait IE.

FIG. 16 is an explanatory diagram for describing an example of an SENB RELEASE REJECT message.

FIG. 17 is a sequence diagram illustrating an example of a schematic flow of processing related to addition of SeNB in the first example embodiment.

FIG. 18 is an explanatory diagram for describing an example of an SENB ADDITION REQUEST message.

FIG. 19 is a sequence diagram illustrating an example of a schematic flow of processing related to modification of SeNB in the first example embodiment.

FIG. 20 is an explanatory diagram for describing an example of an SENB MODIFICATION REQUEST message.

FIG. 21 is a block diagram illustrating an example of a schematic configuration of a first base station according to a second example embodiment.

FIG. 29 is a sequence diagram illustrating an example of a schematic flow of first processing in the third example embodiment.

FIG. 30 is an explanatory diagram for describing an example of an SENB MODIFICATION REQUIRED message.

FIG. 32 is an explanatory diagram for describing an example of an SENB ADDITION REQUEST message.

FIG. 33 is a sequence diagram illustrating an example of a schematic flow of third processing in the third example embodiment.

FIG. 34 is an explanatory diagram for describing an example of an SENB MODIFICATION REQUEST message.

FIG. 35 is a block diagram illustrating an example of a schematic configuration of a first base station according to a fourth example embodiment.

FIG. 43 is an explanatory diagram for describing an example of a Periodic IE.

FIG. 44 is an explanatory diagram for describing an example of an Event Trigger IE.

FIG. 45 is a sequence diagram illustrating a first example of a schematic flow of request and report processing according to the fifth example embodiment.

FIG. 48 is an explanatory diagram for describing an example of a request message requesting a report of activity-related information.

FIG. 49 is an explanatory diagram for describing another example of the request message requesting a report of activity-related information.

FIG. 50 is an explanatory diagram for describing an example of a UE ASSOCIATED INFORMATION REQUEST message.

FIG. 51 is an explanatory diagram for describing an example of a report message including activity-related information.

FIG. 52 is an explanatory diagram for describing an example of a UE ASSOCIATED INFORMATION REPORT message.

FIG. 53 is an explanatory diagram for describing an example of a response message at the time of success.

FIG. 54 is an explanatory diagram for describing an example of a UE ASSOCIATED INFORMATION RESPONSE message.

FIG. 55 is an explanatory diagram for describing an example of a UE ASSOCIATED INFORMATION FAILURE message.

DESCRIPTION OF THE EMBODIMENTS

Figure 1:
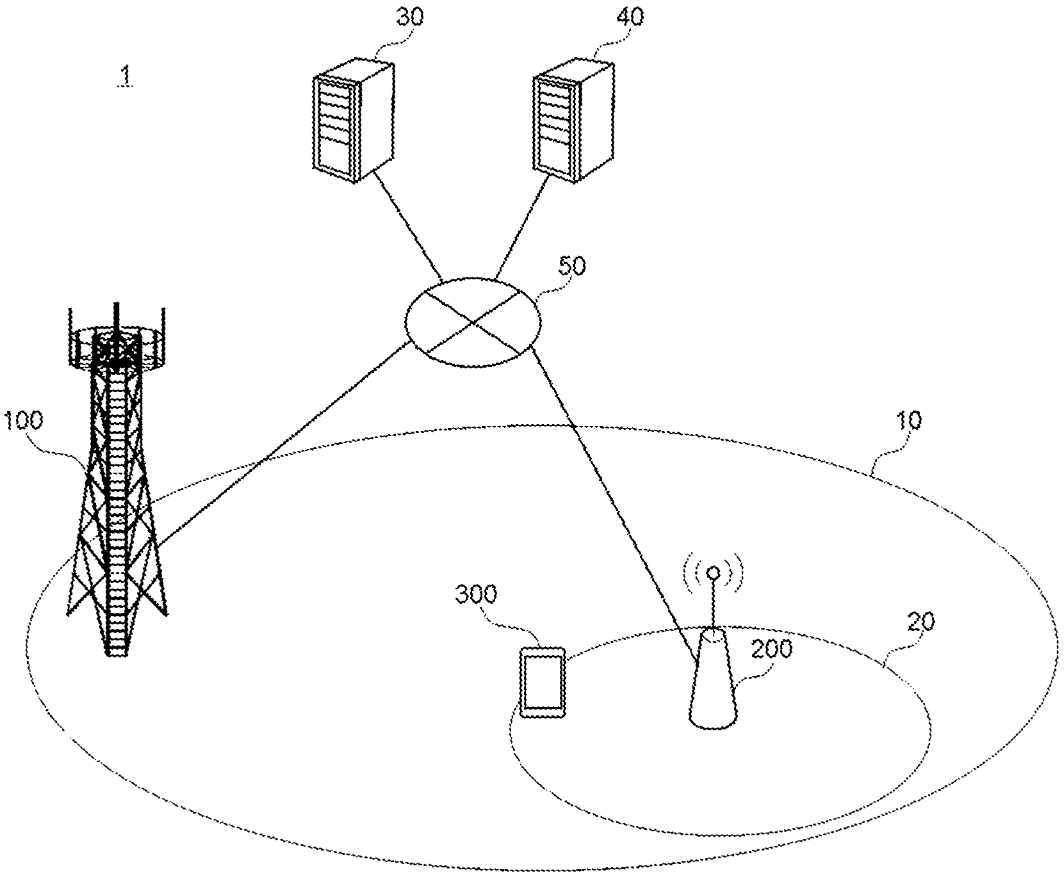
FIG. 1 is an explanatory diagram illustrating an example of a schematic configuration of a system according to example embodiments of the present invention.

Example embodiments of the present invention will be described below in detail with reference to the accompanying drawings. Note that, in the present description and drawings, elements to which the same or similar descriptions are applicable are denoted by the same reference signs, whereby overlapping descriptions may be omitted.

Description will be given in the following order.

1. Overview of Example Embodiments of the Present Invention
2. Example of Configuration of System
3. First Example Embodiment
   - 3.1. Example of Configuration of First Base Station
   - 3.2. Example of Configuration of Second Base Station
   - 3.3. Example of Configuration of Terminal Apparatus
   - 3.4. Technical Features
4. Second Example Embodiment
   - 4.1. Example of Configuration of First Base Station
   - 4.2. Example of Configuration of Second Base Station
   - 4.3. Example of Configuration of Terminal Apparatus
   - 4.4. Technical Features
5. Third Example Embodiment
   - 5.1. Example of Configuration of First Base Station
   - 5.2. Example of Configuration of Second Base Station
   - 5.3. Example of Configuration of Terminal Apparatus
   - 5.4. Technical Features
6. Fourth Example Embodiment
   - 6.1. Example of Configuration of First Base Station
   - 6.2. Example of Configuration of Second Base Station
   - 6.3. Example of Configuration of Terminal Apparatus
   - 6.4. Technical Features
7. Fifth Example Embodiment
   - 7.1. Example of Configuration of First Base Station
   - 7.2. Example of Configuration of Second Base Station
   - 7.3. Technical Features
   - 7.4. First Modified Example
   - 7.5. Second Modified Example

1. Overview of Example Embodiments of the Present Invention

First, an overview of example embodiments of the present invention is described.

(1) Technical Problem

In 3GPP Release 12, dual connectivity is introduced. In a case with a split bearer in dual connectivity, data transmitted through a SCG (i.e., a serving cell group associated with SeNB) passes through an MeNB, which enables the MeNB to observe UE activities. In contrast, in a case with a SCG bearer in dual connectivity, data transmitted through a SCG does not pass through the MeNB, which prevents the MeNB from directly observing UE activities, and therefor the MeNB relies on observation by the SeNB.

However, in the case with a SCG bearer, control related to UE activities may be distributed between the MeNB and the SeNB. As a result, unnecessary operations may occur, for example.

For example, in some cases, UE data is transmitted through a MCG (i.e., a group of serving cells associated with the MeNB) while no UE data is transmitted through the SCG. In such a case, for example, an SeNB may observe UE activities in the SCG, determine a release of the SeNB due to UE inactivity, and thus release the SeNB through a release procedure. Hence, for example, to enable data offload to the SeNB after the release, a procedure for adding the SeNB is needed. In other words, an unnecessary operation due to the release of the SeNB (the procedure for adding the SeNB) may occur.

(2) Technical Features (a) First Technical Feature

To solve the above-described technical problem, for example, an SeNB transmits, to an MeNB, a message requesting a release of the SeNB, and the MeNB transmits (in a case that the release is not accepted), to the SeNB, a second message indicating a rejection of the release.

This makes it possible, for example, to prevent a release of SeNB more than necessary. As a result, the occurrence of a procedure for adding the SeNB can be reduced. In other words, the occurrence of unnecessary operations in the case with a SCG bearer can be reduced.

Note that this technical feature is a feature of a first example embodiment and a second example embodiment to be described later.

(b) Second Technical Feature

To solve the above technical problem, for example, in a case that an SeNB communicates with a UE over a SCG bearer, the SeNB reports, to an MeNB, activity-related information related to an activity of the UE in the SCG of the SeNB (e.g., information indicating that the UE is inactive). The MeNB acquires the activity-related information.

In this way, for example, control related to UE activities concentrates in the MeNB, whereby the occurrence of unnecessary operations in the case with a SCG bearer can be reduced.

Note that this technical feature is a feature of a third example embodiment and a fourth example embodiment to be described later.

(c) Third Technical Feature

To solve the above technical problem, for example, in a case that an SeNB communicates with a UE over a SCG bearer, an MeNB requests the SeNB to report activity-related information related to an activity of the UE in the SCG of the SeNB (e.g., information indicating that the UE is inactive). In response to the request from the MeNB, the SeNB reports the activity-related information to the MeNB. The MeNB acquires the activity-related information.

In this way, for example, control related to UE activities concentrates in the MeNB, whereby the occurrence of unnecessary operations in the case with a SCG bearer can be reduced.

Note that this technical feature is a feature of a fifth example embodiment to be described later.

2. Example of Configuration of System

Figure 2:
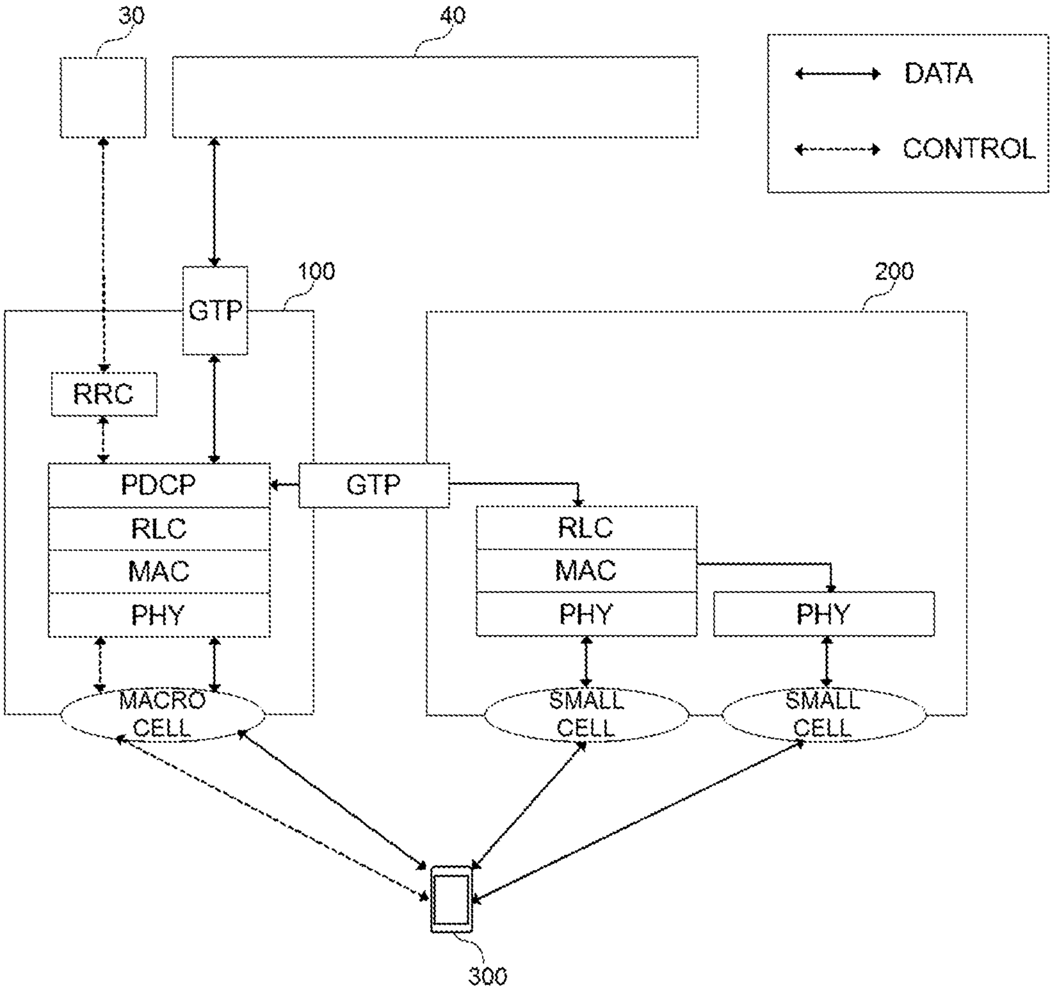
FIG. 2 is an explanatory diagram for describing an example of a first architecture of user plane in dual connectivity.
Figure 3:
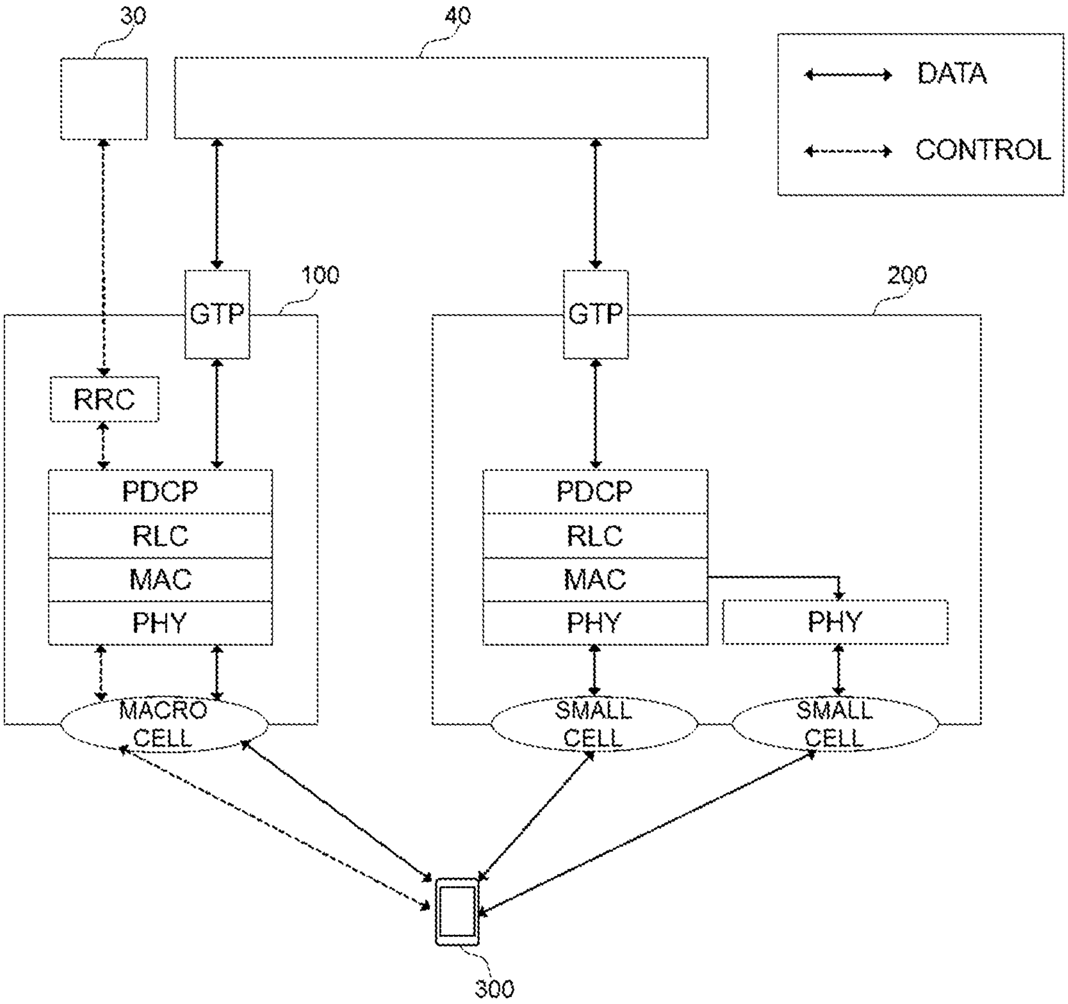
FIG. 3 is an explanatory diagram for describing an example of a second architecture of user plane in dual connectivity.

With reference to FIG. 1 to FIG. 3, an example of a schematic configuration of a system 1 according to the example embodiments of the present invention is described. FIG. 1 is an explanatory diagram illustrating an example of a schematic configuration of the system 1 according to the example embodiments of the present invention. According to FIG. 1, the system 1 includes a control entity 30, a gateway 40, a first base station 100, a second base station 200, and a terminal apparatus 300. The control entity 30, the gateway 40, the first base station 100, and the second base station 200 communicate with each other over a network 50. For example, the network 50 includes a backhaul and a core network.

For example, the system 1 may be a system conforming to Third Generation Partnership Project (3GPP) standards. More specifically, for example, the system 1 may be a system conforming to the Long Term Evolution (LTE)/LTE-Advanced and/or the System Architecture Evolution (SAE).

(1) Control Entity 30

The control entity 30 is a core network node and performs control related to mobility of a terminal apparatus (e.g., the terminal apparatus 300). For example, the control entity 30 is a mobility management entity (MME).

(2) Gateway 40

The gateway 40 is a core network node and transfers data to a base station and data from a base station. For example, the gateway 40 is a serving gateway (S-GW).

(3) First Base Station 100/Second Base Station 200

The first base station 100 is a radio access network (RAN) node and performs wireless communication with a terminal apparatus (e.g., the terminal apparatus 300) located in a coverage area 10. The second base station 200 is also a RAN node and performs wireless communication with a terminal apparatus (e.g., the terminal apparatus 300) located in a coverage area 20. For example, the first base station 100 and the second base station 200 are eNBs.

For example, the coverage area 10 is a macro cell, and the first base station 100 is the base station of the macro cell. For example, the coverage area 20 is a small cell, which is smaller than a macro cell, and the second base station 200 is the base station of the small cell.

(4) Terminal Apparatus 300

The terminal apparatus 300 performs wireless communication with a base station. For example, when the terminal apparatus 300 is located in the coverage area 10 of the first base station 100, the terminal apparatus 300 performs wireless communication with the first base station 100. Moreover, for example, when the terminal apparatus 300 is located in the coverage area 20 of the second base station 200, the terminal apparatus 300 performs wireless communication with the second base station 200. For example, the terminal apparatus 300 is a user equipment (UE).

(5) Dual Connectivity

In particular, the terminal apparatus 300 supports dual connectivity. Specifically, the terminal apparatus 300 can be simultaneously connected to two base stations (e.g., the first base station 100 and the second base station 200) and can perform simultaneous wireless communications with the two base stations (e.g., the first base station 100 and the second base station 200).

In addition, the first base station 100 and the second base station 200 also support dual connectivity. For example, the first base station 100 operates as a master base station in dual connectivity, and the second base station 200 operates as a secondary base station in dual connectivity. The master base station is a base station having an interface with the control entity 30 (a base station configured to terminate the interface with the control entity 30) in dual connectivity and is, for example, an MeNB. The secondary base station is a base station configured to provide additional radio resources to a terminal apparatus in dual connectivity and is, for example, an SeNB.

(a) Control Plane

In dual connectivity, for the control plane, there is an interface (e.g., S1-MME) between the master base station (e.g., MeNB) and the control entity 30 (e.g., MME). However, in dual connectivity, there is no interface (e.g., S1-MME) between the secondary base station (e.g., SeNB) and the control entity 30. Hence, control information for dual connectivity is transmitted and/or received between the master base station and the control entity 30 (and between the master base station and the secondary base station).

(b) User Plane

Meanwhile, for the user plane, there are two different architectures. The two different architectures will be described below with reference to FIG. 2 and FIG. 3.

FIG. 2 is an explanatory diagram for describing an example of a first architecture of user plane in dual connectivity. With reference to FIG. 2, the control entity 30, the gateway 40, the terminal apparatus 300, the first base station 100, and the second base station 200 are illustrated. Here, in the dual connectivity of the terminal apparatus 300, the first base station 100 operates as a master base station, and the second base station 200 operates as a secondary base station. In the first architecture, there is an interface (e.g., S1-U) between the master base station (first base station 100) and the gateway 40, while there is no interface (e.g., S1-U) between the secondary base station (second base station 200) and the gateway 40. Hence, user plane data for the terminal apparatus 300 is not transmitted directly to the secondary base station (second base station 200) from the gateway 40 but is transmitted to the secondary base station (second base station 200) via the master base station (first base station 100). In the first architecture, there is a bearer whose radio protocols are located in both the master base station (first base station 100) and the secondary base station (second base station 200) to use resources of both the master base station (first base station 100) and the secondary base station (second base station 200), the bearer being called a split bearer.

FIG. 3 is an explanatory diagram for describing an example of a second architecture of user plane in dual connectivity. With reference to FIG. 3, the control entity 30, the gateway 40, the terminal apparatus 300, the first base station 100, and the second base station 200 are illustrated. Here, in the dual connectivity of the terminal apparatus 300, the first base station 100 operates as a master base station, and the second base station 200 operates as a secondary base station. In the second architecture, there is an interface (e.g., S1-U) between the master base station (first base station 100) and the gateway 40, and there is also an interface (e.g., S1-U) between the secondary base station (second base station 200) and the gateway 40. Hence, user plane data for the terminal apparatus 300 is transmitted and/or received directly between the gateway 40 and the secondary base station (second base station 200) without passing through the master base station (first base station 100). In the second architecture, there is a bearer whose radio protocols are located in the secondary base station (second base station 200) to use resources of the secondary base station (second base station 200), and the bearer is called a secondary cell group (SCG) bearer.

3. First Example Embodiment

Next, the first example embodiment of the present invention is described with reference to FIG. 4 to FIG. 20.

3.1. Example of Configuration of First Base Station

Figure 4:
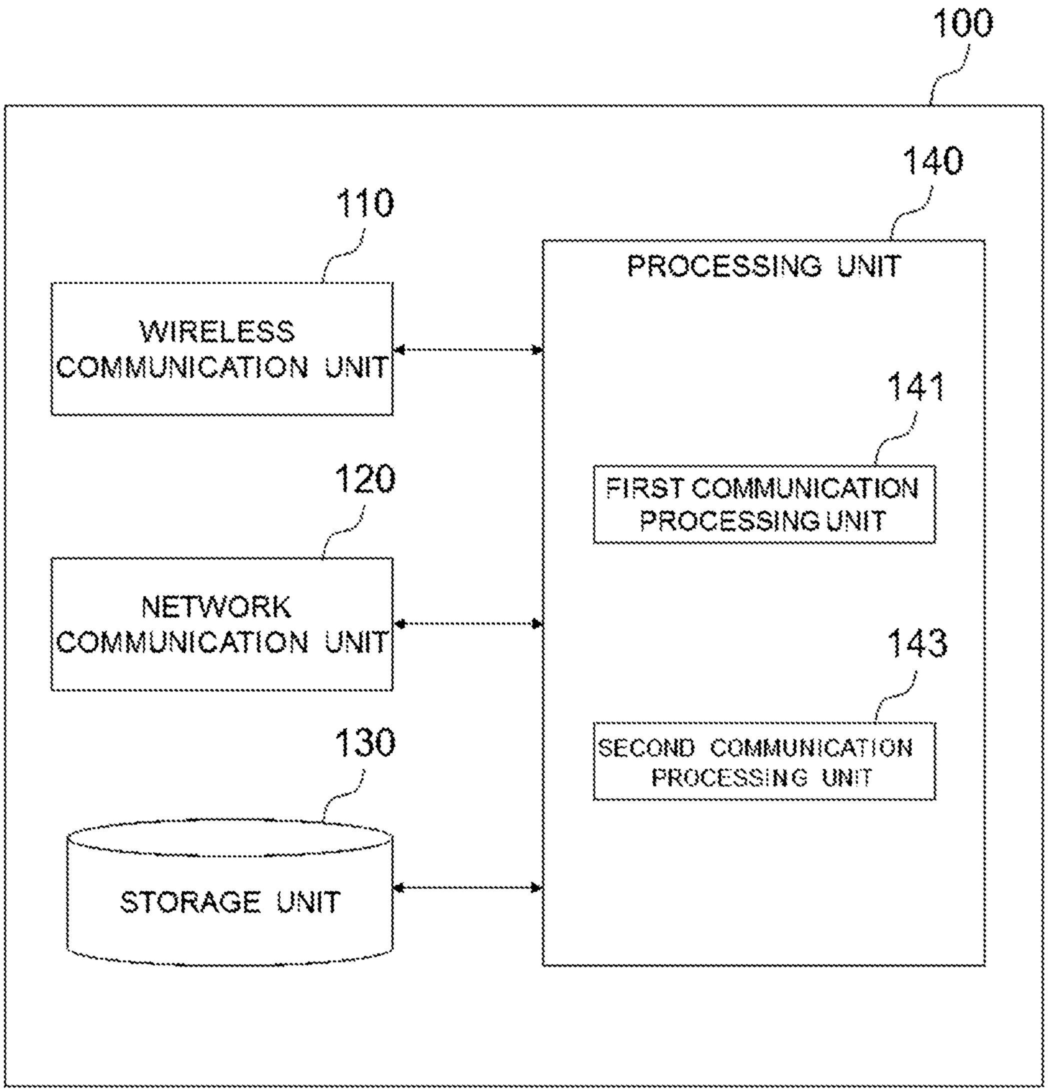
FIG. 4 is a block diagram illustrating an example of a schematic configuration of a first base station according to a first example embodiment.

First, with reference to FIG. 4, an example of a configuration of a first base station 100 according to the first example embodiment is described. FIG. 4 is a block diagram illustrating an example of a schematic configuration of the first base station 100 according to the first example embodiment. According to FIG. 4, the first base station 100 includes a wireless communication unit 110, a network communication unit 120, a storage unit 130, and a processing unit 140.

The wireless communication unit 110 transmits and/or receives signals wirelessly. For example, the wireless communication unit 110 receives a signal from a terminal apparatus and transmits a signal to a terminal apparatus.

The network communication unit 120 receives a signal from a backhaul and transmits a signal to the backhaul.

The storage unit 130 temporarily or permanently stores programs and parameters for operations of the first base station 100 as well as various data.

The processing unit 140 provides various functions of the first base station 100. The processing unit 140 includes a first communication processing unit 141 and a second communication processing unit 143. Note that the processing unit 140 may further include constituent components other than these constituent components. In other words, the processing unit 140 may also perform operations other than the operations of these constituent elements. Concrete operations of the first communication processing unit 141 and the second communication processing unit 143 will be described later in detail.

For example, the processing unit 140 (first communication processing unit 141) communicates with a terminal apparatus (e.g., the terminal apparatus 300) via the wireless communication unit 110. For example, the processing unit 140 (second communication processing unit 143) communicates with another network node(s) (e.g., the second base station 200, the control entity 30, and/or the gateway 40) via the network communication unit 120.

The wireless communication unit 110 may include an antenna, a radio frequency (RF) circuit, and the like. The network communication unit 120 may include a network adapter, a network interface card, and the like. The storage unit 130 may include a memory (e.g., a nonvolatile memory and/or volatile memory) and/or a hard disk, and the like. The processing unit 140 may include a baseband (BB) processor and/or other processors, and the like.

3.2. Example of Configuration of Second Base Station

Figure 5:
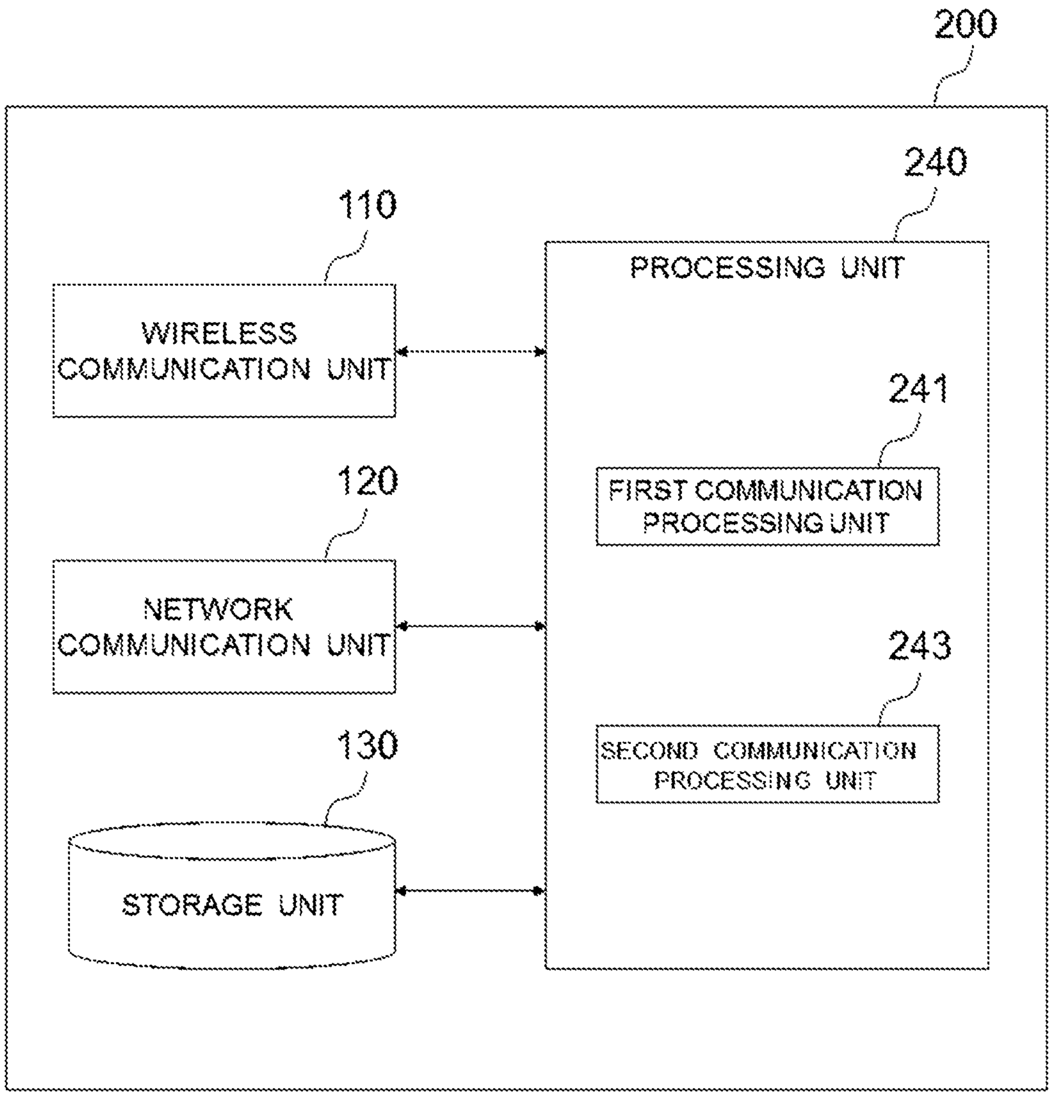
FIG. 5 is a block diagram illustrating an example of a schematic configuration of a second base station according to the first example embodiment.

Next, with reference to FIG. 5, an example of a configuration of a second base station 200 according to the first example embodiment is described. FIG. 5 is a block diagram illustrating an example of a schematic configuration of the second base station 200 according to the first example embodiment. According to FIG. 5, the second base station 200 includes a wireless communication unit 210, a network communication unit 220, a storage unit 230, and a processing unit 240.

The wireless communication unit 210 transmits and/or receives signals wirelessly. For example, the wireless communication unit 210 receives a signal from a terminal apparatus and transmits a signal to a terminal apparatus.

The network communication unit 220 receives a signal from a backhaul and transmits a signal to the backhaul.

The storage unit 230 temporarily or permanently stores programs and parameters for operations of the second base station 200 as well as various data.

The processing unit 240 provides various functions of the second base station 200. The processing unit 240 includes a first communication processing unit 241 and a second communication processing unit 243. Note that the processing unit 240 may further include constituent components other than these constituent components. In other words, the processing unit 240 may also perform operations other than the operations of these constituent elements. Concrete operations of the first communication processing unit 241 and the second communication processing unit 243 will be described later in detail.

For example, the processing unit 240 (first communication processing unit 241) communicates with a terminal apparatus (e.g., the terminal apparatus 300) via the wireless communication unit 210. For example, the processing unit 240 (second communication processing unit 243) communicates with another network node(s) (e.g., the first base station 100, the control entity 30, and/or the gateway 40) via the network communication unit 220.

The wireless communication unit 210 may include an antenna, a radio frequency (RF) circuit, and the like. The network communication unit 220 may include a network adapter, a network interface card, and the like. The storage unit 230 may include a memory (e.g., a nonvolatile memory and/or volatile memory) and/or a hard disk, and the like. The processing unit 240 may include a baseband (BB) processor and/or other processors, and the like.

3.3. Example of Configuration of Terminal Apparatus

Figure 6:
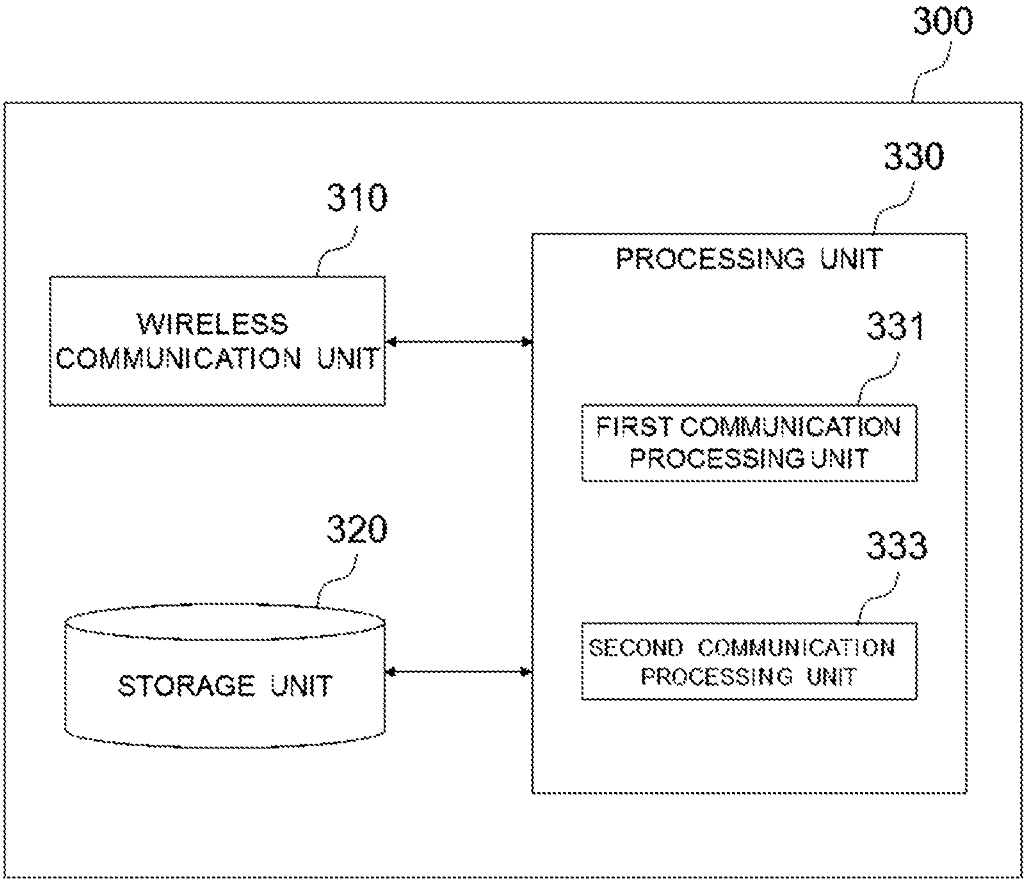
FIG. 6 is a block diagram illustrating an example of a schematic configuration of a terminal apparatus according to the first example embodiment.

Next, with reference to FIG. 6, an example of a configuration of a terminal apparatus 300 according to the first example embodiment is described. FIG. 6 is a block diagram illustrating an example of a schematic configuration of the terminal apparatus 300 according to the first example embodiment. According to FIG. 6, the terminal apparatus 300 includes a wireless communication unit 310, a storage unit 320, and a processing unit 330.

The wireless communication unit 310 transmits and/or receives signals wirelessly. For example, the wireless communication unit 310 receives a signal from a base station and transmits a signal to a base station.

The storage unit 320 temporarily or permanently stores programs and parameters for operations of the terminal apparatus 300 as well as various data.

The processing unit 330 provides various functions of the terminal apparatus 300. The processing unit 330 includes a first communication processing unit 331 and a second communication processing unit 333. Note that the processing unit 330 may further include constituent components other than these constituent components. In other words, the processing unit 330 may also perform operations other than the operations of these constituent elements. Concrete operations of the first communication processing unit 331 and the second communication processing unit 333 will be described later in detail.

For example, the processing unit 330 communicates with a base station (e.g., the first base station 100 and/or the second base station 200) via the wireless communication unit 310.

The wireless communication unit 310 may include an antenna, a radio frequency (RF) circuit, and the like. The storage unit 320 may include a memory (e.g., a nonvolatile memory and/or volatile memory) and/or a hard disk, and the like. The processing unit 330 may include a baseband (BB) processor and/or other processors, and the like.

3.4. Technical Features

Next, technical features of the first example embodiment are described with reference to FIG. 7 to FIG. 20.

(1) Dual Connectivity (SCG Bearer Option)

For example, the first base station 100 operates as a master base station in dual connectivity of the terminal apparatus 300, and the second base station 200 operates as a secondary base station in dual connectivity of the terminal apparatus 300. In this case, the first base station 100 (first communication processing unit 141) communicates with the terminal apparatus 300 over a MCG bearer for the dual connectivity of the terminal apparatus 300, and the second base station 200 (first communication processing unit 241) communicates with the terminal apparatus 300 over a SCG bearer for the dual connectivity. The terminal apparatus 300 (first communication processing unit 331) communicates with the first base station 100 (master base station) over the MCG bearer, and the terminal apparatus 300 (second communication processing unit 333) also communicates with the second base station 200 (secondary base station) over the SCG bearer.

For example, the first communication processing unit 141, the first communication processing unit 241, and the first communication processing unit 331 and the second communication processing unit 333 perform signal processing on a PDCP layer, RLC layer, MAC layer, and/or physical layer.

Note that the MCG bearer is a bearer whose radio protocols are located in the master base station (first base station 100) to use resources of the master base station (first base station 100). Moreover, the SCG bearer is a bearer whose radio protocols are located in the secondary base station (second base station 200) to use resources of the secondary base station (second base station 200).

(2) Request for Release of Secondary Base Station

The second base station 200 (second communication processing unit 243) transmits, to the master base station (first base station 100), a first message requesting a release of the secondary base station (second base station 200). The first base station 100 (second communication processing unit 143) then receives the first message from the secondary base station (second base station 200). A node that receives the first message requesting a release of the secondary base station (second base station 200) is basically not capable of rejecting this request. However, as will be described later, the first base station 100 (second communication processing unit 143) is capable of rejecting a request for a release of the secondary base station (second base station 200) initiated by the secondary base station (second base station 200).

For example, the first message is an SENB RELEASE REQUIRED message.

For example, the second base station 200 (first communication processing unit 241) detects inactivity of the terminal apparatus 300 in the SCG of the second base station 200 (secondary base station). The second base station 200 (first communication processing unit 241) then transmits the first message to the master base station (first base station 100) due to the inactivity of the terminal apparatus 300 in the SCG.

Note that the release of the secondary base station (second base station 200), for example, includes that the secondary base station (second base station 200) releases resources for the terminal apparatus 300. Alternatively, the release of the secondary base station (second base station 200) may mean that the secondary base station (second base station 200) releases resources for the terminal apparatus 300.

(3) Rejection of Release of Secondary Base Station

In particular, in the first example embodiment, the first base station 100 (second communication processing unit 143) transmits, to the secondary base station (second base station 200), a second message indicating a rejection of the release. The second base station 200 (second communication processing unit 243) then receives the second message from the master base station (first base station 100). In other words, the first base station 100 (second communication processing unit 143) rejects the release and notifies the secondary base station (second base station 200) of the rejection of the release.

(a) Second Message

As an example, the second message is an SENB RELEASE CONFIRM message including an information element (IE) indicating the rejection of the release. For example, the information element is a Release Reject IE. This makes it possible, for example, to notify the secondary base station of the rejection of the release using an existing message (to which the information element is added).

As another example, the second message may be an SENB RELEASE REJECT message. This makes it possible, for example, to notify the secondary base station of the rejection of the release without modifying any existing message (i.e., using a new message).

(b) Condition

For example, when the release is not accepted, the first base station 100 (second communication processing unit 143) transmits the second message to the secondary base station (second base station 200). Hence, when the release is not accepted, the second base station 200 (second communication processing unit 243) receives the second message from the master base station (first base station 100).

When the release is accepted, on the other hand, for example, the first base station 100 (second communication processing unit 143) transmits a third message indicating confirmation of the release, to the secondary base station (second base station 200). Hence, when the release is accepted, the second base station 200 (second communication processing unit 243) receives the third message from the master base station (first base station 100). For example, the third message is an SENB RELEASE CONFIRM message.

In this way, for example, it is possible to perform a release or to reject a release when needed.

As has been described, a message indicating the rejection of the release is transmitted and received. This, for example, makes it possible to prevent releases of the secondary base station more than necessary. As a result, the occurrence of the procedure for adding the secondary base station can be reduced. In other words, the occurrence of unnecessary operations in the case with a SCG bearer can be reduced.

(4) Others (a) Wait Time Information

For example, the second message includes wait time information indicating a time period for waiting before the secondary base station (second base station 200) initiates the next release procedure. Specifically, the first base station 100 (second communication processing unit 143) transmits the wait time information in the second message, to the secondary base station (second base station 200). For example, the wait time information is a Time to wait IE.

For example, the second base station 200 (second communication processing unit 243) waits on the basis of the wait time information. More specifically, for example, the second base station 200 (second communication processing unit 243) waits for the time period indicated by the wait time information before initiating the next release procedure (i.e., before transmitting the next first message requesting a release of the secondary base station (second base station 200), to the master base station (first base station 100)).

This makes it possible, for example, to avoid that a release of the secondary base station is further requested immediately after a rejection of a release of the secondary base station.

(b) Stop Information

For example, the first base station 100 (second communication processing unit 143) transmits stop information indicating stop of a function related to inactivity of the terminal apparatus 300, to the secondary base station (second base station 200).

For example, the second base station 200 (second communication processing unit 243) receives the stop information from the master base station (first base station 100). The second base station 200 (at least one of the first communication processing unit 241 and the second communication processing unit 243) then stops the function on the basis of the stop information. Examples of the function include functions for observation of activity and/or inactivity of the terminal apparatus 300, detection of inactivity of the terminal apparatus 300, and/or a request for a release due to the inactivity (i.e. transmission of a message requesting a release of the secondary base station (second base station 200)), and the like.

This, for example, makes it possible to avoid requests to release the secondary base station.

Example of Stop Information

For example, the stop information is a User Inactivity function Indication IE indicating the stop described above. More specifically, for example, the User Inactivity function Indication IE indicates either "on" or "off", and the stop information is a User Inactivity function Indication IE indicating "off".

Transmission Using Message

As an example, the second message includes the stop information. Specifically, the first base station 100 (second communication processing unit 143) transmits the stop information in the second message, to the secondary base station (second base station 200). This, for example, makes it possible to avoid that a release of the secondary base station is requested after the release is actually requested.

As another example, the first base station 100 (second communication processing unit 143) may transmit, to the secondary base station (second base station 200), an SENB ADDITION REQUEST message including the stop information or an SENB MODIFICATION REQUEST message including the stop information. This, for example, makes it possible to avoid in advance that a release of the secondary base station is requested.

(c) Behaviour-Related Information

Transmission of Behaviour-Related Information

The first base station 100 (second communication processing unit 143) may transmit, to the secondary base station (second base station 200), a fourth message including behaviour-related information related to behavior of the terminal apparatus 300. The fourth message may be an SENB ADDITION REQUEST message or an SENB MODIFICATION REQUEST message.

The behaviour-related information may be information provided to the first base station 100 from the control entity 30. Specifically, the behavior-related information may be an Expected UE Behaviour IE.

This, for example, also enables the secondary base station (second base station 200) not having any interface with the control entity 30 (e.g., MME) to acquire the behaviour-related information.

Operation Based on Behaviour-Related Information

The second base station 200 may transmit, to the master base station (first base station 100), the first message requesting a release of the secondary base station (second base station 200), on the basis of the behaviour-related information.

More specifically, the second base station 200 may set an inactivity timer of the terminal apparatus 300 at an appropriate value on the basis of the behaviour-related information. Then, when there is no data communication by the terminal apparatus 300 in the SCG (or when the amount of data communication is small) by the time the inactivity timer expires, the second base station 200 may detect inactivity of the terminal apparatus 300. The terminal apparatus 300 may thereafter transmit, to the master base station (first base station 100), the first message requesting a release of the secondary base station (second base station 200).

This, for example, enables the secondary base station (second base station 200) to request a release more appropriately.

(5) Flow of Processing and Messages

A flow of processing and messages in the first example embodiment will be described below. In the example described below, the first base station 100 is an MeNB, and the second base station is an SeNB.

(a) Processing Related to Release of SeNB (a-1) First Example

Figure 7:
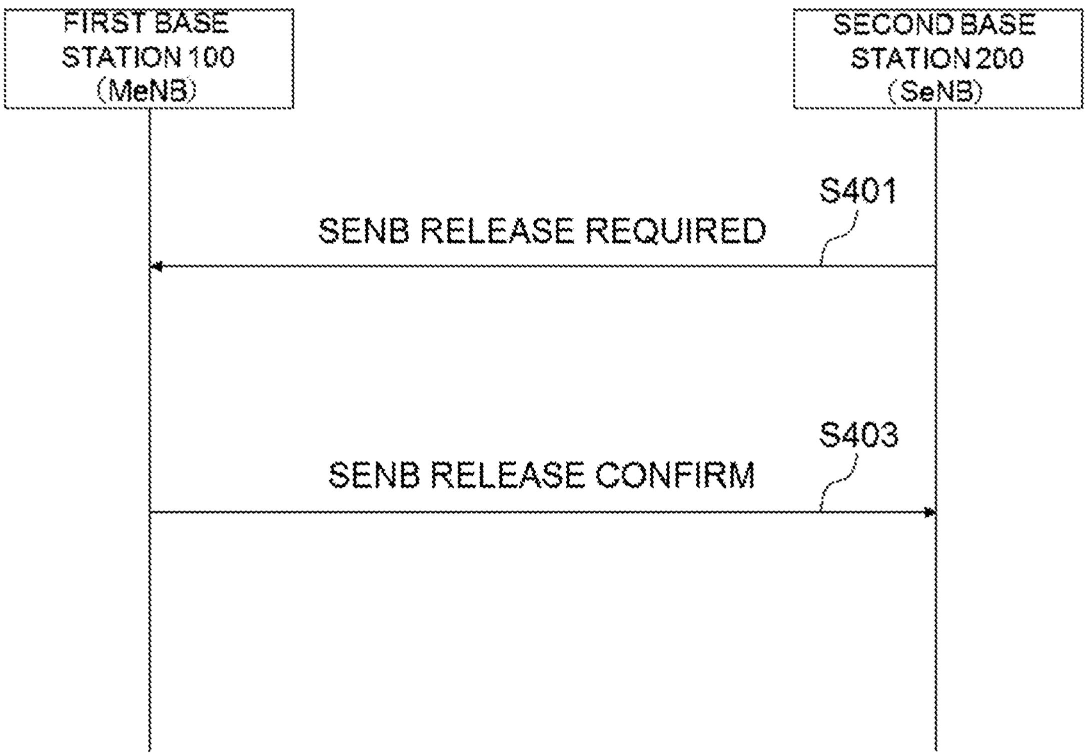
FIG. 7 is a sequence diagram illustrating a first example of a schematic flow of processing related to a release of SeNB in the first example embodiment.

FIG. 7 is a sequence diagram illustrating a first example of a schematic flow of processing related to a release of SeNB in the first example embodiment.

The second base station 200 (SeNB) transmits an SENB RELEASE REQUIRED message to the first base station 100 (MeNB) (S401).

The first base station 100 (MeNB) transmits an SENB RELEASE CONFIRM message to the second base station (SeNB) (S403).

SENB RELEASE CONFIRM Message

For example, the SENB RELEASE CONFIRM message is defined as illustrated in FIG. 8 or FIG. 9.

In particular, when the release of the second base station 200 (SeNB) is not accepted, the SENB RELEASE CONFIRM message includes an Release Reject IE as illustrated in FIG. 8 and FIG. 9. When the release of the second base station 200 (SeNB) is accepted, on the other hand, the SENB RELEASE CONFIRM message does not include the Release Reject IE.

For example, the Release Reject IE directly indicates that the release is rejected, as illustrated in FIG. 8. Alternatively, the Release Reject IE may indicate an appropriate Cause value as illustrated in FIG. 9. The appropriate Cause value may be Release Reject among various Cause values illustrated in FIG. 10, or Release Reject may be defined as illustrated in FIG. 11.

In addition, for example, the SENB RELEASE CONFIRM message may include the Time to wait IE and/or the User Inactivity function Indication IE. For example, the Time to wait IE is defined as illustrated in FIG. 12, and the User Inactivity function Indication IE is defined as illustrated in FIG. 13.

(a-2) Second Example

Figures 13, 14:
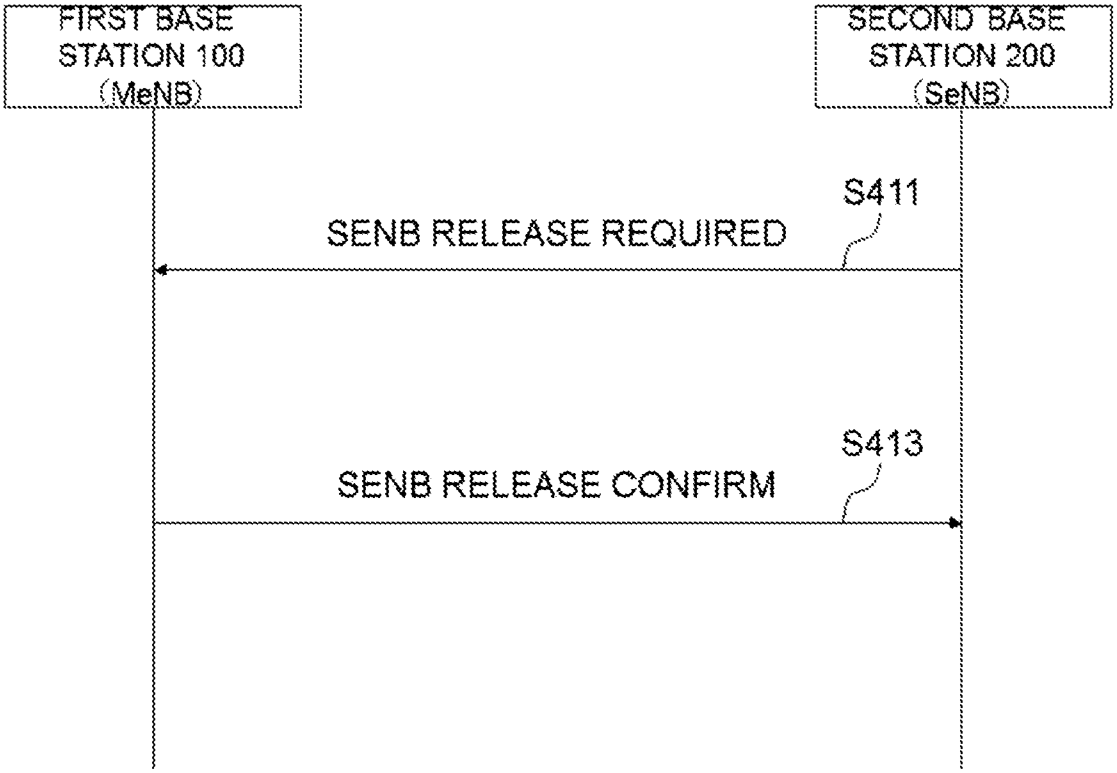
FIG. 13 is an explanatory diagram for describing an example of a User Inactivity function Indication IE.
FIG. 14 is a first sequence diagram illustrating a second example of the schematic flow of the processing related to a release in the first example embodiment.
Figure 15:
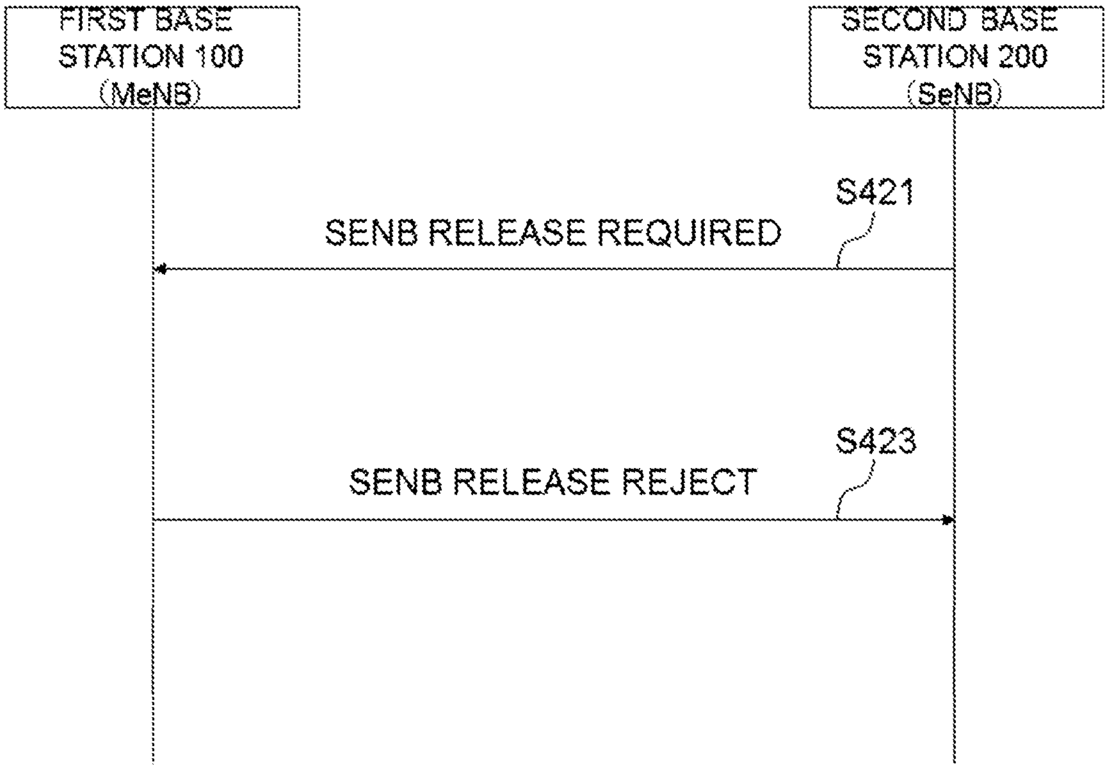
FIG. 15 is a second sequence diagram illustrating the second example of the schematic flow of the processing related to a release in the first example embodiment.

FIG. 14 and FIG. 15 are sequence diagrams illustrating a second example of the schematic flow of the processing related to a release in the first example embodiment.

Case where Release of SeNB is Accepted

As illustrated in FIG. 14, the second base station 200 (SeNB) transmits an SENB RELEASE REQUIRED message to the first base station (MeNB) (S411).

When the release of the second base station 200 (SeNB) is accepted, the first base station 100 (MeNB) transmits an SENB RELEASE CONFIRM message to the second base station (SeNB) (S413).

Case where Release of SeNB is not Accepted

As illustrated in FIG. 15, the second base station 200 (SeNB) transmits an SENB RELEASE REQUIRED message to the first base station (MeNB) (S421).

When the release of the second base station 200 (SeNB) requested by the second base station 200 (SeNB) is not accepted, the first base station 100 (MeNB) transmits an SENB RELEASE REJECT message to the second base station 200 (SeNB) (S423).

SENB RELEASE REJECT Message

For example, the SENB RELEASE REJECT message is defined as illustrated in FIG. 16.

For example, the SENB RELEASE REJECT message may include the Time to wait IE and/or the User Inactivity function Indication IE. For example, the Time to wait IE is defined as illustrated in FIG. 12, and the User Inactivity function Indication IE is defined as illustrated in FIG. 13.

(b) Processing Related to Addition of SeNB (b-1) First Example

FIG. 17 is a sequence diagram illustrating an example of a schematic flow of processing related to addition of SeNB in the first example embodiment.

The first base station 100 (MeNB) transmits an SENB ADDITION REQUEST message to the second base station 200 (SeNB) (S431).

The second base station 200 (SeNB) then transmits an SENB ADDITION REQUEST ACKNOWLEDGE message to the first base station 100 (MeNB) (S433).

Thereafter, reconfiguration (S435-S439) for addition of the SeNB (i.e., second base station 200) and a random access procedure (S441) are performed. Moreover, data forwarding (S443, S445) and/or a path update procedure (S450) is performed when needed.

SENB ADDITION REQUEST Message

For example, the SENB ADDITION REQUEST message is defined as illustrated in FIG. 18.

For example, the SENB ADDITION REQUEST message may include the User Inactivity function Indication IE. For example, the User Inactivity function Indication IE is defined as illustrated in FIG. 13.

Note that the SENB ADDITION REQUEST message may include the Expected UE Behaviour IE.

(c) Processing Related to SeNB Modification

FIG. 19 is a sequence diagram illustrating an example of a schematic flow of processing related to modification of SeNB in the first example embodiment.

The first base station 100 (MeNB) transmits an SENB MODIFICATION REQUEST message to the second base station 200 (SeNB) (S461).

The second base station 200 (SeNB) then transmits an SENB MODIFICATION REQUEST ACKNOWLEDGE message to the first base station 100 (MeNB) (S463).

Thereafter, reconfiguration (S465-S469) related to SeNB (i.e., second base station 200) and a random access procedure (S471) are performed. Moreover, data forwarding (S473, S475) and/or a path update procedure (S480) is performed when needed.

SENB MODIFICATION REQUEST Message

For example, the SENB MODIFICATION REQUEST message is defined as illustrated in FIG. 20.

For example, an SENB MODIFICATION REQUEST message may include the User Inactivity function Indication IE. For example, the User Inactivity function Indication IE is defined as illustrated in FIG. 13.

Note that the SENB MODIFICATION REQUEST message may include the Expected UE Behaviour IE.

4. Second Example Embodiment

Next, the second example embodiment of the present invention is described with reference to FIG. 21 to FIG. 24.

4.1. Example of Configuration of First Base Station

First, with reference to FIG. 21, an example of a configuration of a first base station 100 according to the second example embodiment is described. FIG. 21 is a block diagram illustrating an example of a schematic configuration of the first base station 100 according to the second example embodiment. According to FIG. 21, the first base station 100 includes a first communication processing unit 151 and a second communication processing unit 153.

Concrete operations of the first communication processing unit 151 and the second communication processing unit 153 will be described later.

The first communication processing unit 151 may be implemented by a baseband (BB) processor and/or other processors, and the like. The second communication processing unit 153 may be implemented by a processor and the like.

4.2. Example of Configuration of Second Base Station

Figure 22:
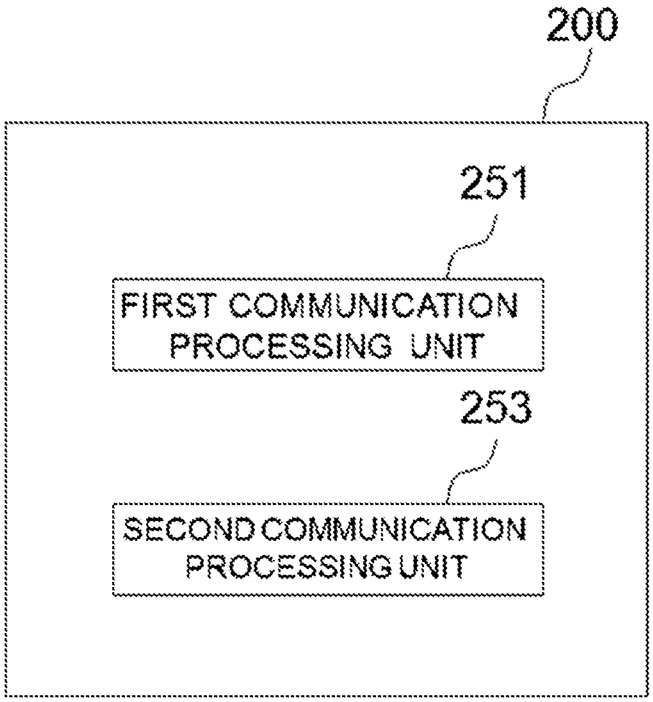
FIG. 22 is a block diagram illustrating an example of a schematic configuration of a second base station according to the second example embodiment.

Next, with reference to FIG. 22, an example of a configuration of a second base station 200 according to the second example embodiment is described. FIG. 22 is a block diagram illustrating an example of a schematic configuration of the second base station 200 according to the second example embodiment. According to FIG. 22, the second base station 200 includes a first communication processing unit 251 and a second communication processing unit 253.

Concrete operations of the first communication processing unit 251 and the second communication processing unit 253 will be described later.

The first communication processing unit 251 may be implemented by a baseband (BB) processor and/or other processors, and the like. The second communication processing unit 253 may be implemented by a processor and the like.

4.3. Example of Configuration of Terminal Apparatus

Figure 23:
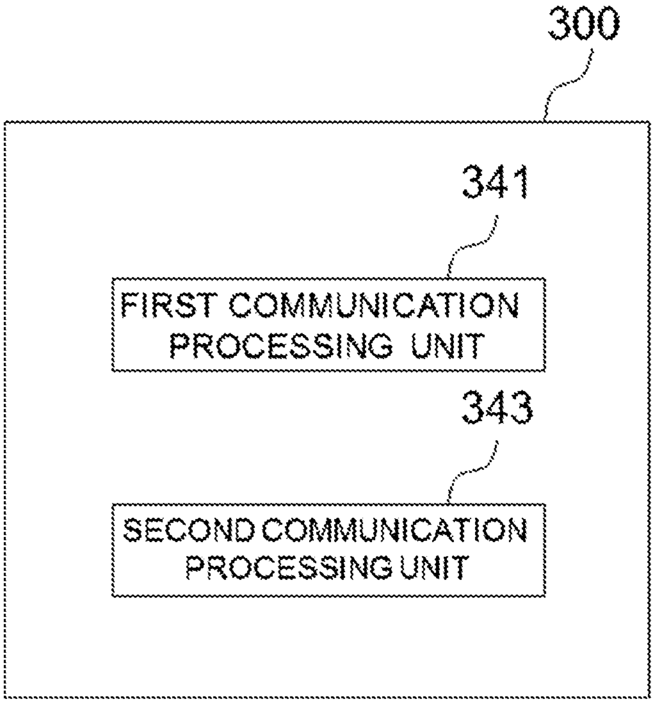
FIG. 23 is a block diagram illustrating an example of a schematic configuration of a terminal apparatus according to the second example embodiment.

Next, with reference to FIG. 23, an example of a configuration of a terminal apparatus 300 according to the second example embodiment is described. FIG. 23 is a block diagram illustrating an example of a schematic configuration of the terminal apparatus 300 according to the second example embodiment. According to FIG. 23, the terminal apparatus 300 includes a first communication processing unit 341 and a second communication processing unit 343.

Concrete operations of the first communication processing unit 341 and the second communication processing unit 343 will be described later.

Each of the first communication processing unit 341 and the second communication processing unit 343 may be implemented by a baseband (BB) processor and/or other processors, and the like.

4.4. Technical Features

Next, technical features of the second example embodiment are described with reference to FIG. 24.

(1) Dual Connectivity (SCG Bearer Option)

For example, the first base station 100 operates as a master base station in dual connectivity of the terminal apparatus 300, and the second base station 200 operates as a secondary base station in the dual connectivity of the terminal apparatus 300. In this case, the first base station 100 (first communication processing unit 151) communicates with the terminal apparatus 300 over a MCG bearer for the dual connectivity of the terminal apparatus 300, and the second base station 200 (first communication processing unit 251) communicates with the terminal apparatus 300 over a SCG bearer for the dual connectivity. The terminal apparatus 300 (first communication processing unit 341) communicates with the first base station 100 (master base station) over the MCG bearer, and the terminal apparatus 300 (second communication processing unit 343) also communicates with the second base station 200 (secondary base station) over the SCG bearer.

More concrete descriptions of these respects are the same as the descriptions for the first example embodiment (except for the difference in reference signs), for example. Hence, overlapping descriptions are omitted here.

(2) Request of Release of Secondary Base Station

The second base station 200 (second communication processing unit 253) transmits, to the master base station (first base station 100), a first message requesting a release of the secondary base station (second base station 200). The first base station 100 (second communication processing unit 153) then receives the first message from the secondary base station (second base station 200).

For example, the first message is an SENB RELEASE REQUIRED message.

More concrete descriptions of these respects are the same as the descriptions for the first example embodiment (except for the difference in reference signs), for example. Hence, overlapping descriptions are omitted here.

(3) Rejection of Release of Secondary Base Station

In particular, in the second example embodiment, the first base station 100 (second communication processing unit 143) transmits, to the secondary base station (second base station 200), a second message indicating a rejection of the release. The second base station 200 (second communication processing unit 243) then receives the second message from the master base station (first base station 100). In other words, the first base station 100 (second communication processing unit 143) rejects the release and notifies the secondary base station (second base station 200) of the rejection of the release.

More concrete descriptions of these respects are the same as the descriptions for the first example embodiment (except for the difference in reference signs), for example. Hence, overlapping descriptions are omitted here.

As has been described, the message indicating the rejection of the release is transmitted and received. This, for example, makes it possible to prevent that the secondary base station is released more than necessary. As a result, the occurrence of the procedure for adding the secondary base station can be reduced. In other words, the occurrence of unnecessary operations in the case with a SCG bearer can be reduced.

(4) Flow of Processing

Figure 24:
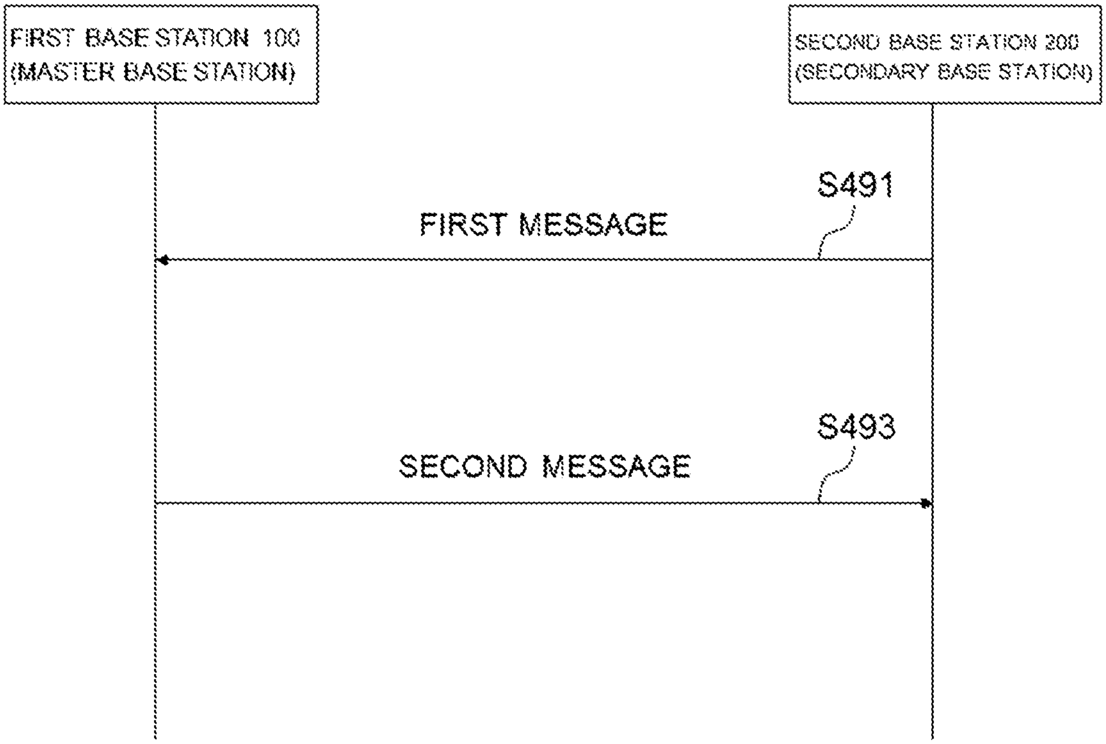
FIG. 24 is a sequence diagram illustrating an example of a schematic flow of processing related to a release of a secondary base station in the second example embodiment.

FIG. 24 is a sequence diagram illustrating an example of a schematic flow of processing related to a release of a secondary base station in the second example embodiment. In this example, the first base station 100 is a master base station, and the second base station is a secondary base station.

The second base station 200 transmits, to the master base station (first base station 100), a first message requesting a release of the secondary base station (second base station 200) (S491). The first base station 100 then receives the first message from the secondary base station (second base station 200).

The first base station 100 transmits, to the secondary base station (second base station 200), a second message indicating the rejection of the release (S493). The second base station 200 then receives the second message from the master base station (first base station 100).

5. Third Example Embodiment

Next, the third example embodiment of the present invention is described with reference to FIG. 25 to FIG. 34.

5.1. Example of Configuration of First Base Station

Figure 25:
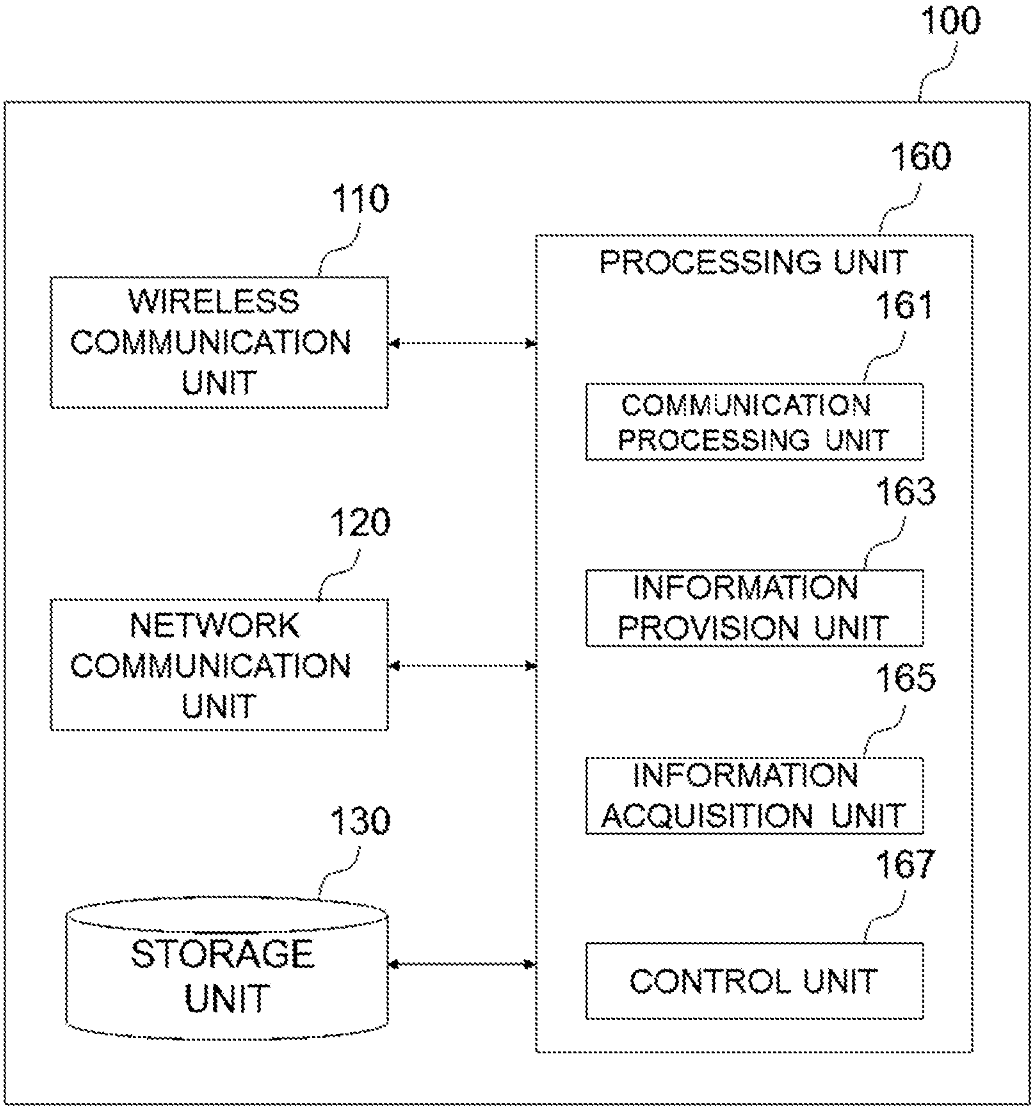
FIG. 25 is a block diagram illustrating an example of a schematic configuration of a first base station according to a third example embodiment.

First, with reference to FIG. 25, an example of a configuration of a first base station 100 according to the third example embodiment is described. FIG. 25 is a block diagram illustrating an example of a schematic configuration of the first base station 100 according to the third example embodiment. According to FIG. 25, the first base station 100 includes a wireless communication unit 110, a network communication unit 120, a storage unit 130, and a processing unit 160.

Descriptions of the wireless communication unit 110, the network communication unit 120, and the storage unit 130 are the same as the descriptions for the first example embodiment, for example. Hence, overlapping descriptions are omitted here.

The processing unit 160 provides various functions of the first base station 100. The processing unit 160 includes a communication processing unit 161, an information provision unit 163, an information acquisition unit 165, and a control unit 167. Note that the processing unit 160 may further include constituent components other than these constituent components. In other words, the processing unit 160 may also perform operations other than the operations of these constituent elements. Concrete operations of the communication processing unit 161, the information provision unit 163, the information acquisition unit 165, and the control unit 167 will be described later in detail.

For example, the processing unit 160 communicates with a terminal apparatus via the wireless communication unit 110 and communicates with another node(s) (e.g., the second base station 200, the control entity 30, and/or the gateway 40) via the network communication unit 120.

The processing unit 160 may include a baseband (BB) processor and/or other processors, and the like.

5.2. Example of Configuration of Second Base Station

Figure 26:
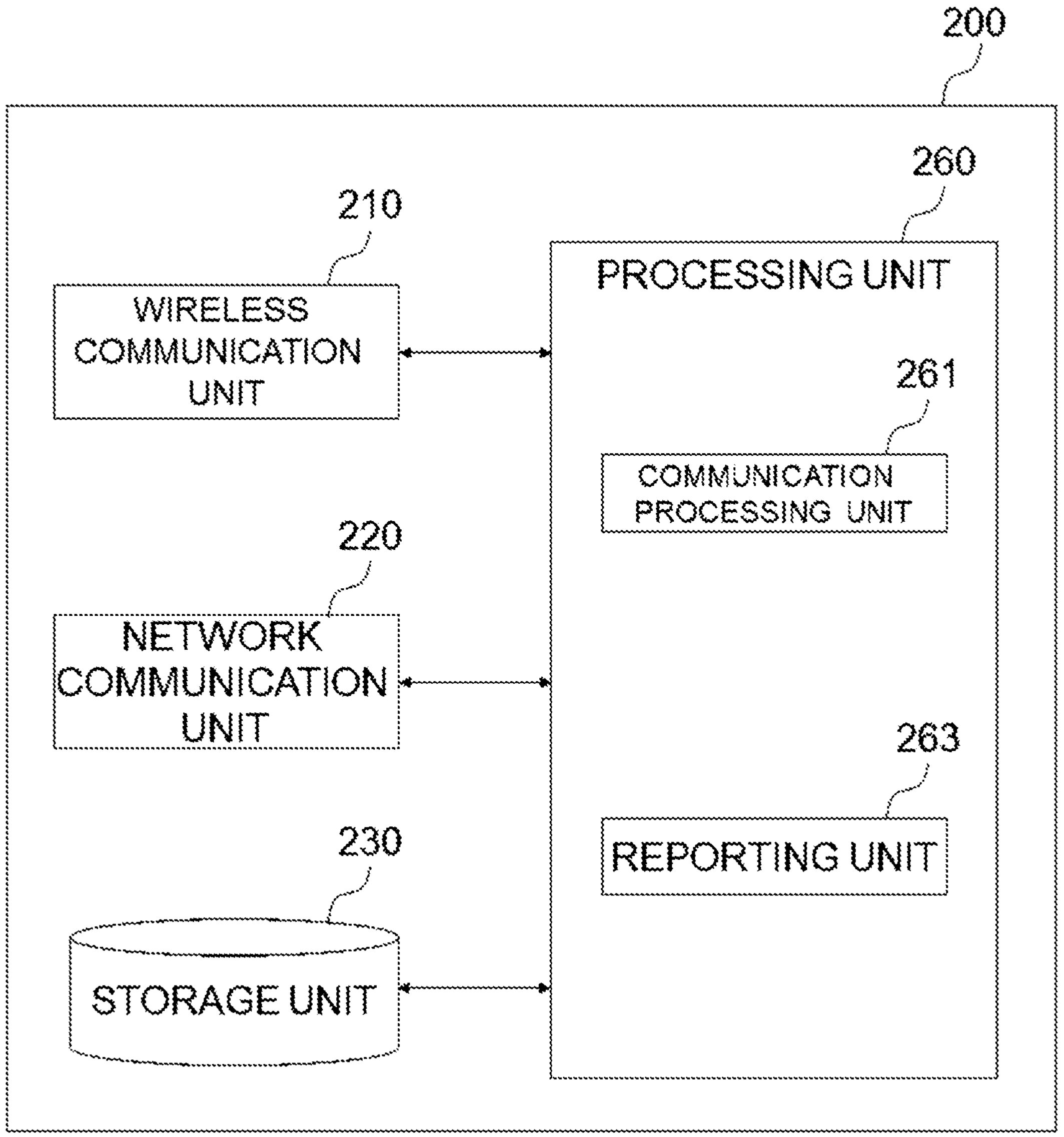
FIG. 26 is a block diagram illustrating an example of a schematic configuration of a second base station according to the third example embodiment.

First, with reference to FIG. 26, an example of a configuration of a second base station 200 according to the third example embodiment is described. FIG. 26 is a block diagram illustrating an example of a schematic configuration of the second base station 200 according to the third example embodiment. According to FIG. 26, the second base station 200 includes a wireless communication unit 210, a network communication unit 220, a storage unit 230, and a processing unit 260.

Descriptions of the wireless communication unit 210, the network communication unit 220, and the storage unit 230 are the same as the descriptions for the first example embodiment, for example. Hence, overlapping descriptions are omitted here.

The processing unit 260 provides various functions of the second base station 200. The processing unit 260 includes a communication processing unit 261 and a reporting unit 263. Note that the processing unit 260 may further include constituent components other than these constituent components. In other words, the processing unit 260 may also perform operations other than the operations of these constituent elements. Concrete operations of the communication processing unit 261 and the reporting unit 263 will be described later in detail.

For example, the processing unit 260 communicates with a terminal apparatus via the wireless communication unit 210 and communicates with another node(s) (e.g., the first base station 100, the control entity 30, and/or the gateway 40) via the network communication unit 220.

The processing unit 260 may include a baseband (BB) processor and/or other processors, and the like.

5.3. Example of Configuration of Terminal Apparatus

Figures 27, 28:
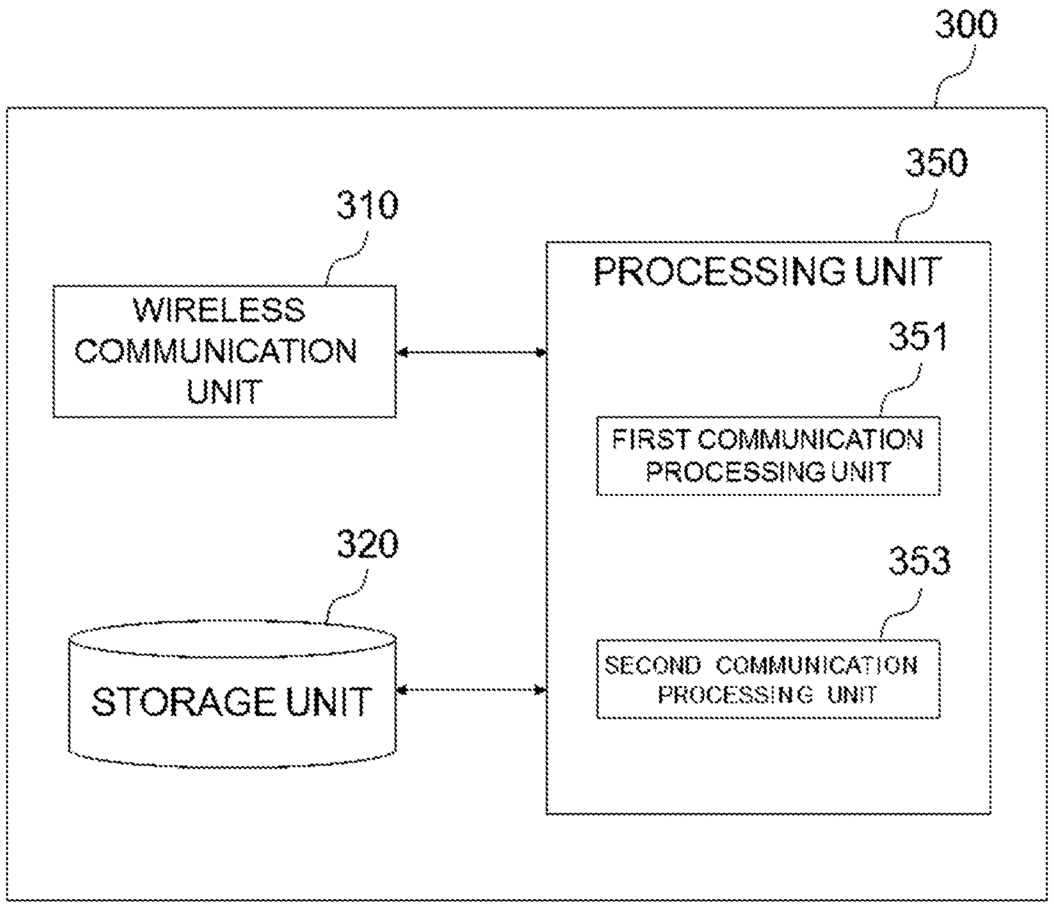
FIG. 27 is a block diagram illustrating an example of a schematic configuration of a terminal apparatus according to the third example embodiment.
FIG. 28 is an explanatory diagram for describing an example of a User Inactivity Status IE.

Next, with reference to FIG. 27, an example of a configuration of a terminal apparatus 300 according to the third example embodiment is described. FIG. 27 is a block diagram illustrating an example of a schematic configuration of the terminal apparatus 300 according to the third example embodiment. According to FIG. 27, the terminal apparatus 300 includes a wireless communication unit 310, a storage unit 320, and a processing unit 350.

Descriptions of the wireless communication unit 310 and the storage unit 320 are the same as the descriptions for the first example embodiment, for example. Hence, overlapping descriptions are omitted here.

The processing unit 350 provides various functions of the terminal apparatus 300. The processing unit 350 includes a first communication processing unit 351 and a second communication processing unit 353. Note that the processing unit 350 may further include constituent components other than these constituent components. In other words, the processing unit 350 may also perform operations other than the operations of these constituent elements. Concrete operations of the first communication processing unit 351 and the second communication processing unit 353 will be described later in detail.

For example, the processing unit 350 communicates with a base station (e.g., the first base station 100 and/or the second base station 200) via the wireless communication unit 310.

The processing unit 350 may include a baseband (BB) processor and/or other processors, and the like.

5.4. Technical Features

Next, technical features according to the third example embodiment are described with reference to FIG. 28 to FIG. 34.

(1) Dual Connectivity (SCG Bearer Option)

For example, the first base station 100 operates as a master base station in dual connectivity of the terminal apparatus 300, and the second base station 200 operates as a secondary base station in the dual connectivity of the terminal apparatus 300. In this case, the first base station 100 (communication processing unit 161) communicates with the terminal apparatus 300 over a MCG bearer for the dual connectivity of the terminal apparatus 300, and the second base station 200 (communication processing unit 261) communicates with the terminal apparatus 300 over a SCG bearer for the dual connectivity. The terminal apparatus 300 (first communication processing unit 351) communicates with the first base station 100 (master base station) over the MCG bearer, and the terminal apparatus 300 (second communication processing unit 353) also communicates with the second base station 200 (secondary base station) over the SCG bearer.

For example, the communication processing unit 161, the communication processing unit 261, and the first communication processing unit 351 and the second communication processing unit 353 perform signal processing on a PDCP layer, RLC layer, MAC layer, and/or physical layer.

Note that the MCG bearer is a bearer whose radio protocols are located in the master base station (first base station 100) to use resources of the master base station (first base station 100). Moreover, the SCG bearer is a bearer whose radio protocols are located in the secondary base station (second base station 200) to use resources of the secondary base station (second base station 200).

(2) Report of Activity-Related Information

In particular, in the third example embodiment, the second base station 200 (reporting unit 263) reports, to the master base station (first base station 100), activity-related information related to an activity of the terminal apparatus 300 in a SCG of the secondary base station (second base station 200). The first base station 100 (information acquisition unit 165) then acquires the activity-related information reported by the secondary base station (second base station 200).

This enables, for example, the master base station (first base station 100) to know activities of the terminal apparatus 300 in the SCG and to determine whether to release the secondary base station (second base station 200) in consideration of the activities of the terminal apparatus 300 in both the MCG and the SCG. Hence, for example, when the terminal apparatus 300 is active in the MCG, even though the terminal apparatus 300 is inactive in the SCG, and the secondary base station is still needed accordingly, the secondary base station is not released, whereby the occurrence of unnecessary operations (e.g., the procedure for adding the secondary base station) can be reduced.

(a) Messages

For example, the second base station 200 (reporting unit 263) transmits, to the master base station (first base station 100), a message including the activity-related information.

As an example, the second base station 200 (reporting unit 263) transmits, to the master base station (first base station 100), an SENB MODIFICATION REQUIRED message including the activity-related information. Such usage of an existing message makes it possible, for example, to make a report in an existing procedure.

Note that the message including the activity-related information is, of course, not limited to the SENB MODIFICATION REQUIRED message and may be another message.

(b) Timing for Report

As a first example, after a request of a report by the first base station 100 (the master base station), the second base station 200 (the secondary base station) reports the activity-related information to the master base station (first base station 100). Such a report may be referred to as an on demand report.

As a second example, the second base station 200 (the secondary base station) periodically reports the activity-related information to the master base station (first base station 100). Such a report may be referred to as a periodic report.

As a third example, when the second base station 200 (the secondary base station) detects inactivity of the terminal apparatus 300 in the SCG (e.g., when there is no data communication by the terminal apparatus 300 in the SCG by the time the inactivity timer of the terminal apparatus 300 expires), the second base station 200 (the secondary base station) reports the activity-related information to the master base station (first base station 100). Such a report may be referred to as an event trigger report.

(c) Activity-Related Information

Content

For example, the activity-related information is information indicating whether the terminal apparatus 300 is active or inactive in the SCG. Alternatively, the activity-related information may be information simply indicating that the terminal apparatus 300 is inactive in the SCG.

For example, the activity-related information is a User Inactivity Status IE. Concretely, for example, the User Inactivity Status IE is defined as illustrated in FIG. 28.

Such information, for example, enables the master base station (first base station 100) to know activities of the terminal apparatus 300 in a case with a SCG bearer.

Generation

The second base station 200 (the secondary base station) observes activities of the terminal apparatus 300 in the SCG (e.g., data communication by the terminal apparatus 300 in the SCG). The second base station 200 (the secondary base station) then generates the activity-related information on the basis of a result of the observation.

(d) Behaviour-Related Information

Provision of Behaviour-Related Information

For example, the first base station 100 (information provision unit 163) provides, to the secondary base station (second base station 200), behaviour-related information related to behavior of the terminal apparatus 300. For example, the behavior-related information may be the Expected UE Behaviour IE. The behaviour-related information is information provided from the control entity 30 to the first base station 100.

This, for example, also enables the secondary base station (second base station 200) not having any interface with the control entity 30 (e.g., MME) for the terminal apparatus 300 to acquire the behaviour-related information.

For example, the first base station 100 determines the value of the inactivity timer on the basis of the behaviour-related information (e.g., Expected UE Behaviour IE) acquired from the control entity 30 and sets the inactivity timer at the determined value. Furthermore, the first base station 100 (information provision unit 163) may provide the second base station 200 with timer information (e.g., User Inactivity Timer IE) indicating the value of the inactivity timer. This, for example, enables the first base station 100 and the second base station 200 to observe activities of the terminal apparatus 300 using the same timer value.

Report Based on Behaviour-Related Information

For example, the second base station 200 (reporting unit 263) reports the activity-related information to the master base station (first base station 100) on the basis of the behaviour-related information. More specifically, for example, the second base station 200 (reporting unit 263) may set the inactivity timer of the terminal apparatus 300 at an appropriate value on the basis of the behaviour-related information. Then, when there is no data communication by the terminal apparatus 300 in the SCG (or when the amount of data communication is small) by the time the inactivity timer expires, the second base station 200 (reporting unit 263) reports the activity-related information to the master base station (first base station 100). Note that the second base station 200 (reporting unit 263) may, of course, make an on demand report and/or a periodic report together with such an event trigger report (or instead of such an event trigger report).

This, for example, enables the secondary base station (second base station 200) to make a more appropriate report.

Note that the second base station 200 (reporting unit 263) may provide the first base station 100 with timer information (e.g., User Inactivity Timer IE) indicating the value of the inactivity timer (determined by the second base station 200).

(e) Flow of Processing

A flow of processing and messages in the third example embodiment will be described below. In the example described below, the first base station 100 is an MeNB, and the second base station is an SeNB.

(e-1) First Processing

FIG. 29 is a sequence diagram illustrating an example of a schematic flow of first processing in the third example embodiment. The first processing is processing related to modification of SeNB and includes a report of activity-related information (e.g., User Inactivity Status IE) by the SeNB.

The second base station 200 (SeNB) transmits an SENB MODIFICATION REQUIRED message to the first base station (MeNB) (S501).

The first base station 100 (MeNB) transmits an SENB MODIFICATION CONFIRM message to the second base station (SeNB) (S503).

SENB MODIFICATION REQUIRED Message

For example, the SENB MODIFICATION REQUIRED message is defined as illustrated in FIG. 30.

In particular, the SENB MODIFICATION REQUIRED message includes the User Inactivity Status IE. For example, the User Inactivity Status IE is defined as illustrated in FIG. 28.

(e-2) Second Processing

Figure 31:
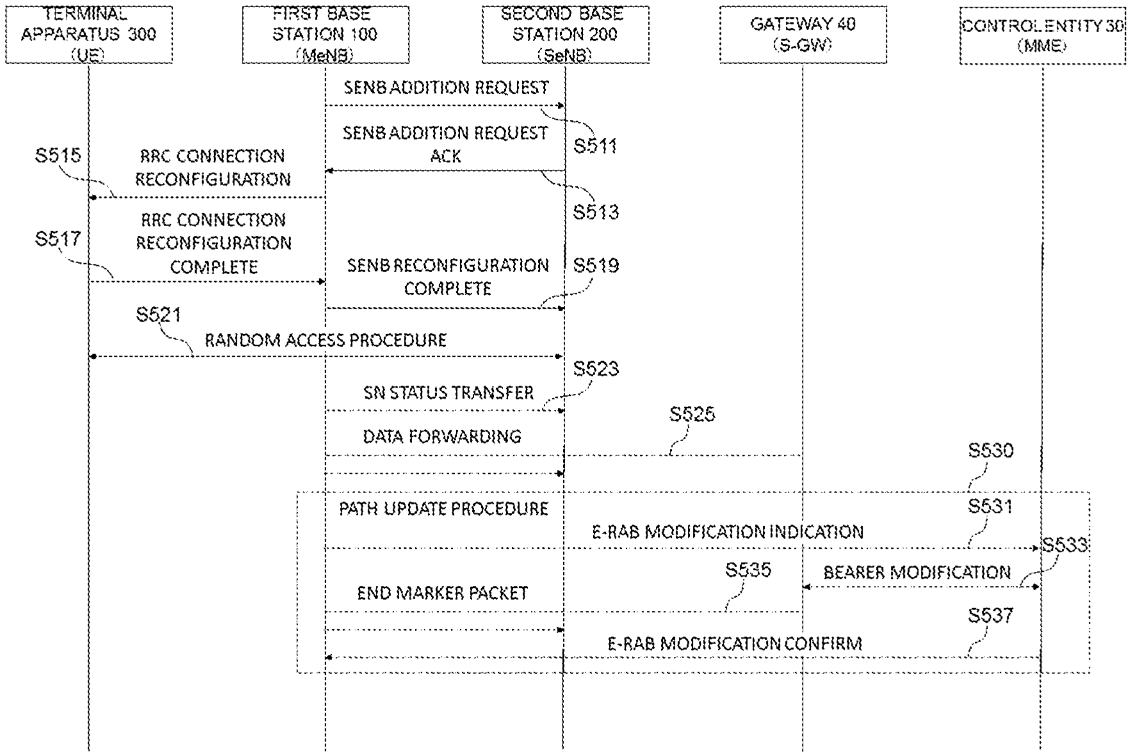
FIG. 31 is a sequence diagram illustrating an example of a schematic flow of second processing in the third example embodiment.

FIG. 31 is a sequence diagram illustrating an example of a schematic flow of second processing in the third example embodiment. The second processing is processing related to addition of SeNB and includes provision of behaviour-related information (e.g., Expected UE Behaviour IE) by the MeNB.

The first base station 100 (MeNB) transmits an SENB ADDITION REQUEST message to the second base station 200 (SeNB) (S511).

The second base station 200 (SeNB) then transmits an SENB ADDITION REQUEST ACKNOWLEDGE message to the first base station 100 (MeNB) (S513).

Thereafter, reconfiguration (S515-S519) for addition of SeNB (i.e., second base station 200) and a random access procedure (S521) are performed. Moreover, data forwarding (S523, S525) and/or a path update procedure (S530) is performed when needed.

SENB ADDITION REQUEST Message

For example, the SENB ADDITION REQUEST message is defined as illustrated in FIG. 32.

For example, the SENB ADDITION REQUEST message includes the Expected UE Behaviour IE.

(e-3) Third Processing

FIG. 33 is a sequence diagram illustrating an example of a schematic flow of third processing in the third example embodiment. The third processing is processing related to modification of SeNB and includes provision of behaviour-related information (e.g., Expected UE Behaviour IE) by the MeNB.

The first base station 100 (MeNB) transmits an SENB MODIFICATION REQUEST message to the second base station 200 (SeNB) (S541).

The second base station 200 (SeNB) then transmits an SENB MODIFICATION REQUEST ACKNOWLEDGE message to the first base station 100 (MeNB) (S543).

Thereafter, reconfiguration (S545-S549) related to the SeNB (i.e., second base station 200) and a random access procedure (S551) are performed. Moreover, data forwarding (S553, S555) and/or a path update procedure (S560) is performed when needed.

SENB MODIFICATION REQUEST Message

For example, the SENB MODIFICATION REQUEST message is defined as illustrated in FIG. 34.

For example, the SENB MODIFICATION REQUEST message includes the Expected UE Behaviour IE.

(3) Determination of Operation Using Activity-Related Information

For example, the first base station 100 (control unit 167) determines an operation using the activity-related information (i.e., on the basis of the activity-related information). This, for example, allows control related to activities of the terminal apparatus 300 to be concentrated in the master base station even in the case with a SCG bearer.

(a) Release of Secondary Base Station

For example, the operation includes a release of the secondary base station (second base station 200). Specifically, the first base station 100 (control unit 167) determines a release of the secondary base station (second base station 200) using the activity-related information.

Moreover, for example, the first base station 100 (control unit 167) determines a release of the secondary base station (second base station 200) using the activity-related information and another activity-related information related to an activity of the terminal apparatus 300 in the MCG of the master base station (first base station 100). With this configuration, for example, when the terminal apparatus 300 is active in the MCG, even though the terminal apparatus 300 is inactive in the SCG, and the secondary base station is still needed accordingly, the secondary base station is not released, whereby the occurrence of unnecessary operations (e.g., the procedure for adding the secondary base station) can be reduced.

For example, the first base station 100 (control unit 167) maintains the secondary base station (second base station 200) without determining to release the secondary base station (second base station 200). Alternatively, the first base station 100 (control unit 167) determines to release the secondary base station (second base station 200) and initiates an SeNB Release procedure for the release of the secondary base station (second base station 200).

Note that the release of the secondary base station (second base station 200) includes, for example, that the secondary base station (second base station 200) releases resources for the terminal apparatus 300. Alternatively, the release of the secondary base station (second base station 200) may mean that the secondary base station (second base station 200) releases resources for the terminal apparatus 300.

(b) Release of Terminal Apparatus

The operation may include a release of the terminal apparatus 300. Specifically, the first base station 100 (control unit 167) may use the activity-related information (and another activity-related information related to an activity of the terminal apparatus 300 in the MCG of the master base station (first base station 100)) to determine the release of the terminal apparatus 300.

The first base station 100 (control unit 167) may request the control entity 30 to release the terminal apparatus 300 when making the determination of the release of the terminal apparatus 300. For example, when the terminal apparatus 300 is inactive in the SCG (i.e., the activity-related information indicates that the terminal apparatus 300 is inactive in the SCG) and the terminal apparatus 300 is inactive also in the MCG (i.e., the other activity-related information indicates that the terminal apparatus 300 is inactive in the MCG), the first base station 100 (control unit 167) may request the control entity 30 to release the terminal apparatus 300.

(c) Addition of Bearer

The operation may include addition of a bearer related to the terminal apparatus 300 and the secondary base station (second base station 200). Specifically, the first base station 100 (control unit 167) may determine to perform addition of the bearer related to the terminal apparatus 300 and the secondary base station (second base station 200), on the basis of the activity-related information. The first base station 100 (control unit 167) may then initiate a procedure for the addition of the bearer. The procedure may be an SeNB Modification procedure. The bearer may be a bearer between the gateway 40 and the terminal apparatus 300 (e.g., E-RAB between S-GW and UE).

The third example embodiment has been described above. Note that the various technical features described in the third example embodiment may be applied to any of the first and second example embodiments.

6. Fourth Example Embodiment

Next, the fourth example embodiment of the present invention is described with reference to FIG. 35 to FIG. 38.

6.1. Example of Configuration of First Base Station

First, with reference to FIG. 35, an example of a configuration of a first base station 100 according to the fourth example embodiment is described. FIG. 35 is a block diagram illustrating an example of a schematic configuration of the first base station 100 according to the fourth example embodiment. According to FIG. 35, the first base station 100 includes a communication processing unit 171 and an information acquisition unit 175.

Concrete operations of the communication processing unit 171 and the information acquisition unit 175 will be described later.

The communication processing unit 171 and the information acquisition unit 175 may be implemented by a baseband (BB) processor and/or other processors, and the like.

6.2. Example of Configuration of Second Base Station

Figure 36:
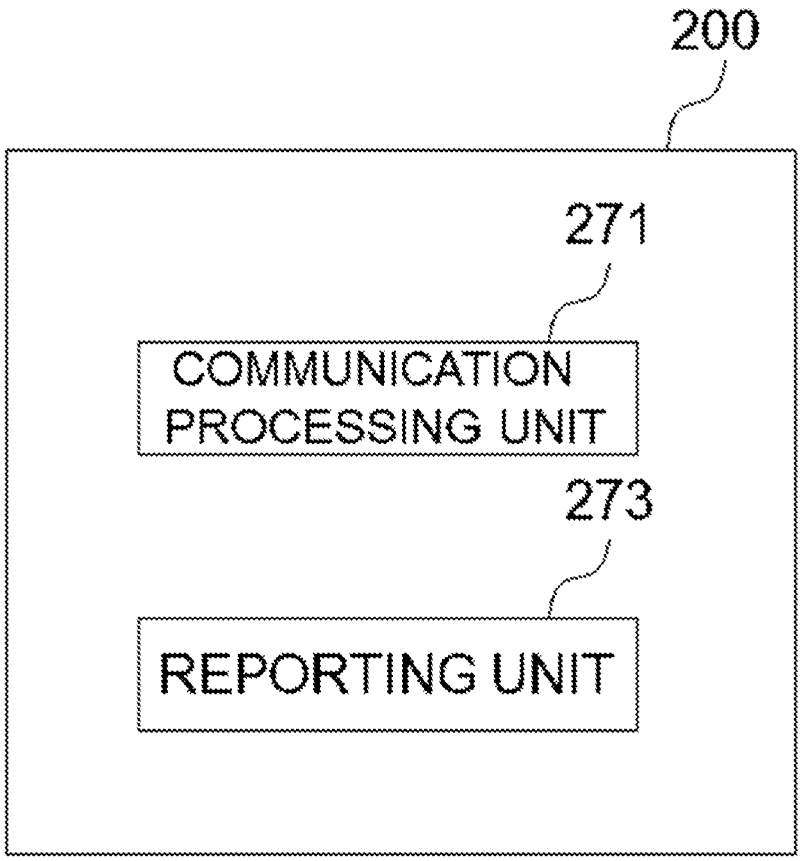
FIG. 36 is a block diagram illustrating an example of a schematic configuration of a second base station according to the fourth example embodiment.

First, with reference to FIG. 36, an example of a configuration of a second base station 200 according to the fourth example embodiment is described. FIG. 36 is a block diagram illustrating an example of a schematic configuration of the second base station 200 according to the fourth example embodiment. According to FIG. 36, the second base station 200 includes a communication processing unit 271 and a reporting unit 273.

Concrete operations of the communication processing unit 271 and the reporting unit 273 will be described later.

The communication processing unit 271 and the reporting unit 273 may be implemented by a baseband (BB) processor and/or other processors, and the like.

6.3. Example of Configuration of Terminal Apparatus

Figure 37:
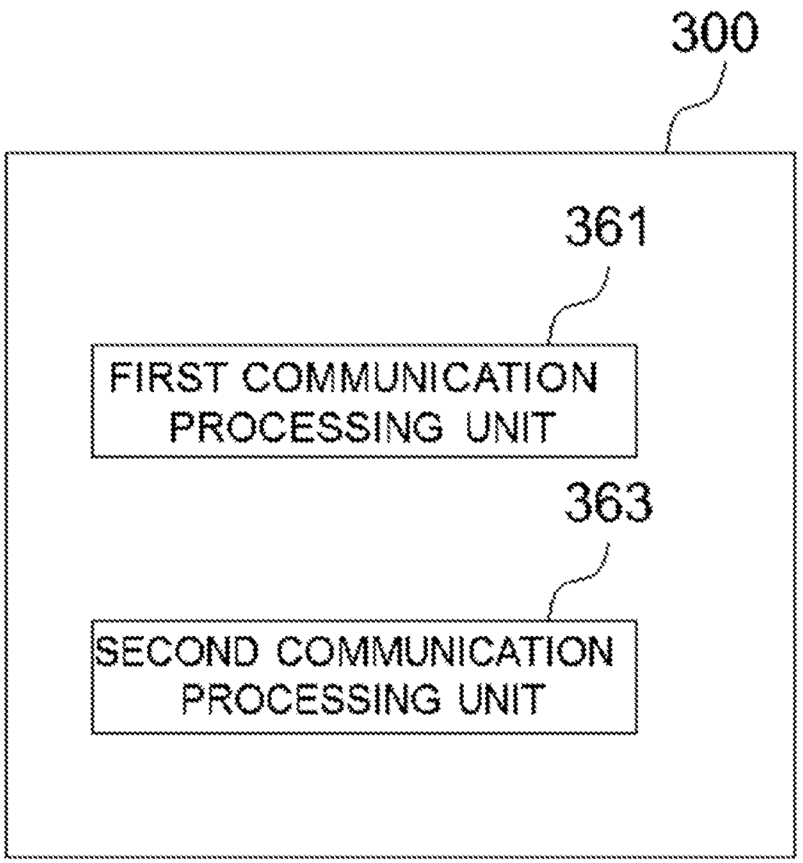
FIG. 37 is a block diagram illustrating an example of a schematic configuration of a terminal apparatus according to the fourth example embodiment.

First, with reference to FIG. 37, an example of a configuration of a terminal apparatus 300 according to the fourth example embodiment is described. FIG. 37 is a block diagram illustrating an example of a schematic configuration of the terminal apparatus 300 according to the fourth example embodiment. According to FIG. 36, the terminal apparatus 300 includes a first communication processing unit 361 and a second communication processing unit 363.

Concrete operations of the first communication processing unit 361 and the second communication processing unit 363 will be described later.

The first communication processing unit 361 and the second communication processing unit 363 may be implemented by a baseband (BB) processor and/or other processors, and the like.

6.4. Technical Features

Next, technical features of the fourth example embodiment are described with reference to FIG. 38.

(1) Dual Connectivity (SCG Bearer Option)

For example, the first base station 100 operates as a master base station in dual connectivity of the terminal apparatus 300, and the second base station 200 operates as a secondary base station in the dual connectivity of the terminal apparatus 300. In this case, the first base station 100 (communication processing unit 171) communicates with the terminal apparatus 300 over a MCG bearer for the dual connectivity of the terminal apparatus 300, and the second base station 200 (communication processing unit 271) communicates with the terminal apparatus 300 over a SCG bearer for the dual connectivity. The terminal apparatus 300 (first communication processing unit 361) communicates with the first base station 100 (master base station) over the MCG bearer, and the terminal apparatus 300 (second communication processing unit 363) also communicates with the second base station 200 (secondary base station) over the SCG bearer.

More concrete descriptions of these respects are the same as the descriptions for the third example embodiment (except for the difference in reference signs), for example. Hence, overlapping descriptions are omitted here.

(2) Report of Activity-related Information

In particular, in the fourth example embodiment, the second base station 200 (reporting unit 273) reports, to the master base station (first base station 100), activity-related information related to an activity of the terminal apparatus 300 in the SCG of the secondary base station (second base station 200). The first base station 100 (information acquisition unit 175) then acquires the activity-related information reported by the secondary base station (second base station 200).

This enables, for example, the master base station (first base station 100) to know activities of the terminal apparatus 300 in SCG and to determine whether to release the secondary base station (second base station 200) in consideration of the activities of the terminal apparatus 300 in both the MCG and the SCG. Hence, for example, when the terminal apparatus 300 is active in the MCG, even though the terminal apparatus 300 is inactive in the SCG, and the secondary base station is still needed accordingly, the secondary base station is not released, whereby the occurrence of unnecessary operations (e.g., the procedure for adding the secondary base station) can be reduced.

More concrete descriptions of these respects are the same as the descriptions for the third example embodiment (except for the difference in reference signs), for example. Hence, overlapping descriptions are omitted here.

(3) Flow of Processing

Figure 38:
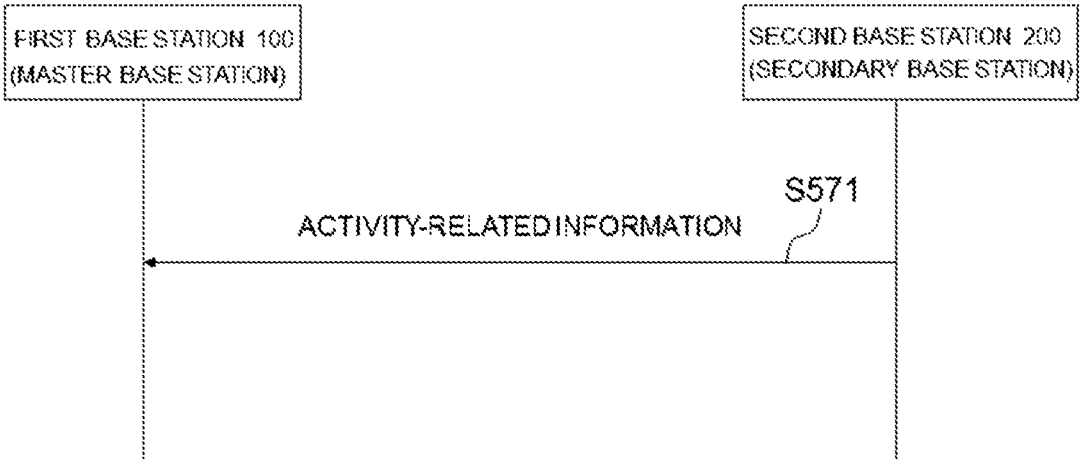
FIG. 38 is a sequence diagram illustrating an example of a schematic flow of processing related to a report of activity-related information in the fourth example embodiment.

FIG. 38 is a sequence diagram illustrating an example of a schematic flow of processing related to report of activity-related information in the fourth example embodiment. In this example, the first base station 100 is a master base station, and the second base station 200 is a secondary base station.

The second base station 200 reports, to the master base station (first base station 100), activity-related information related to an activity of the terminal apparatus 300 in the SCG of the secondary base station (second base station 200) (S571). The first base station 100 (information acquisition unit 175) then acquires the activity-related information reported by the secondary base station (second base station 200).

7. Fifth Example Embodiment

Next, the fifth example embodiment of the present invention is described with reference to FIG. 39 to FIG. 57.

7.1. Example of Configuration of First Base Station

Figure 39:
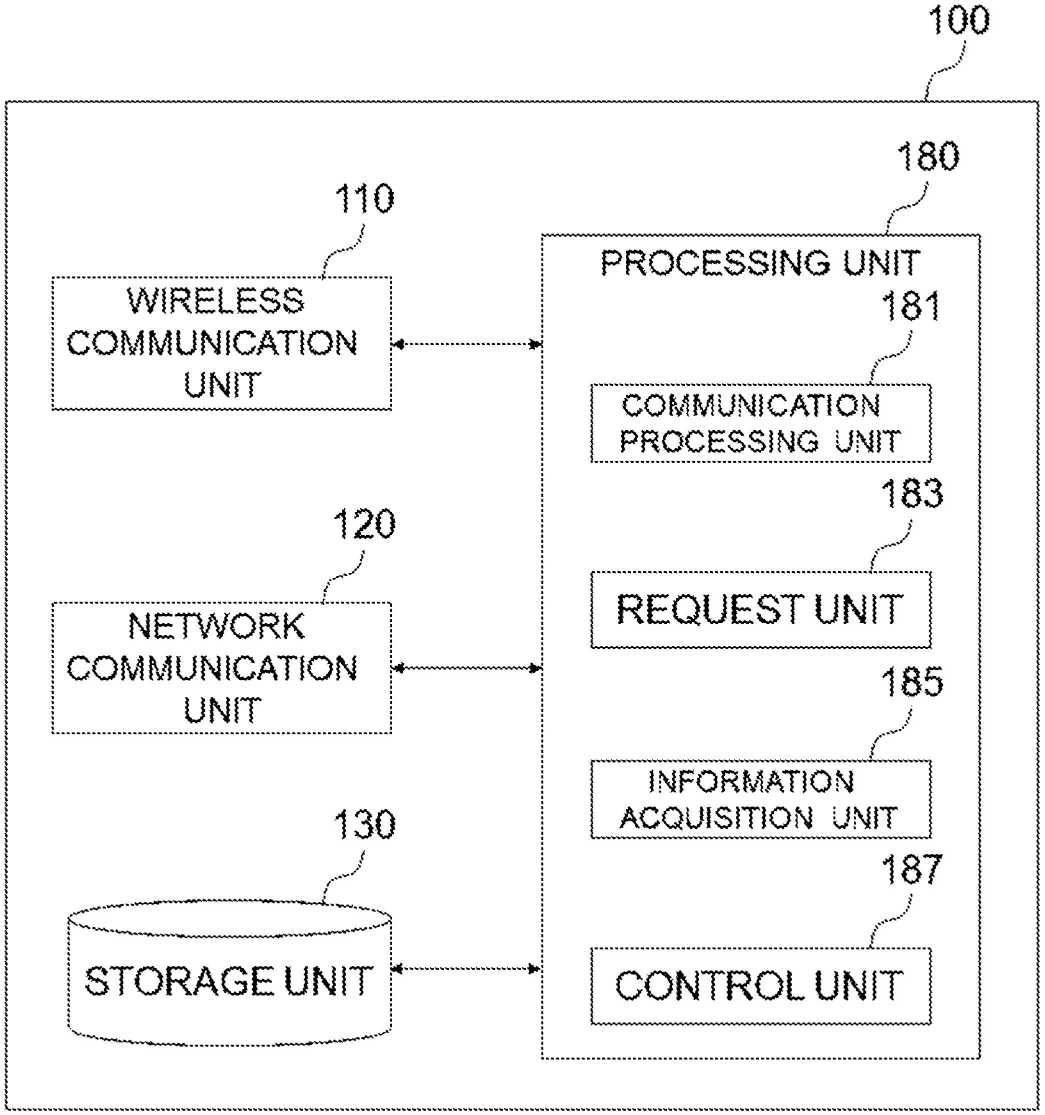
FIG. 39 is a block diagram illustrating an example of a schematic configuration of a first base station according to a fifth example embodiment.

First, with reference to FIG. 39, an example of a configuration of a first base station 100 according to the fifth example embodiment is described. FIG. 39 is a block diagram illustrating an example of a schematic configuration of the first base station 100 according to the fifth example embodiment. According to FIG. 39, the first base station 100 includes a wireless communication unit 110, a network communication unit 120, a storage unit 130, and a processing unit 180.

The wireless communication unit 110 transmits and/or receives signals wirelessly. For example, the wireless communication unit 110 receives a signal from a terminal apparatus and transmits a signal to a terminal apparatus.

The network communication unit 120 receives a signal from a backhaul and transmits a signal to the backhaul.

The storage unit 130 temporarily or permanently stores programs and parameters for operations of the first base station 100 as well as various data.

The processing unit 180 provides various functions of the first base station 100. The processing unit 180 includes a communication processing unit 181, a request unit 183, an information acquisition unit 185, and a control unit 187. Note that the processing unit 180 may further include constituent components other than these constituent components. In other words, the processing unit 180 may also perform operations other than the operations of these constituent elements.

Concrete operations of the communication processing unit 181, the request unit 183, the information acquisition unit 185, and the control unit 187 will be described later in detail.

The wireless communication unit 110 may include an antenna, a radio frequency (RF) circuit, and the like. The network communication unit 120 may include a network adapter, a network interface card, and the like. The storage unit 130 may include a memory (e.g., a nonvolatile memory and/or volatile memory) and/or a hard disk, and the like. The processing unit 180 may include a baseband (BB) processor and/or other processors, and the like.

7.2. Example of Configuration of Second Base Station

Figures 40, 41, 42:
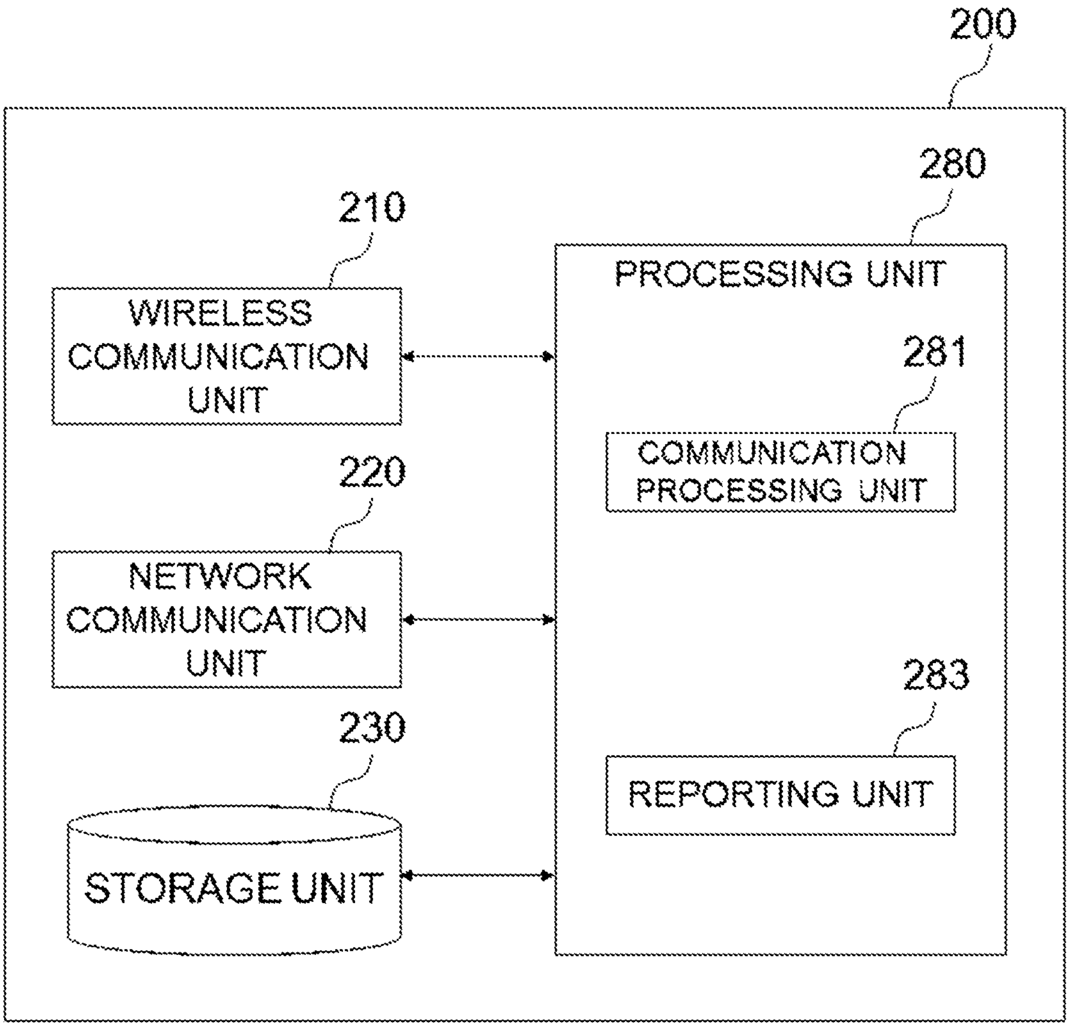
FIG. 40 is a block diagram illustrating an example of a schematic configuration of a second base station according to the fifth example embodiment.
FIG. 41 is an explanatory diagram for describing an example of User Inactivity Status.
FIG. 42 is an explanatory diagram for describing an example of Report Characteristics Type.

Next, with reference to FIG. 40, an example of a configuration of a second base station 200 according to the fifth example embodiment is described. FIG. 40 is a block diagram illustrating an example of a schematic configuration of the second base station 200 according to the fifth example embodiment. According to FIG. 40, the second base station 200 includes a wireless communication unit 210, a network communication unit 220, a storage unit 230, and a processing unit 280.

The wireless communication unit 210 transmits and/or receives signals wirelessly. For example, the wireless communication unit 210 receives a signal from a terminal apparatus and transmits a signal to a terminal apparatus.

The network communication unit 220 receives a signal from a backhaul and transmits a signal to the backhaul.

The storage unit 230 temporarily or permanently stores programs and parameters for operations of the second base station 200 as well as various data.

The processing unit 280 provides various functions of the second base station 200. The processing unit 280 includes a communication processing unit 281 and a reporting unit 283. Note that the processing unit 280 may further include constituent components other than these constituent components. In other words, the processing unit 280 may also perform operations other than the operations of these constituent elements.

Concrete operations of the communication processing unit 281 and the reporting unit 283 will be described later in detail.

The wireless communication unit 210 may include an antenna, a radio frequency (RF) circuit, and the like. The network communication unit 220 may include a network adapter, a network interface card, and the like. The storage unit 230 may include a memory (e.g., a nonvolatile memory and/or volatile memory) and/or a hard disk, and the like. The processing unit 280 may include a baseband (BB) processor and/or other processors, and the like.

7.3. Technical Features

Next, technical features of the fifth example embodiment are described with reference to FIG. 41 to FIG. 55.

(1) Dual Connectivity (Case with a SCG Bearer)

For example, the first base station 100 operates as a master base station in dual connectivity of a terminal apparatus 60, and the second base station 200 operates as a secondary base station in the dual connectivity of the terminal apparatus 60. In this case, the first base station 100 (communication processing unit 181) communicates with the terminal apparatus 60 over a MCG bearer for the dual connectivity of the terminal apparatus 60, and the second base station 200 (communication processing unit 281) communicates with the terminal apparatus 60 over a SCG bearer for the dual connectivity.

For example, the communication processing unit 181, and the communication processing unit 281 perform signal processing on a PDCP layer, RLC layer, MAC layer, and/or physical layer.

Note that the MCG bearer is a bearer whose radio protocols are located in the master base station (first base station 100) to use resources of the master base station (first base station 100). Moreover, the SCG bearer is a bearer whose radio protocols are located in the secondary base station (second base station 200) to use resources of the secondary base station (second base station 200).

(2) Report of Activity-Related Information (a) Request of Report

The first base station 100 (request unit 183) requests the secondary base station (second base station 200) communicating with the terminal apparatus 60 over the SCG bearer for the dual connectivity, to report activity-related information related to an activity of the terminal apparatus 60 in the SCG of the secondary base station.

For example, the first base station 100 (request unit 183) transmits, to the secondary base station (second base station 200), a message requesting a report of the activity-related information. For example, the message includes Report Characteristics, and Report Characteristics indicates that the first base station 100 requests feedback (i.e., report of the activity-related information). For example, more precisely, a Report Characteristics IE indicates that the first base station 100 requests feedback from the second base station 200, when a condition indicated by type information (e.g., Report Characteristics Type IE) to be described later is satisfied. The first base station 100 may include such Report Characteristics IE in a message.

As an example, the first base station 100 (request unit 183) transmits, to the secondary base station (second base station 200), an SENB ADDITION REQUEST message requesting a report of the activity-related information. Alternatively, the first base station 100 (request unit 183) may transmit, to the secondary base station (second base station 200), an SENB MODIFICATION REQUEST message requesting a report of the activity-related information. Such usage of an existing message makes it possible, for example, to request a report in an existing procedure.

As another example, the first base station 100 (request unit 183) may transmit, to the secondary base station, a UE ASSOCIATED INFORMATION REQUEST message requesting a report of the activity-related information. Such usage of a new message makes it possible, for example, to request a report more flexibly (e.g., at less restricted timing).

As described above, the first base station 100 (request unit 183) requests the secondary base station (second base station 200) to report the activity-related information. This allows, for example, the secondary base station (second base station 200) not to observe and report activities of the terminal apparatus 60 in the SCG more than necessary. Hence, the occurrence of unnecessary operations in the case with a SCG bearer can be reduced.

Note that, for example, the message requesting a report of the activity-related information is a message dedicated to the terminal apparatus 60 (i.e., message for each terminal apparatus). Alternatively, the message requesting a report of the activity-related information may be a message common to multiple terminal apparatuses including the terminal apparatus 60. In this case, the message may include identifications (IDs) of the multiple terminal apparatuses. Each of the IDs may be a temporary ID (e.g., Temporary Mobile Subscriber Identity (TMSI), Cell Radio Network Temporary Identifier (CRNTI), or the like) or may be a permanent ID (e.g., International Mobile Subscriber Identity (IMSI), International Mobile Equipment Identity (IMEI), or the like).

(B) Report

The second base station 200 (reporting unit 283) reports the activity-related information to the master base station (first base station 100) in response to a request from the master base station (first base station 100) communicating with the terminal apparatus 60 over the MCG bearer for the dual connectivity. The first base station 100 (request unit 183) then acquires the activity-related information reported by the secondary base station (second base station 200).

For example, when a message from the first base station 100 (e.g., SENB ADDITION REQUEST, SENB MODIFICATION REQUEST, or UE ASSOCIATED INFORMATION REQUEST) includes the Report Characteristics IE, the second base station 200 may make a report (e.g., when a condition indicated by the type information (e.g., Report Characteristics Type IE) to be described later is satisfied).

Transmission of Message

For example, the second base station 200 (reporting unit 283) transmits a message including the activity-related information to the master base station (first base station 100).

As an example, the second base station 200 (reporting unit 283) transmits an SENB MODIFICATION REQUIRED message including the activity-related information to the master base station (first base station 100). Such usage of an existing message makes it possible, for example, to make a report in an existing procedure.

As another example, the second base station 200 (reporting unit 283) may transmit a UE ASSOCIATED INFORMATION REPORT message including the activity-related information to the master base station (first base station 100). Such usage of a new message makes it possible, for example, to make a report more flexibly (e.g., at less restricted timing).

Timing for Report

As a first example, after a request of a report by the first base station 100 (the master base station), the second base station 200 (the secondary base station) reports the activity-related information to the master base station (first base station 100). Such a report may be referred to as an on demand report.

As a second example, the second base station 200 (the secondary base station) periodically reports the activity-related information to the master base station (first base station 100). Such a report may be referred to as a periodic report.

As a third example, when the second base station 200 (the secondary base station) detects inactivity of the terminal apparatus 60 in the SCG (e.g., when there is no data communication by the terminal apparatus 60 in the SCG by the time the inactivity timer of the terminal apparatus 60 expires), the second base station 200 (the secondary base station) reports the activity-related information to the master base station (first base station 100). Such a report may be referred to as an event trigger report.

As described above, the second base station 200 (reporting unit 283) reports the activity-related information, and the first base station 100 (information acquisition unit 185) acquires the activity-related information. This enables, for example, the master base station (first base station 100) to know activities of the terminal apparatus 60 in the SCG and to determine whether to release the secondary base station (second base station 200) in consideration of the activities of the terminal apparatus 60 in both the MCG and the SCG. Hence, for example, when the terminal apparatus 60 is active in the MCG, even though the terminal apparatus 60 is inactive in the SCG, and the secondary base station is still needed accordingly, the secondary base station is not released, whereby the occurrence of unnecessary operations (e.g., the procedure for adding the secondary base station) can be reduced.

(c) Activity-Related Information

Content

For example, the activity-related information is information indicating whether the terminal apparatus 60 is active or inactive in the SCG. Alternatively, the activity-related information may be information simply indicating that the terminal apparatus 60 is inactive in the SCG.

For example, the activity-related information is a User Inactivity Status. Concretely, for example, the User Inactivity Status is defined as illustrated in FIG. 41.

Such information, for example, enables the master base station (first base station 100) to know activities of the terminal apparatus 60 in a case with a SCG bearer.

Generation

The second base station 200 (the secondary base station) observes activities of the terminal apparatus 60 in the SCG (e.g., data communication by the terminal apparatus 60 in the SCG). The second base station 200 (the secondary base station) then generates the activity-related information on the basis of a result of the observation.

For example, in response to a request of a report from the first base station 100 (the master base station), the second base station 200 (the secondary base station) observes activities of the terminal apparatus 60 in the SCG. Concretely, for example, the second base station 200 may observe the activities when the Report Characteristics IE in a message from the first base station 100 includes a User Inactivity Status. Alternatively, the second base station 200 (the secondary base station) may observe the activities independently.

(d) Type Information

Provision of Type Information

For example, at the time of requesting the secondary base station (second base station 200) to report the activity-related information, the first base station 100 (request unit 183) provides type information indicating the type of the report to the secondary base station (second base station 200).

For example, the type information indicates on demand, event trigger, or periodic as the type of a report.

For example, the type information is a Report Characteristics Type. Concretely, for example, the Report Characteristics Type is defined as illustrated in FIG. 42 and includes an "On Demand" IE, a "Periodic" IE, and/or an "Event Trigger" IE as an information element (IE). The Report Characteristics Type indicates the type of a report by such IEs. Furthermore, for example, a "Periodic" IE is defined as illustrated in FIG. 43 and includes a Report Periodicity Value as information indicating periodicity. Moreover, the "Event Trigger" IE is defined as illustrated in FIG. 44 and includes a "User Inactivity" IE, an "Arriving Data Rate" IE, and the like as information indicating the event of a report. Thus, the type information may indicate a report condition (or the type information may include information indicating a report condition, in other words).

Report Based on Type Information

For example, the second base station 200 (reporting unit 283) reports the activity-related information to the master base station (first base station 100) on the basis of the type information provided by the master base station (first base station 100). More concretely, for example, the second base station 200 (reporting unit 283) reports the activity-related information to the master base station (first base station 100) according to the type of the report indicated by the type information.

As a result of the provision of the type information and the report based on the type information, for example, the master base station (first base station 100) can acquire the activity-related information at desired timing.

(e) Behaviour-Related Information

Provision of Behaviour-Related Information

For example, at the time of requesting the secondary base station (second base station 200) to report the activity-related information, the first base station 100 (request unit 183) provides the secondary base station (second base station 200) with behaviour-related information related to behaviour of the terminal apparatus 60. For example, the behavior-related information may be Expected UE Behaviour. The behaviour-related information is information provided to the first base station 100 from the control entity 30.

This, for example, also enables the secondary base station (second base station 200) not having any interface with the control entity 30 (e.g., MME) to acquire the behaviour-related information.

For example, the first base station 100 determines the value of the inactivity timer on the basis of the behaviour-related information (e.g., Expected UE Behaviour) acquired from the control entity 30 and sets the inactivity timer at the determined value. Furthermore, the first base station 100 (request unit 183) may provide the second base station 200 with timer information (e.g., User Inactivity Timer IE) indicating the value of the inactivity timer. This, for example, enables the first base station 100 and the second base station 200 to observe activities of the terminal apparatus 60 using the same timer value.

Report Based on Behaviour-Related Information

For example, the second base station 200 (reporting unit 283) reports the activity-related information to the master base station (first base station 100) on the basis of the behaviour-related information. More specifically, for example, the second base station 200 (reporting unit 283) may set the inactivity timer of the terminal apparatus 60 at an appropriate value on the basis of the behaviour-related information. Then, when there is no data communication by the terminal apparatus 60 in the SCG (or when the amount of data communication is small) by the time the inactivity timer expires, the second base station 200 (reporting unit 283) reports the activity-related information to the master base station (first base station 100). Note that the second base station 200 (reporting unit 283) may, of course, make an on demand report and/or a periodic report together with such an event trigger report (or instead of such an event trigger report).

This, for example, enables the secondary base station (second base station 200) to make a more appropriate report.

Note that the second base station 200 (reporting unit 283) may provide the first base station 100 with timer information (e.g., User Inactivity Timer IE) indicating the value of the inactivity timer (determined by the second base station 200).

(f) Flow of Processing

Request and report processing according to the fifth example embodiment is described with reference to FIG. 45 to FIG. 47.

(f-1) First Example

FIG. 45 is a sequence diagram illustrating a first example of a schematic flow of request and report processing according to the fifth example embodiment.

The first base station 100, which is the MeNB, transmits an SENB ADDITION REQUEST message to the second base station 200, which is the SeNB (S601). The SENB ADDITION REQUEST message includes Report Characteristics (i.e., information indicating reporting of activity-related information). Through this operation, the first base station 100 requests the second base station 200 to report activity-related information. In addition, the SENB ADDITION REQUEST message further includes a Report Characteristics Type (i.e., type information) and Expected UE Behaviour (i.e., behaviour-related information). Moreover, the SENB ADDITION REQUEST message may include a User Inactivity Timer (i.e., timer information).

The second base station 200 then transmits an SENB ADDITION REQUEST ACKNOWLEDGE message to the first base station 100 (S603). The SENB ADDITION REQUEST ACKNOWLEDGE message may include a User Inactivity Timer (i.e., timer information indicating the value of the inactivity timer determined by the second base station 200).

Thereafter, reconfiguration (S605-S609) for addition of SeNB (i.e., second base station 200) and a random access procedure (S611) are performed. Moreover, data forwarding (S613, S615) and/or a path update procedure (S620) is performed when needed.

The second base station 200 transmits an SENB MODIFICATION REQUIRED message to the first base station 100 (S631). The SENB MODIFICATION REQUIRED message includes the User Inactivity Status (i.e., activity-related information). Through this operation, the second base station 200 reports the activity-related information to the first base station 100. Note that the second base station 200, of course, observes activities of the terminal apparatus 60 in the SCG and generates the activity-related information on the basis of a result of the observation. The SENB MODIFICATION REQUIRED message may further include a User Inactivity Timer (i.e., timer information indicating the value of the inactivity timer determined by the second base station 200).

The first base station 100 receives the SENB MODIFICATION REQUIRED message and thereby acquires the User Inactivity Status (i.e., activity-related information). The first base station 100 may thereafter transmit an SENB MODIFICATION CONFIRM message to the second base station 200.

Note that, when the first base station 100 receives the SENB MODIFICATION REQUIRED message including the User Inactivity Status IE (i.e., activity-related information), the first base station 100 may determine to perform any of operations using the message and then perform the operation. For example, in response to reception of the SENB MODIFICATION REQUIRED message, the first base station 100 may perform reconfiguration for an efficient operation in dual connectivity related to the terminal apparatus 60 (UE).

(f-2) Second Example

Figure 46:
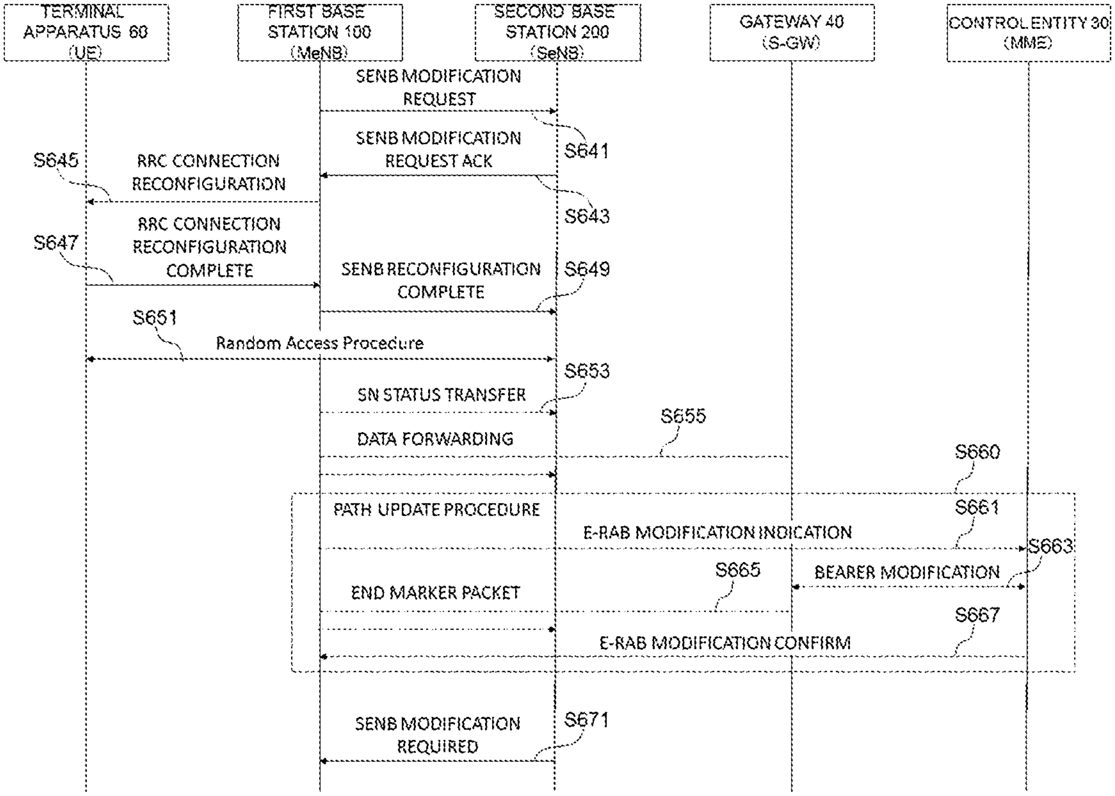
FIG. 46 is a sequence diagram illustrating a second example of the schematic flow of the request and report processing according to the fifth example embodiment.

FIG. 46 is a sequence diagram illustrating a second example of a schematic flow of the request and report processing according to the fifth example embodiment.

The first base station 100, which is MeNB, transmits an SENB MODIFICATION REQUEST message to the second base station 200, which is the SeNB (S641). The SENB MODIFICATION REQUEST message includes Report Characteristics (i.e., information indicating reporting of activity-related information). Through this operation, the first base station 100 requests the second base station 200 to report activity-related information related to an activity. In addition, the SENB MODIFICATION REQUEST message further includes a Report Characteristics Type (i.e., type information) and Expected UE Behaviour (i.e., behaviour-related information). Moreover, the SENB MODIFICATION REQUEST message may include a User Inactivity Timer (i.e., timer information).

The second base station 200 then transmits an SENB MODIFICATION REQUEST ACKNOWLEDGE message to the first base station 100 (S643). The SENB MODIFICATION REQUEST ACKNOWLEDGE message may include a User Inactivity Timer (i.e., timer information indicating the value of the inactivity timer determined by the second base station 200).

Thereafter, reconfiguration (S645-S649) related to the SeNB (i.e., second base station 200) and a random access procedure (S651) are performed. Moreover, data forwarding (S653, S655) and/or a path update procedure (S660) is performed when needed.

The second base station 200 transmits an SENB MODIFICATION REQUIRED message to the first base station 100 (S671). The SENB MODIFICATION REQUIRED message includes the User Inactivity Status (i.e., activity-related information). Through this operation, the second base station 200 reports activity-related information to the first base station 100. Note that the second base station 200, of course, observes activities of the terminal apparatus 60 in the SCG and generates the activity-related information on the basis of a result of the observation. The SENB MODIFICATION REQUIRED message may further include a User Inactivity Timer (i.e., timer information indicating the value of the inactivity timer determined by the second base station 200).

The first base station 100 receives the SENB MODIFICATION REQUIRED message and thereby acquires the User Inactivity Status (i.e., activity-related information). The first base station 100 may thereafter transmit an SENB MODIFICATION CONFIRM message to the second base station 200.

Note that, when the first base station 100 receives the SENB MODIFICATION REQUIRED message including the User Inactivity Status IE (i.e., activity-related information), the first base station 100 may determine to perform any of operations using the message and then perform the operation. For example, in response to reception of the SENB MODIFICATION REQUIRED message, the first base station 100 may perform reconfiguration for an efficient operation in dual connectivity related to the terminal apparatus 60 (UE).

(f-3) Third Example

Figure 47:
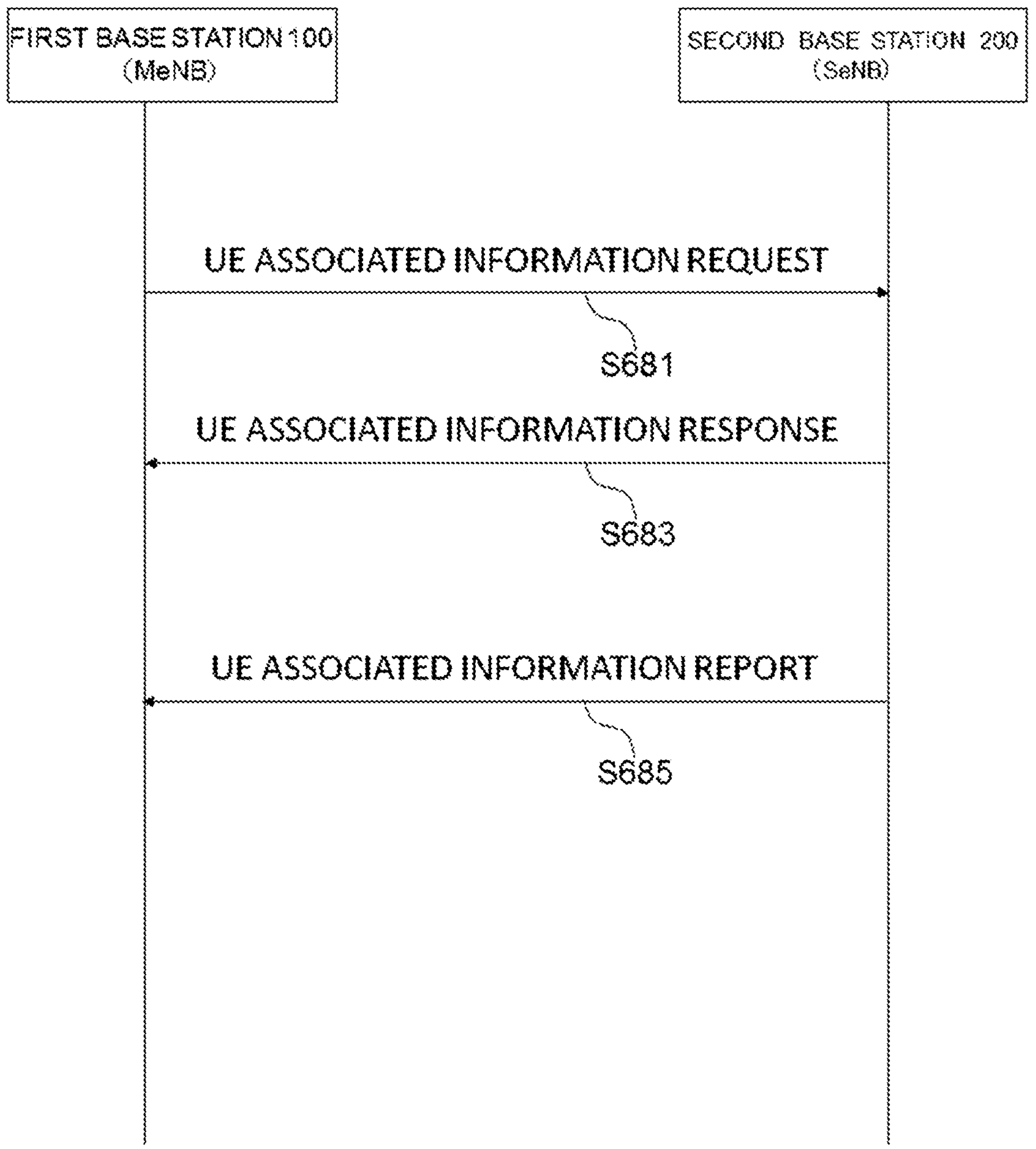
FIG. 47 is a sequence diagram illustrating a third example of the schematic flow of the request and report processing according to the fifth example embodiment.

FIG. 47 is a sequence diagram illustrating a third example of a schematic flow of the request and report processing according to the fifth example embodiment. This procedure uses UE-associated signaling.

The first base station 100, which is the MeNB, transmits a UE ASSOCIATED INFORMATION REQUEST message to the second base station 200, which is the SeNB (S681). The UE ASSOCIATED INFORMATION REQUEST message includes Report Characteristics (i.e., information indicating reporting of activity-related information). Through this operation, the first base station 100 requests the second base station 200 to report activity-related information related to an activity. In addition, the UE ASSOCIATED INFORMATION REQUEST message further includes a Report Characteristics Type (i.e., type information) and Expected UE Behaviour (i.e., behaviour-related information). Moreover, the UE ASSOCIATED INFORMATION REQUEST message may include a User Inactivity Timer (i.e., timer information).

In response to reception of the UE ASSOCIATED INFORMATION REQUEST message, the second base station 200 may perform measurement as requested by the first base station 100. Moreover, the second base station 200 transmits a UE ASSOCIATED INFORMATION RESPONSE message to the first base station 100 (S683). The UE ASSOCIATED INFORMATION RESPONSE message may include a User Inactivity Timer (i.e., timer information indicating the value of the inactivity timer determined by the second base station 200).

The second base station 200 thereafter transmits a UE ASSOCIATED INFORMATION REPORT message to the first base station 100 (S685). The UE ASSOCIATED INFORMATION REPORT message includes the User Inactivity Status (i.e., activity-related information). Through this operation, the second base station 200 reports activity-related information to the first base station 100. The second base station 200, of course, observes activities of the terminal apparatus 60 in the SCG and generates the activity-related information on the basis of a result of the observation. The UE ASSOCIATED INFORMATION REPORT message may further include User Inactivity Timer (i.e., timer information indicating the value of the inactivity timer determined by the second base station 200).

The first base station 100 receives the UE ASSOCIATED INFORMATION REPORT message and thereby acquires the User Inactivity Status (i.e., activity-related information).

Note that, when the first base station 100 receives the UE ASSOCIATED INFORMATION REPORT message including the User Inactivity Status IE (i.e., activity-related information), the first base station 100 may determine to perform any of operations using the message and then perform the operation. For example, in response to reception of the UE ASSOCIATED INFORMATION REPORT message, the first base station 100 may perform reconfiguration for an efficient operation in dual connectivity related to the terminal apparatus 60 (UE).

Unsuccessful Operation

In a case where the second base station 200 fails to initiate requested measurement as indicated by the Report Characteristics IE, the second base station 200 may transmit a UE ASSOCIATED INFORMATION FAILURE message (instead of UE ASSOCIATED INFORMATION RESPONSE message). The message may include a Cause IE set at an appropriate value.

Moreover, in a case where the second base station 200 fails to perform a combination of requested measurements as indicated by the Report Characteristics IE and the Report Characteristics Type IE, the second base station 200 may reject UE ASSOCIATED INFORMATION REQUEST using a UE ASSOCIATED INFORMATION FAILURE message. The message may include the Cause IE set at an appropriate value.

The Cause IE may include a Radio Network Layer Cause IE, and the Radio Network Layer Cause IE may be set at Requested Report Characteristic not Supported. Requested Report Characteristic not Supported may mean that requested Report Characteristics is not supported by a transmission node.

For example, when the second base station 200 fails to initiate requested measurements, the UE ASSOCIATED INFORMATION FAILURE message is transmitted from the second base station 200 to the first base station 100 for UE-associated information.

(g) Information Included in Message

(g-1) Request Message

Each of SENB ADDITION REQUEST, SENB MODIFICATION REQUEST, and UE ASSOCIATED INFORMATION REQUEST described with reference to FIG. 45 to FIG. 47, is a message requesting a report of activity-related information and includes an information element(s) (IE(s)) as those illustrated in FIG. 48, for example. In other words, each of these messages includes Report Characteristics, a Report Characteristics Type, Expected UE Behaviour (i.e., behaviour-related information), and/or a User Inactivity Timer (i.e., timer information).

The User Inactivity Timer indicates a value of 0 to 255. Note that, when the value of User Inactivity Timer is a particular value (0 or 255 as an example), this may mean that the timer is infinite or that the timer is not started. The timer not being started is equal to not observing activities of the terminal apparatus 60.

Note that the example in FIG. 48 is an example in which Report Characteristics is ENUMERATED, which allows only one object (e.g., User Inactivity) to be specified. Alternatively, Report Characteristics may be BITSTRING, instead of ENUMERATED, which allows multiple objects (e.g., User Inactivity and Arriving Data Rate, and the like) to be specified, as illustrated in FIG. 49. In this case, Report Characteristic Info may include a Report Characteristic Type and Expected UE Behaviour for each of the multiple objects. Using BITSTRING makes it possible, for example, to request multiple objects (e.g., User Inactivity, Arriving data rate, and the like) using only one IE. Consequently, the number of IEs may be reduced.

As an example, the UE ASSOCIATED INFORMATION REQUEST message includes an information element(s) (IE(s)) as those illustrated in FIG. 50. Specifically, UE ASSOCIATED INFORMATION REQUEST further includes a Message Type, an MeNB UE X2AP ID, and an SeNB UE X2AP ID. Note that Report Characteristics in the UE ASSOCIATED INFORMATION REQUEST message may be BITSTRING, instead of ENUMERATED, as illustrated in FIG. 49.

Note that, as described above, the first base station 100 can request, for example, the second base station 200 to report Arriving data rate for the terminal apparatus 60, as well as to report User Inactivity for the terminal apparatus 60. This enables, for example, the first base station 100 to control not only the data rate of the terminal apparatus 60 in the MCG but also the data rate of the terminal apparatus 60 in the SCG. In particular, this is effective when the upper limit of the data rate for the terminal apparatus 60 is set (under a contract or the like).

(g-2) Report Message

Each of SENB MODIFICATION REQUIRED and UE ASSOCIATED INFORMATION REPORT described with reference to FIG. 45 to FIG. 47, is a message including activity-related information and includes an information element (IE) as that illustrated in FIG. 51, for example. Specifically, each of these messages includes the User Inactivity Status (i.e., activity-related information) and a User Inactivity Timer (i.e., timer information).

As an example, UE ASSOCIATED INFORMATION REPORT includes an information element(s) (IE(s)) as those illustrated in FIG. 52. Specifically, UE ASSOCIATED INFORMATION REPORT further includes a Message Type, an MeNB UE X2AP ID, and an SeNB UE X2AP ID.

(g-3) Response Message (Success)

Each of SENB ADDITION REQUEST ACKNOWLEDGE, SENB MODIFICATION REQUEST ACKNOWLEDGE, and UE ASSOCIATED INFORMATION RESPONSE described with reference to FIG. 45 to FIG. 47, is a message including timer information and includes an information element (IE) as that illustrated in FIG. 53, for example. Specifically, each of these messages includes a User Inactivity Timer (i.e., timer information). Note that the SENB MODIFICATION REQUIRED message may similarly be a message including timer information and may include an information element (IE) as that illustrated in FIG. 53, for example.

As an example, UE ASSOCIATED INFORMATION RESPONSE includes an information element(s) (IE(s)) as those illustrated in FIG. 54. Specifically, UE ASSOCIATED INFORMATION RESPONSE further includes a Message Type, an MeNB UE X2AP ID, and an SeNB UE X2AP ID.

(g-4) Response Message (Failure)

As described above, the UE ASSOCIATED INFORMATION FAILURE message, instead of UE ASSOCIATED INFORMATION RESPONSE described with reference to FIG. 47, may be transmitted from the second base station 200. The UE ASSOCIATED INFORMATION FAILURE message includes an information element(s) (IE(s)) as those illustrated in FIG. 55, for example.

(3) Operation Based on Activity-Related Information

For example, in response to a report of the activity-related information by the second base station 200, reconfiguration for an efficient operation in dual connectivity related to the terminal apparatus 60 (UE) may be performed.

More specifically, for example, when a report message from the second base station 200 includes the User Inactivity Status IE (i.e., the activity-related information), the first base station 100 may perform reconfiguration for an efficient operation in dual connectivity related to the terminal apparatus 60 (UE).

(a) Release of Secondary Base Station

For example, the first base station 100 (control unit 187) determines whether to release the secondary base station (second base station 200) on the basis of the activity-related information. This, for example, allows control related to activities of the terminal apparatus 60 to be concentrated in the master base station even in the case with a SCG bearer.

Moreover, for example, the first base station 100 (control unit 187) determines whether to release the secondary base station (second base station 200), further on the basis of another activity-related information related to activities of the terminal apparatus 60 in the MCG. With this configuration, for example, when the terminal apparatus 60 is active in the MCG, even though the terminal apparatus 60 is inactive in the SCG, and the secondary base station is still needed accordingly, the secondary base station is not released, whereby the occurrence of unnecessary operations (e.g., the procedure for adding the secondary base station) can be reduced.

For example, the first base station 100 (control unit 187) determines not to release the secondary base station (second base station 200) and maintains the secondary base station (second base station 200) without releasing the secondary base station (second base station 200). Alternatively, the first base station 100 (control unit 187) determines to release the secondary base station (second base station 200) and releases the secondary base station (second base station 200) through the SeNB release procedure.

As an example, when the UE is inactive, the first base station 100 may initiate the release procedure (e.g., SeNB Release Procedure) for the second base station 200.

(b) Release of Terminal Apparatus

The first base station 100 (control unit 187) may determine whether to release the terminal apparatus 60 on the basis of the activity-related information (and another activity-related information related to an activity of the terminal apparatus 60 in the MCG). When determining the release of the terminal apparatus 60, the first base station 100 (control unit 187) may request the control entity 30 to release the terminal apparatus 60. For example, when the terminal apparatus 60 is inactive in the SCG (i.e., the activity-related information indicates that the terminal apparatus 60 is inactive in the SCG) and the terminal apparatus 60 is inactive also in the MCG (i.e., the other activity-related information indicates that the terminal apparatus 60 is inactive in the MCG), the first base station 100 (control unit 187) requests the control entity 30 to release the terminal apparatus 60.

(c) Addition of Bearer

The first base station 100 (control unit 187) may determine whether to further add a bearer related to the terminal apparatus 60 and the secondary base station (second base station 200), on the basis of the activity-related information. The first base station 100 (control unit 187) may then determine to further add the bearer and may further add the bearer. The bearer may be a bearer between the gateway 40 and the terminal apparatus 60 (e.g., E-RAB between S-GW and UE). Moreover, the first base station 100 (control unit 187) may further add the bearer through the SeNB Modification procedure.

7.4. First Modified Example

Next, a first modified example of the fifth example embodiment is described.

In the above-described example, the second base station 200 (reporting unit 283) transmits the SENB MODIFICATION REQUIRED message including the User Inactivity Status (i.e., the activity-related information) and the UE ASSOCIATED INFORMATION REPORT message, to the first base station 100. Through this operation, the second base station 200 (reporting unit 283) reports the activity-related information to the first base station 100.

In contrast, in the first modified example of the fifth example embodiment, the second base station 200 (reporting unit 283) may transmit an SENB RELEASE REQUIRED message including Radio Network Layer Cause (i.e., the activity-related information) indicating User Inactivity, to the first base station 100. Through this operation, the second base station 200 (reporting unit 283) may report the activity-related information to the first base station 100.

7.5. Second Modified Example

Next, a second modified example of the fifth example embodiment is described with reference to FIG. 56 and FIG. 57.

(1) Overview

In the second modified example of the fifth example embodiment, although handover for the terminal apparatus 60 between master base stations is performed, a secondary base station is maintained even after the handover. In such a case, information provided to the secondary base station by the master base station at the time of requesting a report of activity-related information is transmitted from a source master base station to a target master base station. The information includes Report Characteristics, a Report Characteristics Type, and a User Inactivity Timer, for example. This may, for example, facilitate continuing a report of activity-related information even after handover between the master base stations.

(2) Handover

Figure 56:
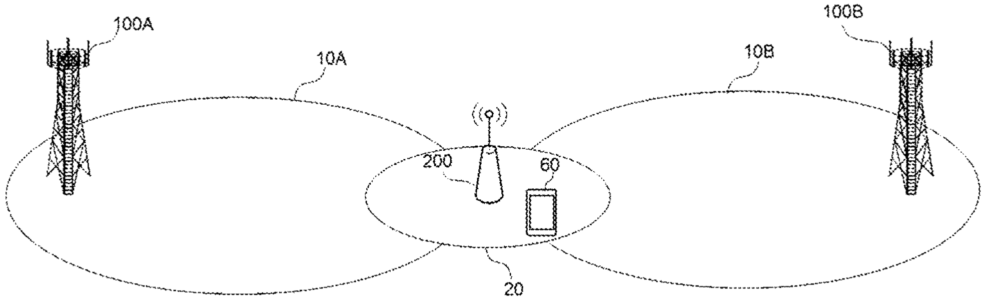
FIG. 56 is an explanatory diagram for describing an example of handover according to a second modified example of the fifth example embodiment.

FIG. 56 is an explanatory diagram for describing an example of handover according to the second modified example of the fifth example embodiment. With reference to FIG. 56, first base stations 100A and 100B, a second base station 200, and a terminal apparatus 60 are illustrated. In this example, the terminal apparatus 60, which has been performing communication with the first base station 100A and the second base station 200 in dual connectivity, moves from a coverage area 10A to a coverage area 10B, and consequently handover of the terminal apparatus 60 from the first base station 100A to the first base station 100B is performed. Note that the terminal apparatus 60 is remaining in a coverage area 20.

(3) Flow of Processing

Figure 57:
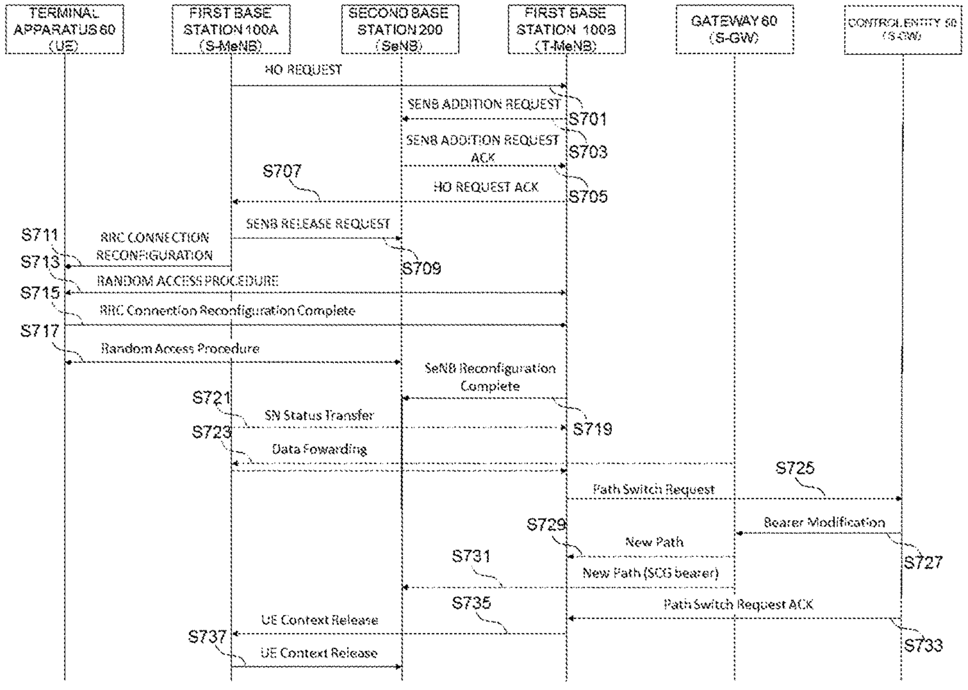
FIG. 57 is a sequence diagram illustrating an example of a schematic flow of the handover processing according to the second modified example of the fifth example embodiment.

FIG. 57 is a sequence diagram illustrating an example of a schematic flow of handover processing according to the second modified example of the fifth example embodiment.

The first base station 100A, which is the handover source eNB and the MeNB, transmits a HANDOVER REQUEST message to the first base station 100B, which is the handover target eNB (S701). The HANDOVER REQUEST message includes Report Characteristics (i.e., information indicating reporting of activity-related information) and a Report Characteristics Type (i.e., type information).

Thereafter, processing for handover of the terminal apparatus 60 from the first base station 100A to the first base station 100B is performed (S703-S737).

The fifth example embodiment has been described above. Note that the various technical features described in the fifth example embodiment may be applied to any of the first to fourth example embodiments.

The example embodiments of the present invention has been described above. The present invention is not limited to the above-described example embodiments and is possible to implement by making various changes within the scope of the gist of the present invention. The above-described example embodiments are examples, and it should be understood by those skilled in the art that various modified examples can be made to combinations of the example embodiments and combinations of constituent components and processing processes of the example embodiments, and that such modified examples are also within the scope of the present invention.

For example, the steps in any processing described herein need not be performed chronologically in the order illustrated in the corresponding sequence diagram. For example, the steps of the processing may be performed in a different order from the order illustrated as the corresponding sequence diagram or may be performed in parallel.

Moreover, a base station apparatus or a module including constituent elements of the base station described herein (e.g., the first communication processing unit, the second communication processing unit, the communication processing unit, the information acquisition unit, the information provision unit, the control unit, and/or the reporting unit) may be provided. A module including constituent elements of the base station described herein (e.g., the first communication processing unit and/or the second communication processing unit) may also be provided. Moreover, methods including processing of such constituent elements may be provided, and programs for causing processors to execute processing of such constituent elements may be provided. Furthermore, recording media recording the programs may be provided. It is apparent that such modules, methods, programs, and recording media are also included in the present invention.

Some of or all the above-described example embodiments can be described as in the following Supplementary Notes, but are not limited to the following.

(Supplementary Note 1)

An apparatus comprising:

a first communication processing unit configured to communicate with a terminal apparatus over a master cell group (MCG) bearer for dual connectivity of the terminal apparatus; and a second communication processing unit configured to receive, from a secondary base station which communicates with the terminal apparatus over a secondary cell group (SCG) bearer for the dual connectivity, a first message requesting a release of the secondary base station, wherein the second communication processing unit is configured to transmit, to the secondary base station, a second message indicating a rejection of the release.

(Supplementary Note 2)

The apparatus according to Supplementary Note 1, wherein the first message is an SENB RELEASE REQUIRED message.

(Supplementary Note 3)

The apparatus according to Supplementary Note 1 or 2, wherein the second message is an SENB RELEASE CONFIRM message including an information element indicating the rejection of the release.

(Supplementary Note 4)

The apparatus according to Supplementary Note 3, wherein the information element is a Release Reject IE.

(Supplementary Note 5)

The apparatus according to Supplementary Note 1 or 2, wherein the second message is an SENB RELEASE REJECT message.

(Supplementary Note 6)

The apparatus according to any one of Supplementary Notes 1 to 5, wherein the second communication processing unit is configured to transmit the second message to the secondary base station when the release is not accepted.

(Supplementary Note 7)

The apparatus according to Supplementary Note 6, wherein the second communication processing unit is configured to transmit, to the secondary base station, a third message indicating confirmation of the release, when the release is accepted.

(Supplementary Note 8)

The apparatus according to Supplementary Note 7, wherein the third message is an SENB RELEASE CONFIRM message.

(Supplementary Note 9)

The apparatus according to any one of Supplementary Notes 1 to 8, wherein the second message includes wait time information indicating a time period for waiting before the secondary base station initiates a next release procedure.

(Supplementary Note 10)

The apparatus according to Supplementary Note 9, wherein the wait time information is a Time to wait IE.

(Supplementary Note 11)

The apparatus according to any one of Supplementary Notes 1 to 10, wherein the second communication processing unit is configured to transmit, to the secondary base station, stop information indicating stop of a function related to inactivity of the terminal apparatus.

(Supplementary Note 12)

The apparatus according to Supplementary Note 11, wherein the stop information is a User Inactivity function Indication IE indicating the stop.

(Supplementary Note 13)

The apparatus according to Supplementary Note 11 or 12, wherein the second message includes the stop information.

(Supplementary Note 14)

The apparatus according to any one of Supplementary Notes 11 to 13, wherein the second communication processing unit is configured to transmit, to the secondary base station, an SENB ADDITION REQUEST message including the stop information or an SENB MODIFICATION REQUEST message including the stop information.

(Supplementary Note 15)

The apparatus according to any one of Supplementary Notes 1 to 14, wherein the second communication processing unit is configured to transmit, to the secondary base station, a fourth message including behaviour-related information related to behaviour of the terminal apparatus.

(Supplementary Note 16)

The apparatus according to Supplementary Note 15, wherein the behavior-related information is an Expected UE Behaviour IE.

(Supplementary Note 17)

The apparatus according to Supplementary Note 15 or 16, wherein the fourth message is an SENB ADDITION REQUEST message or an SENB MODIFICATION REQUEST message.

(Supplementary Note 18)

The apparatus according to any one of Supplementary Notes 1 to 17, wherein the apparatus is a base station, a base station apparatus for a base station, or a module for the base station apparatus.

(Supplementary Note 19)

An apparatus comprising:

a first communication processing unit configured to communicate with a terminal apparatus over a SCG bearer for dual connectivity of the terminal apparatus; and a second communication processing unit configured to transmit, to a master base station which communicates with the terminal apparatus over a MCG bearer for the dual connectivity, a first message requesting a release of a secondary base station which communicates with the terminal apparatus over the SCG bearer, wherein the second communication processing unit is configured to receive, from the master base station, a second message indicating a rejection of the release.

(Supplementary Note 20)

The apparatus according to Supplementary Note 19, wherein the second communication processing unit is configured to receive the second message from the master base station when the release is not accepted.

(Supplementary Note 21)

The apparatus according to Supplementary Note 20, wherein the second communication processing unit is configured to receive, from the master base station, a third message indicating confirmation of the release, when the release is accepted.

(Supplementary Note 22)

The apparatus according to any one of Supplementary Notes 19 to 21, wherein the second message includes wait time information indicating a time period for waiting before the secondary base station initiates a next release procedure, and the second communication processing unit is configured to wait based on the wait time information.

(Supplementary Note 23)

The apparatus according to any one of Supplementary Notes 19 to 22, wherein the second communication processing unit is configured to receive, from the master base station, stop information indicating stop of a function related to inactivity of the terminal apparatus, and at least one of the first communication processing unit and the second communication processing unit is configured to stop the function, based on the stop information.

(Supplementary Note 24)

The apparatus according to any one of Supplementary Notes 19 to 23, wherein the apparatus is a base station configured to operate as the secondary base station, a base station apparatus for the base station, or a module for the base station apparatus.

(Supplementary Note 25)

An apparatus comprising:

a first communication processing unit configured to communicate with a master base station over a MCG bearer for dual connectivity of a terminal apparatus; and a second communication processing unit configured to communicate with a secondary base station over a SCG bearer for the dual connectivity, wherein the secondary base station transmits, to the master base station, a first message requesting a release of the secondary base station, and the master base station transmits, to the secondary base station, a second message indicating a rejection of the release.

(Supplementary Note 26)

The apparatus according to Supplementary Note 25, wherein the apparatus is the terminal apparatus or a module for the terminal apparatus.

(Supplementary Note 27)

An apparatus comprising:

a communication processing unit configured to communicate with a terminal apparatus over a MCG bearer for dual connectivity of the terminal apparatus; and an information acquisition unit configured to acquire activity-related information reported by a secondary base station which communicates with the terminal apparatus over a SCG bearer for the dual connectivity, the activity-related information being related to an activity of the terminal apparatus in a SCG of the secondary base station.

(Supplementary Note 28)

The apparatus according to Supplementary Note 27, further including an information provision unit configured to provide the secondary base station with behaviour-related information related to behaviour of the terminal apparatus.

(Supplementary Note 29)

The apparatus according to Supplementary Note 28, wherein the behavior-related information is an Expected UE Behaviour IE.

(Supplementary Note 30)

The apparatus according to any one of Supplementary Notes 27 to 29, further comprising a control unit configured to use the activity-related information to determine an operation.

(Supplementary Note 31)

The apparatus according to Supplementary Note 30, wherein the operation includes a release of the secondary base station.

(Supplementary Note 32)

The apparatus according to Supplementary Note 31, wherein the control unit is configured to use the activity-related information and another activity-related information related to an activity of the terminal apparatus in a MCG to determine a release of the secondary base station.

(Supplementary Note 33)

An apparatus comprising:

a communication processing unit configured to communicate with a terminal apparatus over a SCG bearer for dual connectivity of the terminal apparatus; and a reporting unit configured to report, to a master base station which communicates with the terminal apparatus over a MCG bearer of the dual connectivity, activity-related information related to an activity of the terminal apparatus in a SCG.

(Supplementary Note 34)

The apparatus according to Supplementary Note 33, wherein the reporting unit transmits, to the master base station, an SENB MODIFICATION REQUIRED message including the activity-related information.

(Supplementary Note 35)

The apparatus according to Supplementary Note 33 or 34, wherein the reporting unit reports the activity-related information to the master base station, based on behaviour-related information related to behaviour of the terminal apparatus.

(Supplementary Note 36)

The apparatus according to any one of Supplementary Notes 27 to 35, wherein the activity-related information is information indicating that the terminal apparatus is inactive in a SCG or information indicating whether the terminal apparatus is active or inactive in a SCG.

(Supplementary Note 37)

The apparatus according to any one of Supplementary Notes 27 to 36, wherein the activity-related information is a User Inactivity Status IE.

(Supplementary Note 38)

The apparatus according to any one of Supplementary Notes 27 to 37, wherein the apparatus is a base station, a base station apparatus for a base station, or a module for the base station apparatus.

(Supplementary Note 39)

An apparatus comprising:

a first communication processing unit configured to communicate with a master base station over a MCG bearer for dual connectivity of a terminal apparatus; and a second communication processing unit configured to communicate with a secondary base station over a SCG bearer for the dual connectivity, wherein the secondary base station reports, to the master base station, activity-related information related to an activity of the terminal apparatus in a SCG of the secondary base station, and the master base station acquires the activity-related information reported by the secondary base station.

(Supplementary Note 40)

The apparatus according to Supplementary Note 39, wherein the apparatus is the terminal apparatus or a module for the terminal apparatus.

(Supplementary Note 41)

A method comprising:

communicating with a terminal apparatus over a master cell group (MCG) bearer for dual connectivity of the terminal apparatus;

receiving, from a secondary base station which communicates with the terminal apparatus over a secondary cell group (SCG) bearer for the dual connectivity, a first message requesting a release of the secondary base station; and transmitting, to the secondary base station, a second message indicating a rejection of the release.

(Supplementary Note 42)

A program for causing a processor to execute:

communicating with a terminal apparatus over a master cell group (MCG) bearer for dual connectivity of the terminal apparatus;

receiving, from a secondary base station which communicates with the terminal apparatus over a secondary cell group (SCG) bearer for the dual connectivity, a first message requesting a release of the secondary base station; and transmitting, to the secondary base station, a second message indicating a rejection of the release.

(Supplementary Note 43)

A readable recording medium recording a program for causing a processor to execute:

communicating with a terminal apparatus over a master cell group (MCG) bearer for dual connectivity of the terminal apparatus;

receiving, from a secondary base station which communicates with the terminal apparatus over a secondary cell group (SCG) bearer for the dual connectivity, a first message requesting a release of the secondary base station; and transmitting, to the secondary base station, a second message indicating a rejection of the release.

(Supplementary Note 44)

A method comprising:

communicating with a terminal apparatus over a SCG bearer for dual connectivity of the terminal apparatus;

transmitting, to a master base station which communicates with the terminal apparatus over a MCG bearer for the dual connectivity, a first message requesting a release of a secondary base station which communicates with the terminal apparatus over the SCG bearer; and receiving, from the master base station, a second message indicating a rejection of the release.

(Supplementary Note 45)

A program for causing a processor to execute:

communicating with a terminal apparatus over a SCG bearer for dual connectivity of the terminal apparatus;

transmitting, to a master base station which communicates with the terminal apparatus over a MCG bearer for the dual connectivity, a first message requesting a release of a secondary base station which communicates with the terminal apparatus over the SCG bearer; and receiving, from the master base station, a second message indicating a rejection of the release.

(Supplementary Note 46)

A readable recording medium recording a program for causing a processor to execute:

communicating with a terminal apparatus over a SCG bearer for dual connectivity of the terminal apparatus;

transmitting, to a master base station which communicates with the terminal apparatus over a MCG bearer for the dual connectivity, a first message requesting a release of a secondary base station which communicates with the terminal apparatus over the SCG bearer; and receiving, from the master base station, a second message indicating a rejection of the release.

(Supplementary Note 47)

A method comprising:

communicating with a master base station over a MCG bearer for dual connectivity of a terminal apparatus; and communicating with a secondary base station over a SCG bearer for the dual connectivity, wherein the secondary base station transmits, to the master base station, a first message requesting a release of the secondary base station, and the master base station transmits, to the secondary base station, a second message indicating a rejection of the release.

(Supplementary Note 48)

A program for causing a processor to execute:

communicating with a master base station over a MCG bearer for dual connectivity of a terminal apparatus; and communicating with a secondary base station over a SCG bearer for the dual connectivity, wherein the secondary base station transmits, to the master base station, a first message requesting a release of the secondary base station, and the master base station transmits, to the secondary base station, a second message indicating a rejection of the release.

(Supplementary Note 49)

A readable recording medium recording a program for causing a processor to execute:

communicating with a master base station over a MCG bearer for dual connectivity of a terminal apparatus; and communicating with a secondary base station over a SCG bearer for the dual connectivity, wherein the secondary base station transmits, to the master base station, a first message requesting a release of the secondary base station, and the master base station transmits, to the secondary base station, a second message indicating a rejection of the release.

(Supplementary Note 50)

A method comprising:

communicating with a terminal apparatus over a MCG bearer for dual connectivity of the terminal apparatus; and acquiring activity-related information reported by a secondary base station which communicates with the terminal apparatus over a SCG bearer for the dual connectivity, the activity-related information being related to an activity of the terminal apparatus in a SCG of the secondary base station.

(Supplementary Note 51)

A program for causing a processor to execute:

communicating with a terminal apparatus over a MCG bearer for dual connectivity of the terminal apparatus; and acquiring activity-related information reported by a secondary base station which communicates with the terminal apparatus over a SCG bearer for the dual connectivity, the activity-related information being related to an activity of the terminal apparatus in a SCG of the secondary base station.

(Supplementary Note 52)

A recording medium recording a program for causing a processor to execute:

communicating with a terminal apparatus over a MCG bearer for dual connectivity of the terminal apparatus; and acquiring activity-related information reported by a secondary base station which communicates with the terminal apparatus over a SCG bearer for the dual connectivity, the activity-related information being related to an activity of the terminal apparatus in a SCG of the secondary base station.

(Supplementary Note 53)

A method comprising:

communicating with a terminal apparatus over a SCG bearer for dual connectivity of the terminal apparatus; and reporting, to a master base station which communicates with the terminal apparatus over a MCG bearer of the dual connectivity, activity-related information related to an activity of the terminal apparatus in a SCG.

(Supplementary Note 54)

A program for causing a processor to execute:

communicating with a terminal apparatus over a SCG bearer for dual connectivity of the terminal apparatus; and reporting, to a master base station which communicates with the terminal apparatus over a MCG bearer of the dual connectivity, activity-related information related to an activity of the terminal apparatus in a SCG.

(Supplementary Note 55)

A readable recording medium recording a program for causing a processor to execute:

communicating with a terminal apparatus over a SCG bearer for dual connectivity of the terminal apparatus; and reporting, to a master base station which communicates with the terminal apparatus over a MCG bearer of the dual connectivity, activity-related information related to an activity of the terminal apparatus in a SCG.

(Supplementary Note 56)

A method comprising:

communicating with a master base station over a MCG bearer for dual connectivity of a terminal apparatus; and communicating with a secondary base station over a SCG bearer for the dual connectivity, wherein the secondary base station reports, to the master base station, activity-related information related to an activity of the terminal apparatus in a SCG of the secondary base station, and the master base station acquires the activity-related information reported by the secondary base station.

(Supplementary Note 57)

A program for causing a processor to execute:

communicating with a master base station over a MCG bearer for dual connectivity of a terminal apparatus; and communicating with a secondary base station over a SCG bearer for the dual connectivity, wherein the secondary base station reports, to the master base station, activity-related information related to an activity of the terminal apparatus in a SCG of the secondary base station, and the master base station acquires the activity-related information reported by the secondary base station.

(Supplementary Note 58)

A readable recording medium recording a program for causing a processor to execute:

communicating with a master base station over a MCG bearer for dual connectivity of a terminal apparatus; and communicating with a secondary base station over a SCG bearer for the dual connectivity, wherein the secondary base station reports, to the master base station, activity-related information related to an activity of the terminal apparatus in a SCG of the secondary base station, and the master base station acquires the activity-related information reported by the secondary base station.

INDUSTRIAL APPLICABILITY

The occurrence of unnecessary operations can be reduced in a case with a SCG bearer in a mobile communication system.

REFERENCE SIGNS LIST

1 System
10, 20 Coverage area
30 Control entity
40 Gateway

50 Network
100 First base station
141, 151 First communication processing unit
143, 153 Second communication processing unit
161, 171 Communication processing unit
163 Information provision unit
165, 175 Information acquisition unit
167 Control unit
200 Second base station
241, 251 First communication processing unit
243, 253 Second communication processing unit
261, 271 Communication processing unit
263, 273 Reporting unit
300 Terminal apparatus
331, 341, 351, 361 First communication processing unit
333, 343, 353, 363 Second communication processing unit

What is claimed is:

1. A master base station for a dual connectivity which communicates with a terminal apparatus over a master cell group (MCG) bearer, the master base station comprising:

a receiver configured to receive, from a secondary base station which communicates with the terminal apparatus over a secondary cell group (SCG) bearer for the dual connectivity, a first message requesting a release of the secondary base station; and a transmitter configured to transmit in response to the first message, to the secondary base station, a second message indicating a rejection of the release, wherein the second message includes wait time information indicating a time period for waiting before the secondary base station initiates a next release procedure.

2. The master base station according to claim 1, wherein the first message is an SENB RELEASE REQUIRED message.

3. The master base station according to claim 1, wherein the second message is an SENB RELEASE CONFIRM message including an information element indicating the rejection of the release.

4. The master base station according to claim 3, wherein the information element is a Release Reject information element (IE).

5. The master base station according to claim 1, wherein the second message is an SENB RELEASE REJECT message.

6. The master base station according to claim 1, wherein the transmitter is configured to transmit the second message to the secondary base station when the release is not accepted.

7. The master base station according to claim 6, wherein the transmitter is configured to transmit, to the secondary base station, a third message indicating confirmation of the release, when the release is accepted.

8. The master base station according to claim 7, wherein the third message is an SENB RELEASE CONFIRM message.

9. The master base station according to claim 1, wherein the wait time information is a Time to wait information element (IE).

10. The master base station according to claim 1, wherein the transmitter is configured to transmit, to the secondary base station, stop information indicating stop of a function related to inactivity of the terminal apparatus.

11. The master base station according to claim 10, wherein the stop information is a User Inactivity function Indication information element (IE) indicating the stop.

12. The master base station according to claim 10, wherein the second message includes the stop information.

13. The master base station according to claim 10, wherein the transmitter is configured to transmit, to the secondary base station, an SENB ADDITION REQUEST message including the stop information or an SENB MODIFICATION REQUEST message including the stop information.

14. The master base station according to claim 1, wherein the transmitter is configured to transmit, to the secondary base station, a fourth message including behaviour-related information related to behaviour of the terminal apparatus.

15. The master base station according to claim 14, wherein the behavior-related information is an Expected User Equipment (UE) Behaviour information element (IE).

16. The master base station according to claim 14, wherein the fourth message is an SENB ADDITION REQUEST message or an SENB MODIFICATION REQUEST message.

17. A secondary base station for a dual connectivity which communicates with a terminal apparatus over a secondary cell group (SCG) bearer, comprising:

a transmitter configured to transmit, to a master base station which communicates with the terminal apparatus over a master cell group (MCG) bearer for the dual connectivity, a first message requesting a release of the secondary base station which communicates with the terminal apparatus over the SCG bearer; and a receiver configured to receive a second message indicating a rejection of the release, the second message being transmitted by the master base station in response to the first message, wherein the second message includes wait time information indicating a time period for waiting before the secondary base station initiates a next release procedure.

18. A method of a master base station for a dual connectivity which communicates with a terminal apparatus over a master cell group (MCG) bearer, comprising:

receiving, from a secondary base station which communicates with the terminal apparatus over a secondary cell group (SCG) bearer for the dual connectivity, a first message requesting a release of the secondary base station; and transmitting in response to the first message, to the secondary base station, a second message indicating a rejection of the release, wherein the second message includes wait time information indicating a time period for waiting before the secondary base station initiates a next release procedure.

* * * * *